(12) United States Patent
DeAngelis et al.

(10) Patent No.: US 11,683,452 B2
(45) Date of Patent: Jun. 20, 2023

(54) IMAGE-STREAM WINDOWING SYSTEM AND METHOD

(71) Applicant: Isolynx, LLC, Haverhill, MA (US)

(72) Inventors: Douglas J. DeAngelis, Newbury, MA (US); Kirk Sigel, Ithaca, NY (US); Edward G. Evansen, Walpole, MA (US)

(73) Assignee: Isolynx, LLC, Haverhill, MA (US)

( * ) Notice: Subject to any disclaimer, the term of this patent is extended or adjusted under 35 U.S.C. 154(b) by 0 days.

(21) Appl. No.: 17/728,904

(22) Filed: Apr. 25, 2022

(65) Prior Publication Data
US 2022/0256120 A1 Aug. 11, 2022

Related U.S. Application Data

(60) Continuation of application No. 16/884,344, filed on May 27, 2020, now Pat. No. 11,317,062, which is a
(Continued)

(51) Int. Cl.
| | |
|---|---|
| *H04N 7/18* | (2006.01) |
| *A63B 24/00* | (2006.01) |
| *G01S 3/786* | (2006.01) |
| *H04N 5/222* | (2006.01) |
| *H04N 5/262* | (2006.01) |

(Continued)

(52) U.S. Cl.
CPC ......... *H04N 7/181* (2013.01); *A63B 24/0021* (2013.01); *G01S 3/7865* (2013.01); *H04N 5/222* (2013.01); *H04N 5/262* (2013.01); *H04N 23/633* (2023.01); *H04N 23/661* (2023.01); *H04N 23/695* (2023.01); *H04N 23/90* (2023.01); *A63B 43/00* (2013.01); *A63B 69/0028* (2013.01); *A63B 2024/0025* (2013.01); *A63B 2220/836* (2013.01); *A63B 2225/50* (2013.01); *A63B 2243/0025* (2013.01); *A63B 2244/18* (2013.01); *A63B 2244/24* (2013.01)

(58) Field of Classification Search
CPC ............................ H04N 7/181; A63B 24/0021
See application file for complete search history.

(56) References Cited

U.S. PATENT DOCUMENTS

| | | | | |
|---|---|---|---|---|
| 5,973,746 A | * | 10/1999 | Nakamoto | ............. G09G 5/006 348/E7.012 |
| 2007/0024705 A1 | * | 2/2007 | Richter | .............. H04N 21/6587 348/E7.086 |
| 2007/0035612 A1 | * | 2/2007 | Korneluk | ......... H04N 21/21805 348/E7.069 |

* cited by examiner

*Primary Examiner* — Jerry T Jean Baptiste
(74) *Attorney, Agent, or Firm* — Cozen O'Connor

(57) ABSTRACT

An image-stream windowing method includes capturing, with a camera located at a fixed position and having a fixed field of view, a high-resolution image stream of an object that moves during said capturing. The high-resolution image stream includes a sequence of high-resolution frames. The method also includes determining, for each high-resolution frame of the sequence of high-resolution frames, a respective window, of a sequence of windows corresponding to the sequence of high-resolution frames, that encloses the object within said each high-resolution frame. The size and location of the respective window are determined based at least on the fixed position, the fixed field of view, and a position of the object. The method also includes generating a low-resolution image stream from the high-resolution image stream by cropping said each high-resolution frame with its respective window.

20 Claims, 31 Drawing Sheets

Related U.S. Application Data continuation of application No. 15/811,466, filed on Nov. 13, 2017, now Pat. No. 10,701,322, which is a division of application No. 11/950,346, filed on Dec. 4, 2007, now Pat. No. 9,848,172.

(60) Provisional application No. 60/872,639, filed on Dec. 4, 2006.

(51) Int. Cl.
*H04N 23/90* (2023.01)
*H04N 23/63* (2023.01)
*H04N 23/661* (2023.01)
*H04N 23/695* (2023.01)
*A63B 43/00* (2006.01)
*A63B 69/00* (2006.01)

IMAGE-STREAM WINDOWING SYSTEM AND METHOD

CROSS REFERENCE TO RELATED APPLICATIONS

This application is a continuation of U.S. patent application Ser. No. 16/884,344, filed May 27, 2020, which is a continuation of U.S. patent application Ser. No. 15/811,466, filed Nov. 13, 2017 and now U.S. Pat. No. 10,701,322, which is a divisional of U.S. patent application Ser. No. 11/950,346, filed Dec. 4, 2007 and now U.S. Pat. No. 9,848,172, which claims priority to U.S. Provisional Patent Application No. 60/872,639, filed Dec. 4, 2006 and titled "Systems and Processes for Capturing Image Data of Tracked Objects". Each of these applications is incorporated herein by reference in its entirety.

BACKGROUND

Traditionally, video and still images of a live event (i.e., video content and still image content) are created by a team of professionals. In the case of video content, highly trained camera persons operate one or more cameras and highly trained production staff operate production equipment (e.g., within a production van at a sporting event) to select camera shots and combine graphics into a production feed. In the case of still image content, highly skilled camera persons operate still cameras to capture still images of an event and submit these still images to one or more editors who select shots for use in magazines, for example.

The cost of producing video and still image content defines the market size required to cover this cost. Thus, only events having a sufficient market justify the cost of producing video and still image content. Although technology has reduced the cost of production, the cost of skilled human operators remains high.

Images from a camera may be used to visually track an object (e.g., a golf ball) within the camera's field of view. The camera may be motorized to allow it to move to maintain the moving object within its field of view. However, such systems fail when the camera 'loses sight' of the object; for example, the camera may lose sight of the object if the object becomes visually obscured by another object.

For certain sporting events, cameras may be motorized to facilitate tracking of competitors and are operated by remote camera operator. These cameras still require the skill of a person.

Many systems have been developed to track objects by attaching a sensor to the object and then using the sensor to determine the location of the object. Such object tracking provides data (e.g., speed) to computer systems but is not known to facilitate real image production.

SUMMARY

Systems and processes described hereinbelow provide for autonomous still and moving picture production.

In one embodiment, a process for capturing images of tracked objects includes: assigning each of one or more cameras to each tracked object, and determining a location of each tracked object within an operational field. For each of the one or more cameras, a field of view is determined, from the location of the camera to the determined location of the object assigned to the camera. Each of the one or more cameras is commanded to capture the associated field of view. The steps of determining and commanding are repeated periodically.

In one embodiment, a process for capturing images of tracked objects includes utilizing a plurality of location units to determine location information of each of the tracked objects within an operational field. Each of the location units is attached to a different tracked object. For each of one or more cameras, a field of view is determined, from the location of the camera to the determined location of each of the tracked objects. The optimum field of view for each tracked object is determined, and one of the fields of view from the location of the camera is assigned to each of the one or more cameras, based upon the determined optimum fields of view. Each of the one or more cameras is controlled to capture an image stream of the field of view assigned to the camera. The steps of utilizing, determining, assigning and controlling are repeated periodically.

In one embodiment, a process for controlling a first camera to capture a first image stream of a first tracked object within an operational field includes: receiving first location information periodically from a first location unit attached to the first object within the operational field, and determining a first field of view for the first camera based upon the first location information and the location of the first camera. The first camera is controlled to capture the image stream based upon the first field of view; and the first field of view and the first camera are updated continuously as the first location information changes.

In one embodiment, a system for controlling one or more cameras to capture images of one or more objects includes at least one motorized camera device and at least one object location unit attached to each of the objects. An object tracking device utilizes the at least one object location unit to determine location information of each of the one or more objects. A camera control device determines a field of view for each of the one or more motorized cameras based upon the location information and the location of each of the one or more motorized cameras. The camera control device controls each of the at least one motorized cameras to capture images of the associated field of view. The camera control device updates each field of view as the location information changes and controls each motorized camera to capture the associated field of view. Each motorized camera includes motorized control of rotation, tilt and zoom.

In an embodiment, an autonomous picture production system includes: a location unit attached to each tracked object; an object tracking device for receiving location information from each location unit; at least one motorized camera; and a camera control device for controlling, based upon the location information, the at least one motorized camera to capture image data of at least one tracked object.

In another embodiment, an autonomous picture production system includes: two or more fixed cameras for capturing image data including at least one tracked object; an object tracking device for determining location information of the at least one tracked object based upon the image data; at least one motorized camera, and a camera control device for controlling, based upon the location information, the at least one motorized camera to capture image data of at least one tracked object.

In another embodiment, a process provides autonomous picture production, including the steps of: attaching at least one location unit to each tracked object at an operational field; determining location of each of the tracked objects within the operational field based upon information received from the location units; controlling at least one camera such that at least one tracked object is positioned within a field of view of the camera; capturing image data from the at least one camera, and repeating the steps of determining, controlling and capturing as the at least one tracked object moves, to maintain the tracked object within the field of view.

In another embodiment, a picture production process captures image data of tracked objects, and includes the steps of: selecting one object from a plurality of objects within an operational field in response to input from a user interface, each object having at least one location unit; receiving location information from the at least one location unit attached to the one object; determining a field of view to include the one object from a camera, based upon the location information and the location of the camera, and controlling the camera to capture the field of view as image data.

In another embodiment, a system provides autonomous picture production, and includes: one or more motorized cameras; at least one location unit attached to each objects to be tracked; an object tracking device for determining location of each of the objects to be tracked based upon location information obtained from the location units, and a camera control device for determining, for at least one of the one or more motorized cameras, a field of view that includes one of the objects to be tracked based upon the location information and a location of each of the one or more motorized cameras. The camera control device controls the one or more motorized cameras to capture image data of the field of view.

In another embodiment, a method stores image data in a self-organizing database to facilitate autonomous picture production, including the steps of: receiving an image and associated annotation data; attaching tags to the image based upon the associated annotation data; categorizing the image based on the attached tags, and storing the image in the database based on the categorization.

In another embodiment, a camera produces a standard resolution and rate image stream and a slow-motion image stream of an action of interest to facilitate autonomous picture production. The camera includes an imager for capturing an image stream at a frame rate of the slow-motion image stream and at a resolution equal to the maximum resolution of the standard image stream and the slow-motion image stream, and a resolution down-sampler for reducing the resolution of each frame of the captured image stream if the captured image stream has a higher resolution than the slow-motion image stream. A slow-motion buffer stores the slow-motion image stream. A rate and resolution down-sampler reduces the frame rate of the image stream where the frame rate of the image stream is greater than the frame rate of the standard resolution and rate image stream, and reduces the resolution of each frame of the image stream where the resolution of the image stream is greater than the resolution of the standard resolution and rate image stream, to produce the standard resolution and rate image stream.

In another embodiment, a camera produces a standard resolution and rate image stream and still images of an action of interest to facilitate autonomous picture production. The camera includes an imager for capturing an image stream at a frame rate of the standard resolution and rate image stream and at a resolution equal to the resolution of the still images. A rate down-sampler reduces the frame rate of the captured image stream to a desired still image rate to produce the still images. A still image buffer stores the still images. A rate and resolution down-sampler reduces the frame rate of the captured image stream where the frame rate of the image stream is greater than the frame rate of the standard resolution and rate image stream, and reduces the resolution of each frame of the captured image stream where the resolution of the captured image stream is greater than the resolution of the standard resolution and rate image stream, to produce the standard resolution and rate image stream.

In another embodiment, a camera produces a standard resolution and rate image stream and a slow-motion image stream of a previously occurred action of interest to facilitate autonomous picture production. The camera has an imager for capturing an image stream at a frame rate of the slow-motion image stream and at a resolution equal to the maximum resolution of the standard resolution image stream and the slow-motion image stream. A resolution down-sampler produces a continuous slow-motion image stream, the resolution down-sampler reducing the resolution of each frame of the captured image stream if the captured image stream has a higher resolution than the slow-motion image stream. A first circular buffer continually stores the continuous slow-motion image stream. A slow-motion buffer stores the slow-motion image stream, the first circular buffer transferring the slow-motion image stream to the slow-motion buffer upon notification of the previously occurred action of interest. A rate and resolution down-sampler produces the standard resolution and rate image stream, reducing the frame rate of the captured image stream if the frame rate of the captured image stream is greater than the frame rate of the standard resolution and rate image stream. The rate and resolution down sampler reduces the resolution of each frame of the captured image stream if the resolution of the captured image stream is greater than the resolution of the standard resolution and rate image stream.

In another embodiment, a camera produces a standard resolution and rate image stream and still images of a previously occurred action of interest to facilitate autonomous picture production, and includes an imager for capturing an image stream at a frame rate of the standard resolution and rate image stream and at a resolution equal to the resolution of the still images. A rate down-sampler continually produces still images, reducing the frame rate of the captured image stream to a desired still image rate. A first circular buffer stores the continuous still images. A still image buffer stores the still images of the previously occurred action of interest. A rate and resolution down-sampler reduces the frame rate of the captured image stream where the frame rate of the captured image stream is greater than the frame rate of the standard resolution and rate image stream, The rate and resolution down-sampler reduces the resolution of each frame of the captured image stream where the resolution of the captured image stream is greater than the resolution of the standard resolution and rate image stream, to produce the standard resolution and rate image stream.

In another embodiment, an autonomous picture production system automatically captures an image of a location upon request, and includes: one or more motorized cameras; an external interaction device for receiving the request from a requestor, the request specifying the location, and a camera control device for determining an optimal camera from the one or more motorized cameras for capturing the image. The camera control device controls the optimal camera to capture the image. A database for stores the image. The external interaction device informs the requestor how to retrieve the image from the database.

In another embodiment, a method automatically captures an image of a location upon request, and includes the steps of: receiving a request from a requestor to capture the image of the location; determining an optimal camera for capturing the image of the location from at least one motorized camera; controlling the optimal camera to include the location within its field of view; capturing the image using the optimal camera, and delivering the image to the requestor.

In another embodiment, an autonomous picture production process includes the steps of: automatically determining location of one or more objects in or adjacent to an operational field, and automatically controlling one or more cameras in response to the location to capture image data of the objects.

In another embodiment, a camera facilitates autonomous picture production, and includes: an imager for capturing an image stream; a signal processor for processing the image stream into one or more image data paths; at least one image stream output, and a memory for cyclically buffering images of each image data path and for buffering one or more output image streams of the camera.

DETAILED DESCRIPTION OF THE FIGURES

Figure 1:
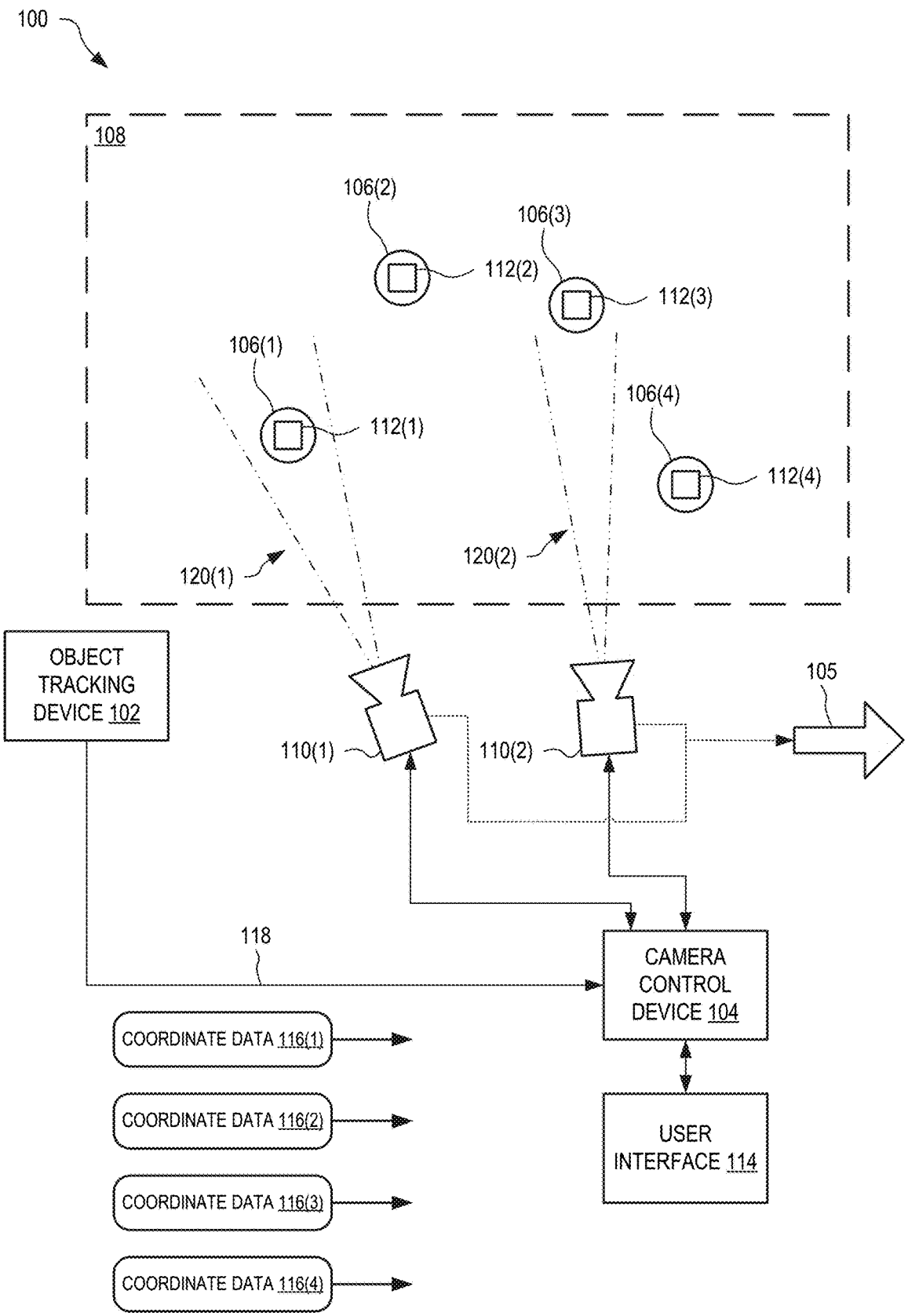
FIG. 1 shows a system for capturing image data of tracked objects, to facilitate autonomous still and/or moving picture production, in accord with an embodiment.

FIG. 1 shows a system 100 that captures image data of tracked objects. Image data may include images and/or image streams. Image streams are for example collected data bits that are converted into a signal (e.g., a video signal sent via a camera interface), which is then converted back into a data stream (e.g., a stream of bytes), which in turn may be interpreted as an image or images, for example via processing software. Thus, "image stream" as used herein refers to image data collected by a camera, for example a continuous series of data that is convertible into a media stream, video for viewing or recording, or high-resolution images for viewing or printing. The terms "image data" and "image stream" are sometimes used interchangeably in the following description.

System 100 has an object tracking device 102 that determines locations of one or more objects 106 within an operational field 108 and a camera control device 104 that controls one or more cameras 110 to capture image data of the one or more of objects 106. This image data is illustratively shown being output as live feeds (such as signals representing the captured image data), indicated by arrow 105. Cameras 110 are for example each mounted upon a motorized camera control platform that allows remote control of camera functionality (e.g., zoom, brightness, focus, etc.) as well as directional positioning (e.g., forward, backward and lateral motion, along with pan and tilt) of the camera.

Object tracking device 102 may interact with a location unit 112, fitted to each object 106 to be tracked, to determine coordinate data 116 (i.e., location information) for each object 106. As described in greater detail below, this coordinate data 116 is for example referenced to a two- or three-dimensional coordinate model (e.g., using Cartesian coordinates x, y, z). As shown in FIG. 1, location unit 112(1) is attached to object 106(1); location device 112(2) is attached to object 106(2); location device 112(3) is attached to object 106(3); and location device 112(4) is attached to object 106(4). Accordingly, coordinate data 116(1) is determined for object 106(1) with location device 112(1); coordinate data 116(2) is determined for object 106(2) using location device 112(2); coordinate data 116(3) is determined for object 106(3) using location device 112(3), and coordinate data 116(4) id determined for object 106(4) using location device 112(4). Coordinate data 116(1)-116(4) for respective objects 106(1)-106(4) may be sent from object tracking device 102 to camera control device 104 via communication link 118. Additional or fewer objects 106 may be similarly tracked without departing from the scope hereof.

In an embodiment, location unit 112 is a GPS based location device that determines absolute location and transmits the absolute location to object tracking device 102. In another embodiment, location unit 112 is a transponder that interacts with one or more transceivers (not shown) of object tracking device 102, to triangulate a position of location units 112 within operational field 108.

Operational field 108 may be represented as a two-dimensional model within one or both of object tracking device 102 and camera control device 104 so that each determined location of objects 106 is representable by a two-dimensional coordinate of x and y, where x represents a longitudinal displacement of object 106 within the operational field and y represent a latitudinal displacement of object 106 within the operational field. The two-dimensional coordinate may include a time stamp that indicates a time at which the x, y coordinate was determined (e.g., coordinate data 116 may include x, y and t (time) values).

Operational field 108 may be represented as a three-dimensional model within one or both of object tracking device 102 and camera control device 104. Each determined location of objects 106 is thus representable by a three-dimensional coordinate of x, y and z, where x represents a longitudinal displacement of object 106 with operational field 108, y represents a latitudinal displacement of object 106 within operational field 108 and z represents a vertical displacement of object 106 within operational field 108. This three-dimensional coordinate may include a time stamp that indicates a time when the coordinate was determined (e.g., coordinate data 116 may include x, y, z and t (time) values).

Coordinate data 116 may include information identifying a corresponding location unit 112; camera control device 104 may therefore use this information to distinguish between coordinate data for each tracked object 106 within operational field 108. For example, coordinate data 116(2) includes position and identity of location unit 112(2) and camera control device 104 uses this information to track object 106(2) with an assigned camera (e.g., camera 110(2)).

Coordinate data 116 may also include a velocity component that indicates a direction and speed of a location unit 112. In an embodiment, camera control device 104 uses this component to extrapolate positions of objects 106 within operational field 108, to predict fields of view and camera movements that appropriately maintain objects 106 within the fields of view. Velocity may also be determined where coordinate data 116 does not include a velocity component, for example by integrating location change over time.

A user interface 114 communicatively couples with camera control device 104 to facilitate control of cameras 110. A user (e.g. an operator of system 100) may for example assign a camera 110 to track an object 106, through user interface 114. Illustratively, as shown in FIG. 1, camera 110(1) is assigned to object 106(1) and has a field of view 120(1) that includes object 106(1); and camera 110(2) is assigned to object 106(3) and has a field of view 120(2) that includes object 106(3). Object assignments may be made via voice command, key press or touch-screen options of user interface 114. Assignment of cameras to objects may also be made automatically, as described below. In an embodiment, a production team selects from live feed outputs 105 from each camera 110 to produce desired content (e.g., still or moving pictures).

In an embodiment, object tracking device 102 periodically determines and sends location information of an object 106 to camera control device 104. Object tracking device 102 then determines coordinate data 116(1) of object 106(1) using location unit 112(1), and sends coordinate data 116(1) via communication path 118 to camera control device 104. Camera control device 104 uses the coordinate data 116(1) to determine camera adjustments for capturing or maintaining object 106(1) within field of view 120(1) of assigned camera 110(1). Camera control device 104 then adjusts camera 110(1) to maintain position of object 106(1) within field of view 120(1). Where object 106(1) has continued motion, camera control device 104 may determine object speed and direction and, accordingly, control movement of camera 110(1) so that object 106(1) is tracked smoothly (e.g., without jumping or jitter) by camera 110(1).

Camera control device 104 receives coordinate data of object 106(1) and, in an embodiment, maps the object coordinates to a reference coordinate model (e.g., an x, y, z three-dimensional space) to determine where to point camera 110(1). That is, camera control device 104 determines field of view 120(1) for camera 110(1) based upon location of object 106(1) and controls camera 110(1) to capture that field of view 120(1). For example, camera control device 104 controls pan, tilt and zoom of camera 110(1) to capture field of view 120(1). As object 106(1) moves, field of view 120(1) is determined and camera 110(1) controlled to capture the updated field of view 120(1). If coordinate data 116(1) includes velocity data for object 106(1), camera control device 104 may calculate field of view 120(1) accordingly and control camera movement speeds (e.g., pan speed) and/or zoom speeds to capture field of view 120(1). Camera control device 104 may determine field of view 120(1) to include other tracked objects 106 based upon sport specific information, as described below and shown in FIG. 24. For example, where object 106(1) is a soccer player and object 106(2) is a soccer ball traveling towards the soccer player, camera control device 104 may determine field of view 120(1) to include both object 106(1) and object 106(2).

Likewise, as object 106(3) moves within operational field 108, object tracking device 102 interacts with location unit 112(3) to periodically determine and communicate coordinate data 116(3) to camera control device 104, via communication path 118. Camera control device 104 then controls camera 110(2) to capture or maintain object 106(3) within field of view 120(2). Where object 106(3) has continued motion, camera control device 104 for example controls motion (e.g., pan) of camera 110(2) for smooth tracking of object 106(3). That is, camera control device 104 controls camera 110(2) to maintain size and location of object 106(3) within a field of view 120(2) of camera 110(2) even though object 106(3) is moving. If coordinate data 116(3) includes velocity data for location unit 112(3), camera control device 104 may use this information to determine or update camera 110(2) movement (e.g., pan) and/or zoom so that object 106(3) proportionally fills field of view 120(2) during object movement.

By including location information of cameras 110 relative to operational field 108 within camera control device 104, camera control device 104 determines and controls each camera 110 to smoothly track assigned objects 106 (e.g., to maintain size and location of assigned objects 106 within fields of view 120). Camera control device 104 for example controls pan, tilt and zoom of each camera 110 to capture object 106 in a desired position or proportion of each respective field of view 120. As object 106(1) moves away from camera 110(1), for example, camera control device 104 controls pan, tilt and zoom of camera 110(1) to maintain consistent object size throughout the image data (e.g., image series or stream) captured by camera 110(1). Camera control device 104 may adjust the apparent size of object 106 within captured image data of camera 110 by zooming camera 110, for example.

In an embodiment, operational field 108 is a sports playing field and each object 106 is a "star" player. Each player or object 106 is equipped with a location unit 112. Each camera 110 is assigned, e.g., using user interface 114, to one player/object 106. System 100 tracks each player/object 106 assigned to a camera to maintain each player/object 106 within an assigned camera's field of view 120 and consistently record events and reactions of each player/object 106. Streamed images from these cameras are replayed (e.g., stored and re-played as on demand video streams) or recorded for later analysis (e.g., by coaching staff) or for use during televised production of the sporting event.

System 100 may provide "video replay" for officiating purposes at a sporting event. If a flagrant foul is committed by a tracked player/object 106 "away from the action," officials may review each tracked player's actions to facilitate adjudication (unlike the current system in American football where only the main action is recorded and replayed). An opposing team is for example given a certain number of opportunities to request such replay and adjudication.

System 100 may provide web-casting feeds to a web site. A user accesses the site to select and view available images or recordings of a featured player. Rather than trying to watch the featured player on a relatively low resolution wide angle feed, as is conventionally streamed to web sites, the user views recorded or substantially real-time video of the featured player, as captured by one or more assigned cameras. Camera control device 104 controls a camera 110 assigned to the featured player (object). Camera 110 zooms in on the featured player, such that the featured player occupies a majority of the field of view, to provide acceptable feed of the featured player even at a lower web-casting resolution. The user may also elect to simultaneously view feed of the featured player and a wide-angle feed of the game in general. In another example of use, a father who is unable to attend an athletic event in which his son is performing pays to have a camera capture images of his son's performance and have the associated feed made available on a web site. Thus, payment of a fee (e.g., camera rental) ensures camera assignment to his son, even if the son is not a 'star' performer automatically selected by system 100.

System 100 may continually image selected (i.e., tracked) players, the "area around the ball" or "the leader of a race," to capture game highlights and relevant image data without requiring one or more skilled people at the sporting venue to operate cameras. Where the sporting venue has multiple cameras, a user watching a web-cast of the sporting event may select their desired view and/or player to watch, e.g., from a selection of players and views offered on the web site.

In an embodiment, coordinate data 116 includes object orientation information for each location unit 112. Object tracking device 102 uses the object orientation information to determine a direction that each tracked object 106 is facing. Camera control device 104 receives the object orientation information via communications link 118, and controls one or more cameras 110 to capture desired views (e.g., a front or side view) of each tracked object 106. Camera control device 104 utilizes this orientation information to automatically assign a camera 110 to an object 106 that is facing the camera 110, for example. As each object 106 moves about operational field 108 and the orientation information associated with each object 106 changes, camera control device 104 for example reassigns cameras 110 to objects 106, to maintain desired views of objects 106. Accordingly, system 100 facilitates determining and then capturing image data of the front of the moving sportsman, for example, since a moving sportsman generally faces the direction of motion and this may be readily determined by system 100.

Figure 28:
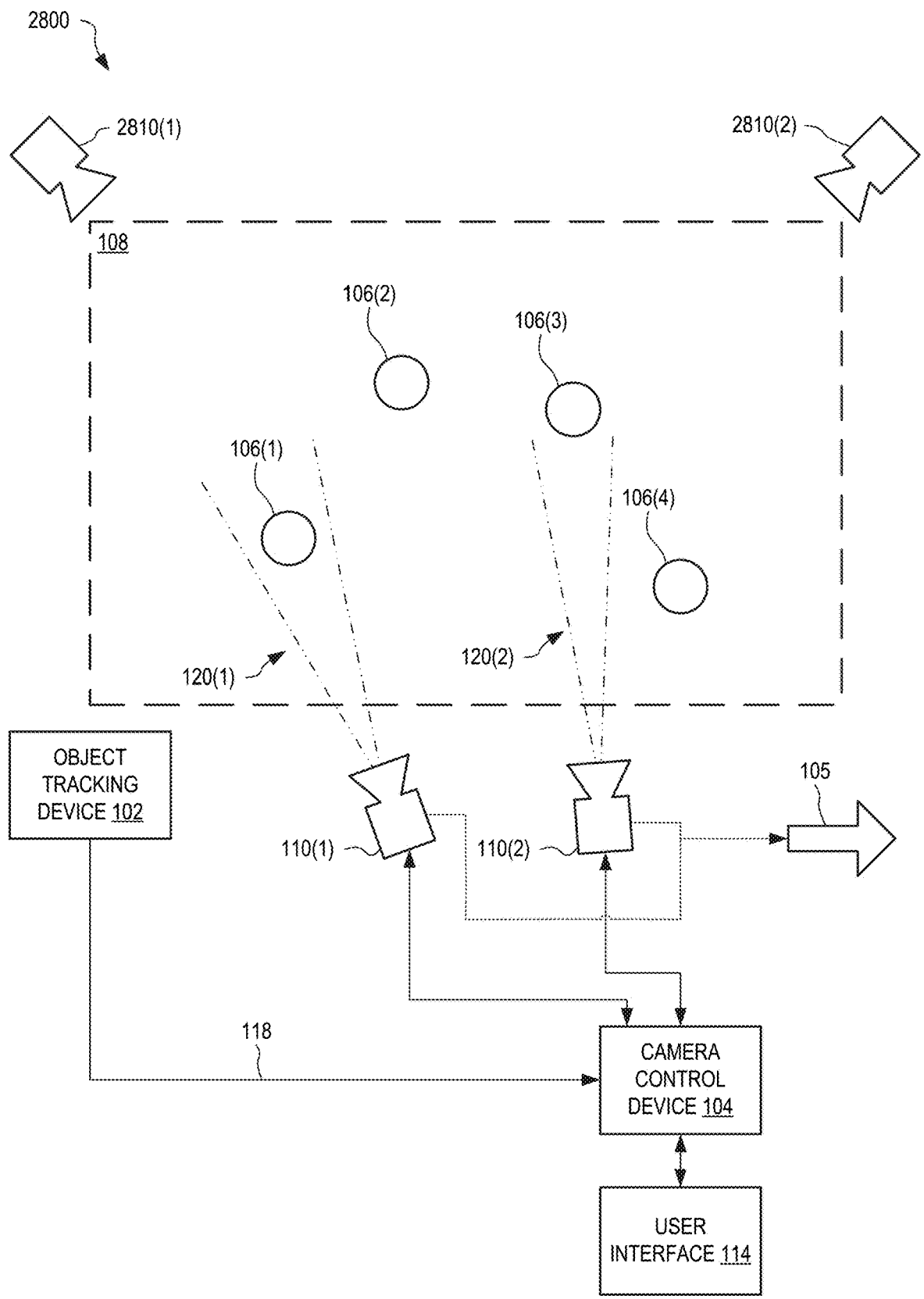
FIG. 28 shows an exemplary system for capturing image data of objects tracked using two fixed cameras, to facilitate autonomous still and/or moving picture production, in accord with an embodiment.

FIG. 28 shows an alternate system 2800 embodiment that is similar to system 100 of FIG. 1, but where location information is derived from two fixed cameras 2810(1) and 2810(2) that provide two overlapping image streams of operational field 108. Object tracking device 102 receives these overlapping image streams to determine location information of each object 106 on operational field 108. In one example, object tracking device 102 identifies each object 106 using visible identification numbers (e.g., player numbers) and uniform colors from images of cameras 2810. Object tracking device 102 then utilizes one or more parallax techniques to triangulate the position of each object 106 within operational field 108.

Figure 2:
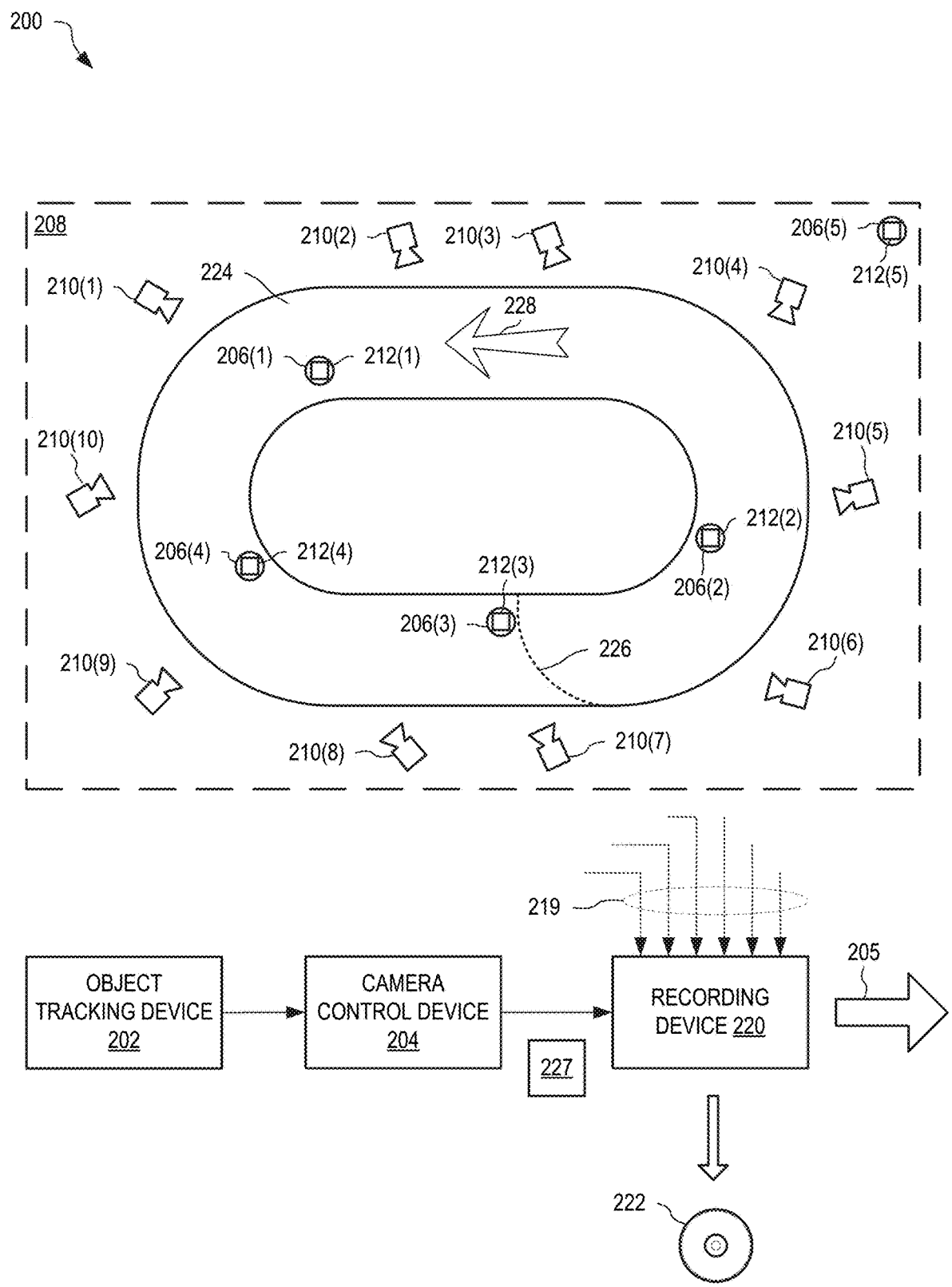
FIG. 2 shows a system for capturing image data of tracked objects moving within a circuit, to facilitate autonomous still and/or moving picture production, in accord with an embodiment.

FIG. 2 shows an exemplary use of a system 200 for capturing image data of tracked objects 206 moving within a circuit 224. Objects 206 for example represent runners, speed skaters, race cars or horses and/or jockeys, and circuit 224 represents a running track, an ice rink, a race track or a horse track, respectively.

System 200 is shown with an object tracking device 202, a camera control device 204, and ten motorized cameras 210. Cameras 210 are situated within or around an operational field 208 that includes circuit 224. Circuit 224 is shown with a starting line 226. Four exemplary objects 206 are shown in FIG. 2, each having a location unit 212. Object tracking device 202 may represent object tracking device 102, FIG. 1; camera control device 204 may represent camera control device 104; operating field 208 may represent operational field 108; cameras 210 may represent cameras 110; and location units 212 may represent location units 112.

Object tracking device 202 utilizes location units 212 to determine location information (e.g., coordinate data 116, FIG. 1) for objects 206 within operational field 208. Object tracking device 202 sends this location information to camera control device 204. Camera control device 204 again may include a model of operational field 208, with coordinates of circuit 224 and each camera 210. Camera control device 204 receives coordinate data of objects 206 from object tracking device 202, determines a possible field of view from each camera 210 to each object 206, and assigns cameras 210 to the objects based upon optimum field of view selection. For example, for each camera 210 and for each object 206, camera control device 206 determines a possible field of view from the camera to the object. Then, by selecting an optimum field of view for each object (e.g., based upon the distance from the camera to the object, the objects position within circuit 224 and whether all objects are assigned to a camera), control device 204 determines which camera 210 to assign to each object 206. Where the number of objects is less that the number of cameras, camera control device 204 may assign more than one camera 210 to an object 206. Where the number of objects is more than the number of cameras, camera control device 204 may assign one or more select cameras 210 to a more important object 206 (e.g., the leader in a race). Each object 206 is for example prioritized such that cameras assignment is also prioritized for that object—in a race, the leader is assigned a higher priority to ensure best camera assignment.

Objects 206 proceed around circuit 224 in a direction indicated by arrow 228. The direction of objects 206 is for example provided to camera control device 204 with object 206 coordinate information. Camera control device 204 uses the directional information for optimal camera assignment to each object 206. As object 206(1) proceeds around circuit 224, camera control device 204 for example selects and controls each camera 210 to capture image data of object 206(1), e.g., based upon distance between object 206(1) to each camera.

In an example of operation, when object 206(1) is located as shown in FIG. 2, camera control device 204 controls camera 210(1) to maintain object 206(1) within the field of view of camera 210(1). As object 206(1) proceeds around circuit 224 and away from camera 210(1), camera control device 204 assigns camera 210(9) to object 206(1) and controls camera 210(9) to maintain object 206(1) within the field of view of camera 210(9). As object 206(1) proceeds yet further around circuit 224 and away from camera 210(9), camera control device 204 assigns camera 210(8) to object 206(1) and controls camera 210(8) to track object 206(1) within camera 210(8)'s field of view. Optionally, camera control device 204 selects more than one camera 210 to simultaneously track object 206(1) within its field of view.

Camera control device 204 may be made aware of movement characteristics (e.g., direction of movement) of an object 206, and accordingly assigns or re-assigns cameras based upon camera fields of view that include the front of object 206. Camera control device 204 for example assumes that the front of object 206 faces forward as it moves, or it may instead be programmed to identify the front of object 206 as the aspect facing the general direction of movement of an event. Camera control device 204 accordingly assigns and controls cameras 210 to capture frontal and side image data of object 206, in preference to rear images.

System 200 also includes a recording device 220 for recording and/or converting image data from each camera. In an embodiment, recording device 220 simultaneously records image data 219 from each camera 210. Image data 219 is therefore a signal or signals representing data bits captured by each camera 210. Recording device 220 includes processing software for converting the received signal into a data stream and interpreting the data stream as a series of images, which are then recorded as video, for example. System 200 is thus suitable for use in autonomous still or moving picture production.

Camera control device 204 sends annotation data 227 to recording device 220 for recording with image data 219. Annotation data 227 includes identification of tracked objects of image data 219. For example, if camera 210(1) is selected to maintain object 206(1) within its field of view, as the image data from camera 210(1) is recorded by recording device 220, camera control device 204 may include identification of object 206(1) within annotation data 227 that is recorded with the image data. As shown, recording device 220 may generate (i.e., burn) a disc 222 (e.g., a DVD or CD disc) representative of the recorded image data.

In one operational example, a runner (e.g., object 206) rents a location device (e.g., location device 212) for a certain period while training at a running track (e.g., circuit 224). System 200 identifies the runner within operational field 208 and object tracking device 202 sends coordinate data of location unit 212 to camera control device 204. Since camera control device 204 is aware of the location and boundaries of circuit 224 within operational field 208 and of movement characteristics of objects 206 (i.e., runners) performing on circuit 224 (i.e., running track), camera control device 204 also determines performance (e.g., lap times, number of laps, average speeds, etc.) of these runners (e.g., object 206(1)) when they behave according to these characteristics within circuit 224. The determined performance is for example included within annotation data 227 and recorded by recording device 220. As the runner 206(3) lines up and remains stationary for a certain period at starting line 226, camera control device 204 determines that runner 206(3) is about to start running laps of circuit 224 and, as runner 206(3) starts moving, camera control device 204 starts a timer for runner 206(3) and measures performance of runner 206(3). When runner 206(3) completes a training session, runner 206(3) obtains (e.g., purchases) a disc 222 that includes video and/or still images of runner 206(3)'s training session and, optionally, performance information.

System 200 may operate to capture image data of objects 206 within the known boundaries of circuit 224. That is, in an embodiment, if an object 206 leaves the area of circuit 224, camera control device 204 no longer assign cameras 210 to that object, thereby no longer recording image data related to objects 206 external to the area of circuit 224. As shown in FIG. 2, object 206(5) is located outside of circuit 224. Even though object 206(5) has an attached location unit 212(5), camera control device 204 need not assign any cameras 210 to object 206(5) until object 206(5) enters circuit 224.

There may be little interest in capturing images of an athlete warming up on the side lines. In an embodiment, circuit 224 is an American football field and camera control device 204 is configured to assign objects 206 to cameras 210, while objects 206 are within a certain area (which may be more or less than the actual football field). However, in this embodiment one or more cameras 210 are continually assigned to selected objects 206 while they are within operational field 208. System 200 thus allows for continuous capture of popular players, even while they are on or off the field. Likewise, in an embodiment, one object 206 is a football, and at least one camera 210 is continually assigned to the football to capture action (e.g., errant throws or sideline tackles) outside the boundaries of the football field.

Recording device 220 may combine annotation data 227 with recorded image data 219 when generating disc 222. Continuing with the above running track example, recording device 220 selects performance data for runner 206(3) and includes this performance data, e.g., as a video overlay, when recording image streams of runner 206(3) onto disc 222. This video overlay is for example formatted as tabulated figures that include lap and cumulative times and/or a graphical representation of runner 206(3)'s performance.

In another embodiment, recording device 220 replays recorded image data 219 and annotation data 227 as a single feed 205 featuring one or more objects 206. Where system 200 is utilized as a training device by a sports team, recording device 220 may be operated to generate image feed 205 by overlaying annotation data 227 onto image data 219 for one or more selected athletes. Thus, recording device 220 automatically displays recorded image streams and performance information of the selected athlete. The video overlay and performance information included therein is variable according to sport and/or preference or selection of a user of recording device 220.

In one embodiment, recording device 220 delivers instant replay images or video streams that include overlaid performance information determined from annotation data 227 for the object(s) 206 associated with image data 219.

In one embodiment, recording device 220 generates live image feed 205 by combining a video overlay of performance information selected from annotation data 227 and image data 219. In particular, recording device 220 of this embodiment matches performance information from annotation data 227 to image data 219 for each object 206 to which a camera 210 is assigned.

In one embodiment, recording device 220 copies recorded image data 219 and associated annotation data 227 to disc 222 for later processing. For example, annotation data 227 and image data 219 of this embodiment may be copied in a raw data format for processing and replay on a separate device (not shown), e.g., a computer with video conversion capabilities.

Figure 3:
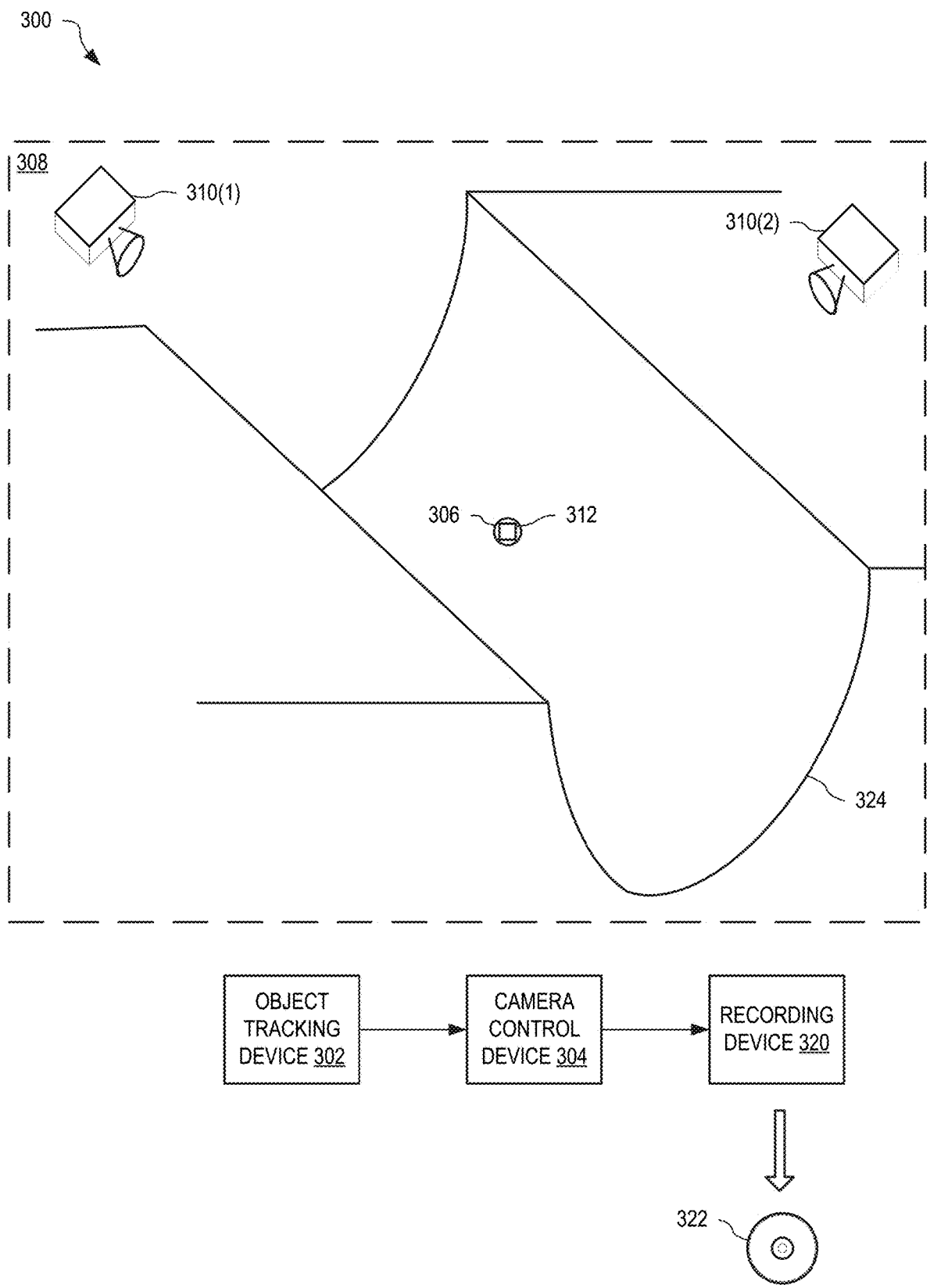
FIG. 3 shows a system for capturing image data of one or more snow athletes performing within a half-pipe, to facilitate autonomous still and/or moving picture production, in accord with an embodiment.

FIG. 3 shows an embodiment of a system 300 that captures images of one or more snow athletes (e.g., snowboarders or skiers) performing within a half-pipe 324. System 300 is similar to systems 100 and 200. System 300 is shown with an object tracking device 302, a camera control device 304, a plurality of cameras 310 and a recording device 320. Half-pipe 324 is located within an operational field 308 of system 300. Operational field 308 is larger than half-pipe 324 such that system 300 identifies each snow athlete 306 as he or she approaches half-pipe 324; it is thus 'prepared' to capture image data of snow athlete 306 prior to important action.

In one operational scenario, one or more snow athletes 306 rent location units 312 for a certain period (e.g., one day or one hour). During this period, if a snow athlete 306 performs within half-pipe 324, system 300 records image data of snow athlete 306's activities within half-pipe 324 and optionally determines and records performance characteristics of athlete 306 within half-pipe 324. Performance characteristics for example include jump height, speed, number of rotations, number of jumps performed, etc. As taught by FIG. 2, identification and performance data for athlete 306 may be recorded with image data of athlete 306 by recording device 320. Recording device 320 may convert the image data and any identification/performance data to digital video to generate a viewable disc (e.g., a DVD), or record the data in raw form, for later processing Once the rental period for location unit 312 is over, recording device 320 generates (i.e., burns) a disc 322 (e.g., a DVD or CD) of athlete 306's performance, including any annotated performance information. Recording device 320 optionally or additionally saves athlete 306's performance to a memory card or like digital media. Alternately or additionally, recording device 320 includes software and program instructions for facilitating download or transmission (even wireless transmission) of athlete 306's performance from recording device 320 to a portable video player, such as an Apple iPod™, a personal computer or a cell phone (e.g., via Bluetooth or another (e.g., cellular) communications link). Likewise, athlete 306's performance may be podcast and a URL provided to athlete 306, for subsequent downloading to a computer, a portable video player or a similar video-capable device.

Figure 4:
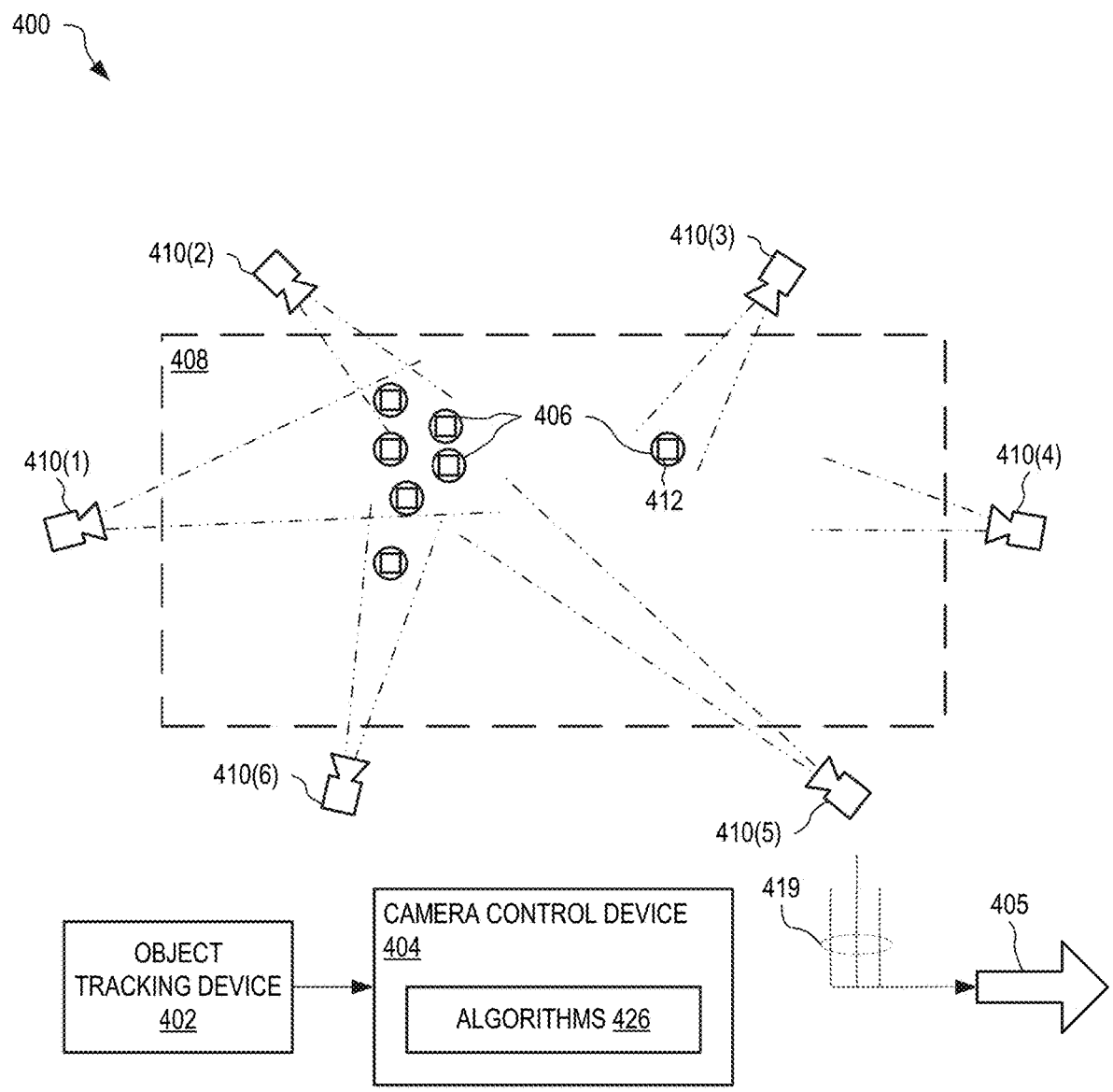
FIG. 4 shows a system for capturing image data of grouped tracked objects, to facilitate autonomous still and/or moving picture production, in accord with an embodiment.

FIG. 4 shows one exemplary embodiment of a system 400 for capturing images of grouped tracked objects 406. System 400 is shown with an object tracking device 402, a camera control device 404, a plurality of cameras 410 and a plurality of location devices 412, each attached to a tracked object 406 within an operational field 408. System 400 is similar to systems 100, 200 and 300 of FIGS. 1, 2 and 3, respectively.

Object tracking device 402 uses location units 412 to determine location information for each tracked object 406 within operational field 408. This location information is sent to camera control device 404, which assigns one or more cameras 410 to each tracked object 406, for example based upon the location of cameras 410 and objects 406. Camera control device 404 outputs image data 419 received from cameras 410 as a live feed 405.

In an embodiment, camera control device 404 includes algorithms 426 that are tailored to various sports, taking into account their unique object movement characteristics. Algorithms 426 for example include characteristics for one or more of objects 406 (i.e., certain players or positions); thus, camera control device 404 is 'aware' of expected behavior of these objects within operational field 408. Where system 400 is operating at a soccer game, for example, algorithms 426 may govern assignment or reassignment of one or more cameras to a group of objects, to capture and/or maintain action in the vicinity of the soccer ball within the field of view of the camera(s). Cameras 410 are for example controlled to 'zoom in' on an area occupied by the group of objects, and to zoom out as the group disperses. Algorithms 426 for example govern camera control device 404 operations to maintain a certain number of tracked objects 406 within the field of view of a particular camera 410. Other cameras 410 may be simultaneously controlled by camera control device 404 to maintain assigned objects within their fields of view.

In one example of operation, one tracked object 406 is a ball used within a sport being played within operational field 408 by players 406. The ball for example has an embedded location unit 412. Since in many ball sports most of the relevant sporting action occurs in the location of the ball, by determining the ball location and selecting an appropriate field of view, sporting action is automatically tracked by one or more cameras 410. Further, by including algorithms (e.g., algorithms 426) that evaluate certain characteristics of the determined ball movement, sporting plays may be anticipated and captured.

Figure 5:
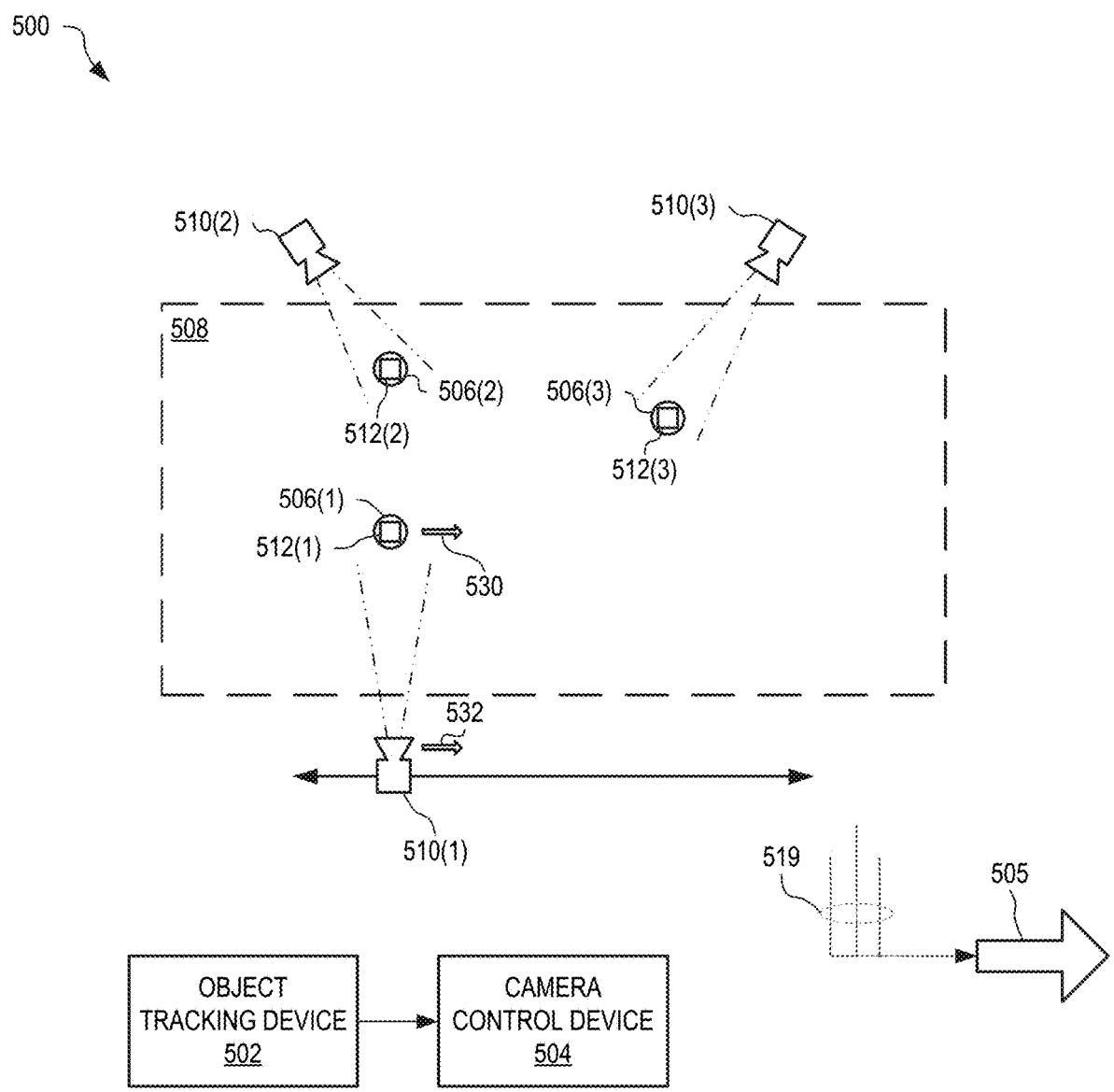
FIG. 5 shows a system that uses a mobile camera to capture image data of tracked objects, to facilitate autonomous still and/or moving picture production, in accord with an embodiment.

FIG. 5 shows an embodiment of a system 500 with a mobile camera 510(1) for capturing image data of tracked objects 506. System 500 is shown with an object tracking device 502, a camera control device 504, a mobile camera 510(1), two fixed position cameras 510(2) and 510(3) and a plurality of location devices 512, each attached to a tracked object 506 within an operational field 508. System 500 is, for example, similar to systems 100, 200, 300 and 400 of FIGS. 1, 2, 3 and 4, respectively. Camera control device 504 receives image data 519 from each camera 510 that is output as a live feed 505. System 500 may have more mobile cameras without departing from the scope hereof.

In system 500, mobile camera 510(1) is horizontally mobile and laterally mobile (e.g., mounted upon a laterally mobile platform such as a wire strung between two structures) and its lateral position is controlled by camera control device 504. Mobile camera 510 may also be vertically mobile.

In an example of operation, object 506(2) is assigned to camera 510(2), object 506(3) is assigned to camera 510(3) and object 506(1) is assigned to camera 510(1). Cameras 510(2) and 510(3) are controlled by camera control device 504 to maintain objects 506(2) and 506(3), respectively, within their fields of view. As object 506(1) moves (as indicated by arrow 530), camera control device 504 controls camera 510(1) such that camera 510(1) moves (arrow 532) at a similar speed and in the direction of object 506(1) and maintains object 506(1) within the field of view of camera 510(1), without losing quality of imagery of object 506(1). By controlling the lateral position of camera 510(1), further enhancements in the quality of captured images may result. In the case of an American football game, where camera 510(1) is assigned to a receiver, imaging of plays involving this receiver may benefit from the mobility of camera 510(1), since camera 510(1) is automatically controllable to 'follow' the receiver down the field.

Continuing with this American football example, by including a location unit 512 within the ball, camera control device 504 determines and predicts angles between the ball, the receiver and the camera to allow optimal selection, positioning and field of view for camera 510(1) to capture expected 'plays.' System 500 may thereby provide higher quality imagery than conventional recording setups.

In another example of operation, at sports related events where large television screens are provided to show live action and instant replays, systems 100, 200, 300, 400 and 500 may be used to provide both live and instant replay images (e.g., still and/or moving pictures) to these television screens. At such events as an American Football game, a production team selects camera views and replay clips for display upon these television screens. An operator watches the sporting event and provides certain 'event' inputs to an image recording device, such that an instant replay, should it be requested by a producer, may be selected for display. Based upon these event inputs, digitization software marks digitally recorded 'clips' thereby allowing rapid selection and replay of these clips as needed. Continuing with the American football example, the operator indicates to the digitization software when the snap happens, when the whistle blows and indicates a play type (play action pass, play action run, roll out, etc.) that has occurred. The digitization software marks image data related to these events, and the marked clips are immediately available to the producer for instant replay. Systems 100, 200, 300, 400 and 500 may also operate in this manner, with the advantage that image data from each camera may be simultaneously marked and clipped for picture production, thereby providing a plurality of camera angles for the instant replay. Further, since each tracked player is identified within annotation data associated with the image data captured for that player, the producer may identify the image clips by one or more of (a) the position (and/or name) of the player, (b) the type of event and (c) the time of the event. A database may be used to track camera/object assignments at any given time, thereby facilitating recall of specific image clips.

Figure 6:
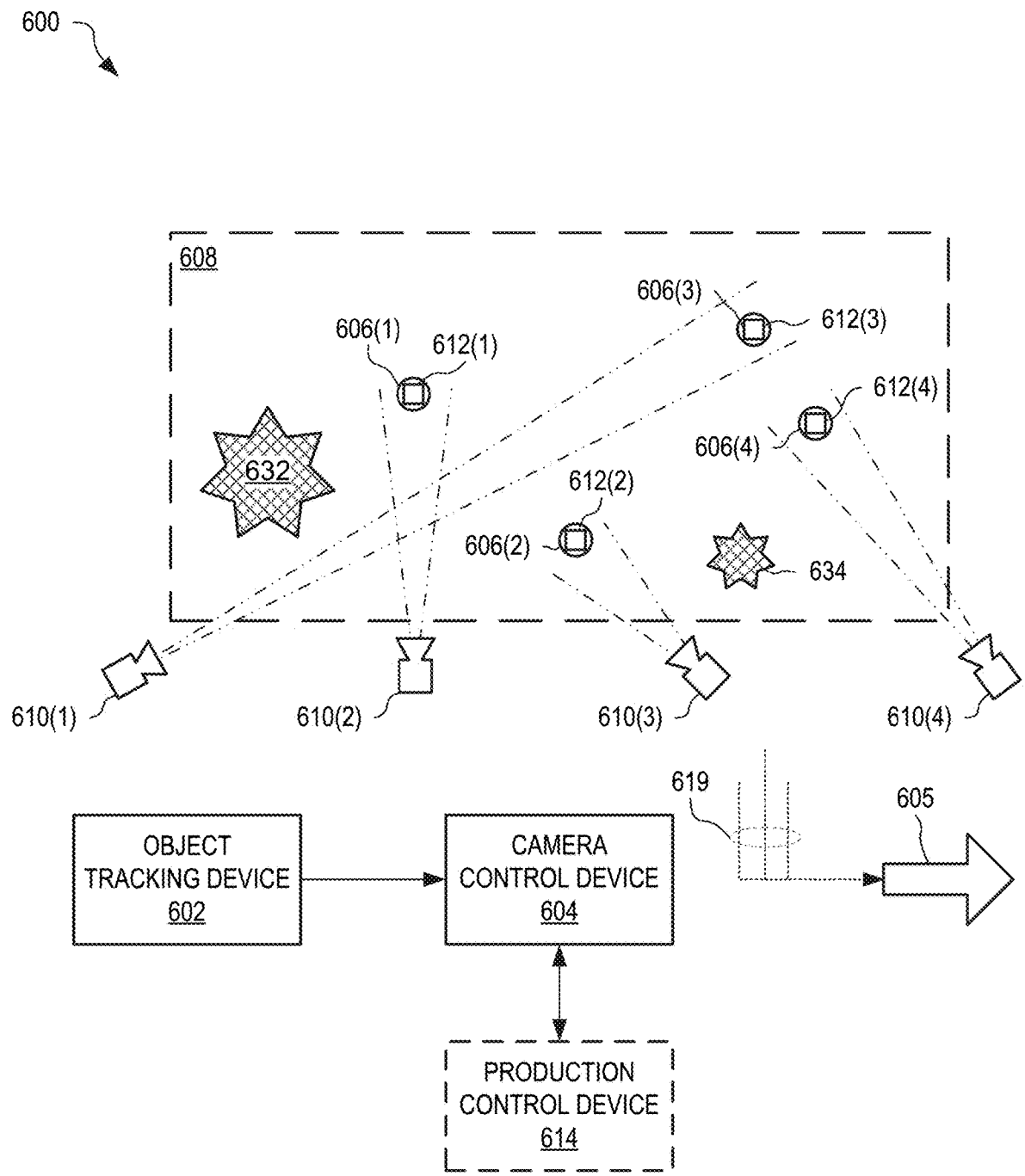
FIG. 6 shows a system for capturing unobstructed image data of tracked objects, to facilitate autonomous still and/or moving picture production, in accord with an embodiment.

FIG. 6 shows an embodiment of a system 600 that captures unobstructed image data and/or recording unobstructed images of tracked objects 606. System 600 is, for example, similar to systems 100, 200, 300, 400 and 500 of FIGS. 1, 2, 3, 4 and 5, respectively. In particular, system 600 has an object tracking device 602, a camera control device 604, a plurality of cameras 610 and a plurality of location units 612, each attached to one object 606 within an operational field 608. Image data 619 from each camera 610 is output as a live feed 605. System 600 is also shown with an optional production control device 614, external to camera control device 604. In an alternate embodiment, functionality of production control device 614 is included within camera control device 604.

Operational field 608 is shown including two visual obstructions 632 and 634; these visual obstructions 632, 634 are for example structural objects such as pillars within an arena, visual props, speaker stacks on a stage, referees, non-star players or other objects that obstruct an object 606 from a camera 610. Camera control device 604 receives coordinate data from object tracking device 602 for each location unit 612 within operational field 608, is aware of the location of each camera 610 and is aware of the location and size of each visual obstruction 632 and 634. Thus, camera control device 604 determines if each object 606 (e.g., a musician, performer or athlete) is visually obstructed from each camera 610 by visual obstructions 632, 634 or other objects 606.

In particular, in the example of FIG. 6, camera control device 604 may determine that object 606(3) is visually obstructed from cameras 610(2), 610(3) by object 606(2), and visually obstructed from camera 610(4) by object 606(4). Camera control device 604 therefore assigns camera 610(1) to object 606(3) and maintains object 606(3) within the field of view of camera 610(1). Similarly, camera control device 604 may determine that the line of sight between camera 610(1) and object 606(1) is obscured by obstruction 632, the line of sight between camera 610(3) and object 606(1) is obscured by object 606(2) and the line of sight between camera 610(4) and object 606(1) is obscured by obstruction 634. Camera control device 604 therefore pairs object 606(1) with unobstructed camera 610(2) to capture image data 619 related to object 606(1). Camera 610(2) is controlled to maintain object 606(1) within its field of view. The field of view of camera 610(3) is similarly obscured for objects 606(1), 606(3) and 606(4), and therefore camera control device 604 assigns camera 610(3) to object 606(2) and maintains object 606(2) within the field of view of camera 610(3). Camera control device 604 then assigns object 606(4) to camera 610(4) and maintains object 606(4) within the field of view of camera 610(4), for example after determining that objects 606(1), 606(2) and 606(3) are obscured from view by camera 610(4) by obstruction 634 and object 606(4).

It should be noted that since each object 606 is also tracked within operational field 608, camera control device 604 may determine whether a field of view of one object 606 (e.g., a star player) is blocked by another object 606 (e.g., a referee or a non-star player). Further, since each object may move within operational field 608, camera control device 604 may predict if one object is about to be blocked by another object or by a non-movable obstruction and select an alternate field of view prior to the obstruction.

Camera control device 604 may continuously evaluate each possible field of view from each camera to determine optimum camera selection as objects 606 move within operational field 608. Further, camera control device 604 may include selection hysteresis to prevent repeated and/or too rapid camera and/or field of view switching.

In an embodiment, production control device 614 provides user input for manual camera selection based upon indicated images and predicted field of view obstructions as objects 606 move within operational field 608.

In an embodiment, camera control device 604 models operational field 608, cameras 610, objects 606 and obstructions 632, 634 to determining optimal field of view selection.

Where operational field 608 of system 600 represents a baseball field and stadium, the trajectory of a hit ball (determined by system 600 where the ball includes a location unit 612, or determined by external means and relayed to system 600) may be evaluated within camera control device 604 to determine where the ball will land. Camera control device 604 controls one or more cameras 610 to image the predicted landing location of the ball.

As appreciated, systems 100, 200, 400, 500 and 600 may be utilized in virtually any sport. These systems may be used to provide features that have never before been available to "high end" TV production applications. Further, these systems may enable "low end" applications to have access to "fully automated" sports TV production without requiring skilled operators.

Figure 7:
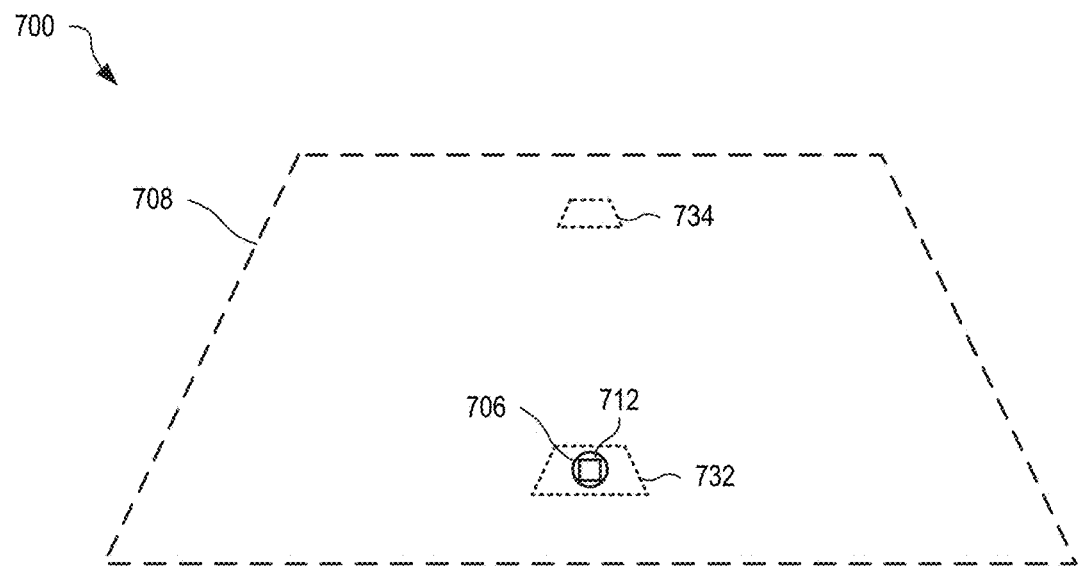
FIG. 7 illustrates exemplary control zones within an operational field.

FIG. 7 shows a partial perspective view of a camera control system 700 with exemplary control zones 732 and 734 within an operational field 708 that may represent any one of operational fields 108, 208, 308, 408, 508 and 608 of FIGS. 1, 2, 3, 4, 5 and 6, respectively. Operational field 708 may have more or fewer control zones without departing from the scope hereof. In FIG. 7, an object 706 and an attached location device 712 are located within control zone 732. Object 706 for example represents a referee, and operational field 708 represents an American football field. Control zones 732 and 734 represent locations upon the football field where the referee stands to address a camera when delivering adjudication of play. System 700 uses control zones 732 and 734 to attach additional information to recorded image data. Continuing with the American football example, upon detecting the referee (an object 706) within any one of these control zones, camera control system 700 may automatically include output from the referee's microphone with the associated image data.

Figure 8:
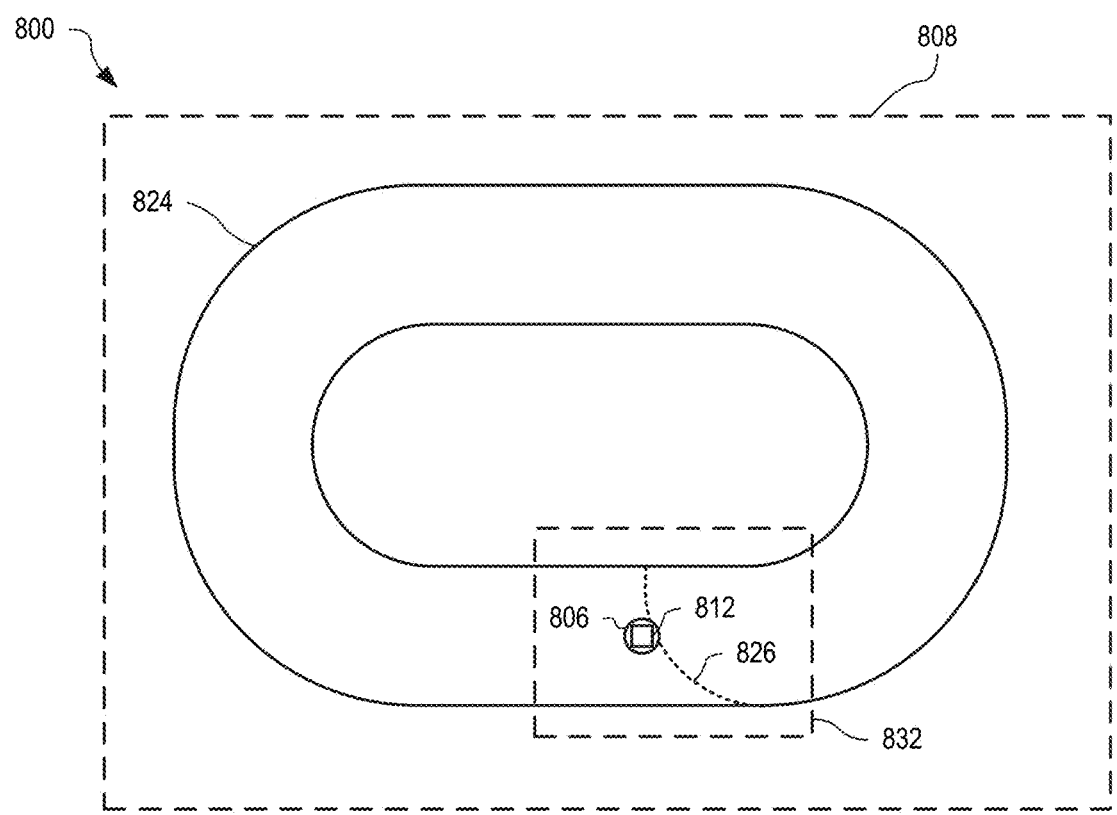
FIG. 8 illustrates an exemplary control zone within an operational field that includes a running track.

FIG. 8 shows a partial view of one exemplary camera control system 800, illustrating a control zone 832 within an operational field 808 that includes a circuit 824. Circuit 824 may represent circuit 224 of FIG. 2. In the example of FIG. 8, zone 832 represents an area in the vicinity of a starting line 826. A location unit 812 is attached to an object 806 (e.g., a runner) who is preparing to start a training session by standing still at starting line 826 within zone 832. As previously noted with regard to FIG. 2, the stationary nature of object 806 at starting line 826 may indicate the start of the training session. Further, as described below with respect to FIGS. 9-11, control zone 832 allows object 806 to provide additional information to system 800.

Figure 9:
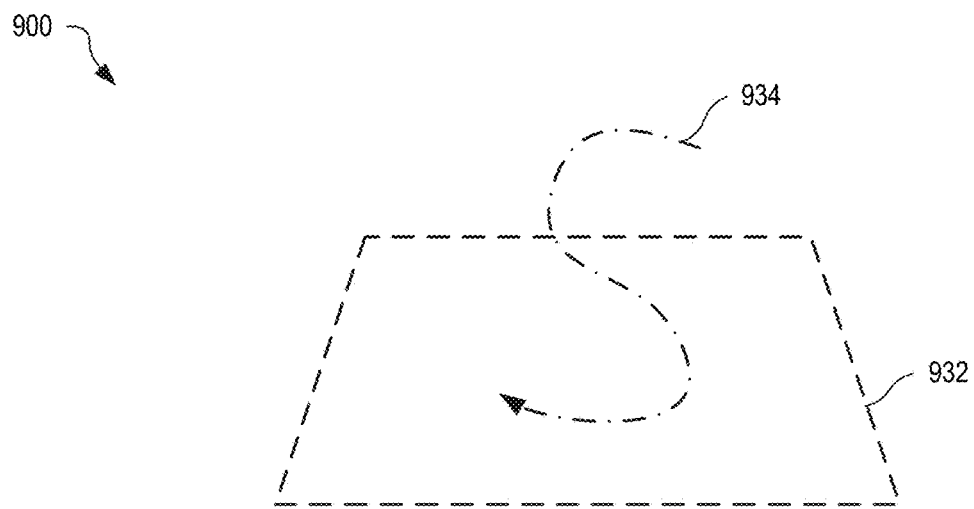
FIGS. 9, 10 and 11 are perspective views of exemplary control traces made within control zones to provide additional information to camera control devices.
Figure 10:
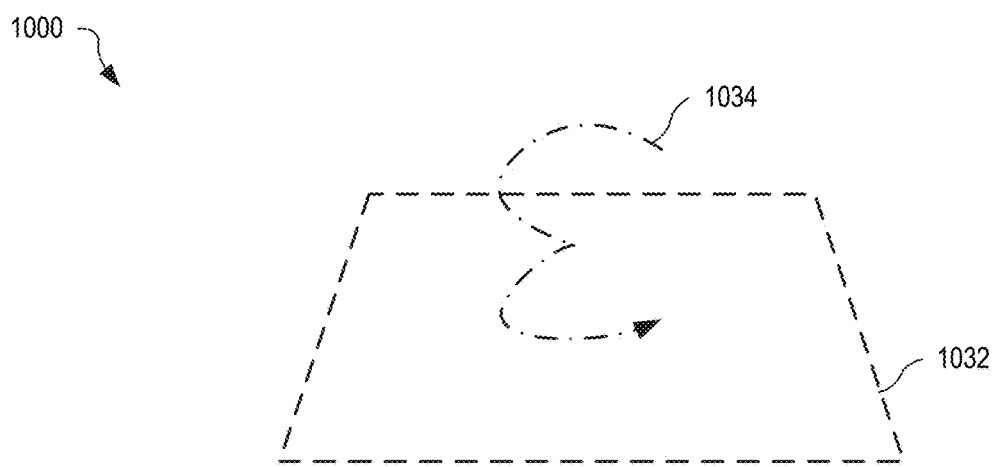
Figure 11:
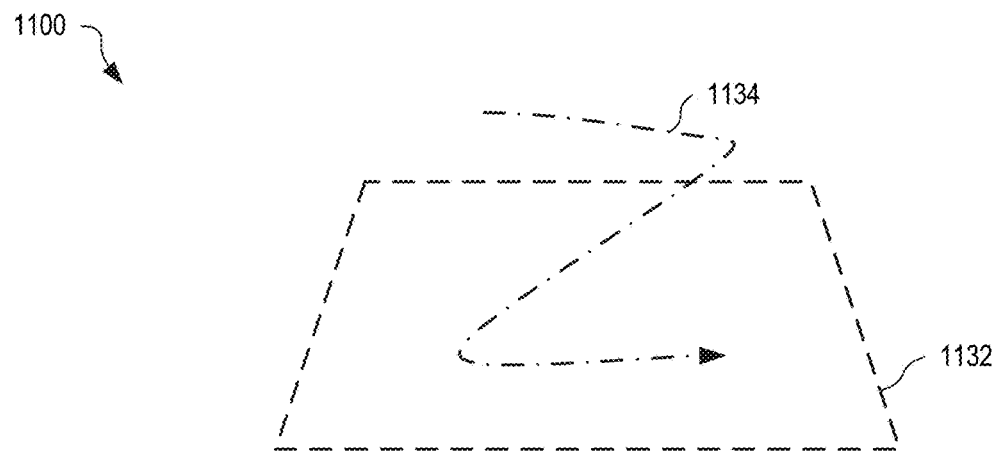

FIGS. 9, 10 and 11 show perspective views 900, 1000 and 1100 illustrating camera control traces for camera control; in particular these views detail exemplary control zones 932, 1032 and 1132, respectively, which may represent any of control zones 732, 734 and 832, and which may be employed with any of systems 100, 200, 300, 400, 500 and 600. Within these control zones, location devices (not shown) may be put through traces 934, 1034 and 1134, to command camera control devices 104, 204, 304, 404, 504 and 604 (not shown).

FIGS. 7, 8, 9, 10 and 11 are best viewed together with the following description. Camera control devices and location units are not shown for clarity of illustration. In an embodiment, movements of location devices within zones 732, 734, 832, 932, 1032 and 1132 are analyzed by the camera control device, and predetermined commands are implemented to the camera control device when movements of location devices correspond to control zones. For example, as shown in FIG. 9, trace 934 is a letter 'S'. Moving a location device (e.g., attached to a player, runner or referee) through trace 934 communicates the start of a certain 'event' or 'action' to a camera control device. S-shaped trace 934 for example commands and cues the recording device to begin recording image data of the object (e.g., the player, runner or referee) that puts the location device through trace 934. Similarly, trace 1034 is shown as a letter 'E'. Making E-shaped trace 1034 with a location device tells the camera control device to stop recording image data for the object associated with that location device. Trace 1134 is shown as a letter 'Z.' Upon detecting Z-shaped trace 1134, the camera control device may 'zoom-in' to maximize the object associated with the Z-shaped trace within a camera's field of view. In one example of use, a sports official attaches a location unit to one or both wrists to allow a camera control device to recognize gestures indicating impending announcements or judgments.

In an embodiment, a control zone covers the entire operational field, such that a camera control device recognizes traces made by any location device, anywhere on the operational field. Alternately, only traces made by specified location units on the field are recognized by the camera control device. In another example, an athlete within the operational field wears a 'traceable' location device and uses predetermined traces to 'mark' image data corresponding to game events, for later viewing.

Where system 100, 200, 300, 400, 500 and/or 600 is used on a ski slope or upon a ski race course, certain deviations from expected behavior of each object may cause camera control devices 104, 204, 304, 404, 504 and 604 to generate an alert, such as to indicate a fallen skier (i.e., the skier does not move for a certain period, which may be recognized by the camera control device as indicating a need for assistance). In an embodiment, location units are provided for each skier (e.g., built into the ski pass) and a camera control device (104-604) detects and records undesirable behavior, such as excessive speed, with one or more cameras, thereby providing evidence for disciplinary measures. In addition, cameras may be located at strategic locations on a slope or within a terrain park. A skier or snowboarder that wishes to be recorded within such a strategic location checks out a location unit and (within a control zone associated with the location) makes a trace (e.g., the 'S' trace of FIG. 9) to initiate a 'recording session.' The individual is identifiable based upon identifying data of his or her location unit (as described above with respect to FIGS. 1 and 2), to facilitate delivery of recorded image data, pictures, video or video streams. DVDs or CDs of the individual's recording session are for example generated, or a URL linking to the recorded session are provided, upon payment for a checked-out location unit.

In an embodiment, where systems 100, 200, 300, 400, 500, 600 and 700 provide a live feed to a television network, if a short delay is incorporated in the feed (as occurs with the $1^{st}$ and 10 yellow line in televised football), camera selection is automatically made without the risk of 'choppy' results. Each camera control device (or production control device) includes one or more algorithms to determine which image stream from multiple cameras to select for the best quality feed. Quality of feed is maintained by predicting and editing images or swapping fields of view where the targeted object becomes obscured by other objects within the operational field. However, if the field of view of the target object is only obscured for a few video frames, it would be distracting to swap to another field of view and then back again. A delay incorporated into the live feed facilitates identification of such swapping events before any undesirable field of view swap occurs. Similarly, algorithms may be employed to track and predict object movement, to reduce capture of image data while a target object is obscured from a camera's field of view.

Where the image feed is processed for later replay (i.e., not live), a single composite video feed may be created using a buffer window of arbitrary size that allows automatic selection of image stream based upon annotation data and determination of obscured target objects. This assumes that the location information is included within the annotation data that is stored with the image stream.

Figure 12:
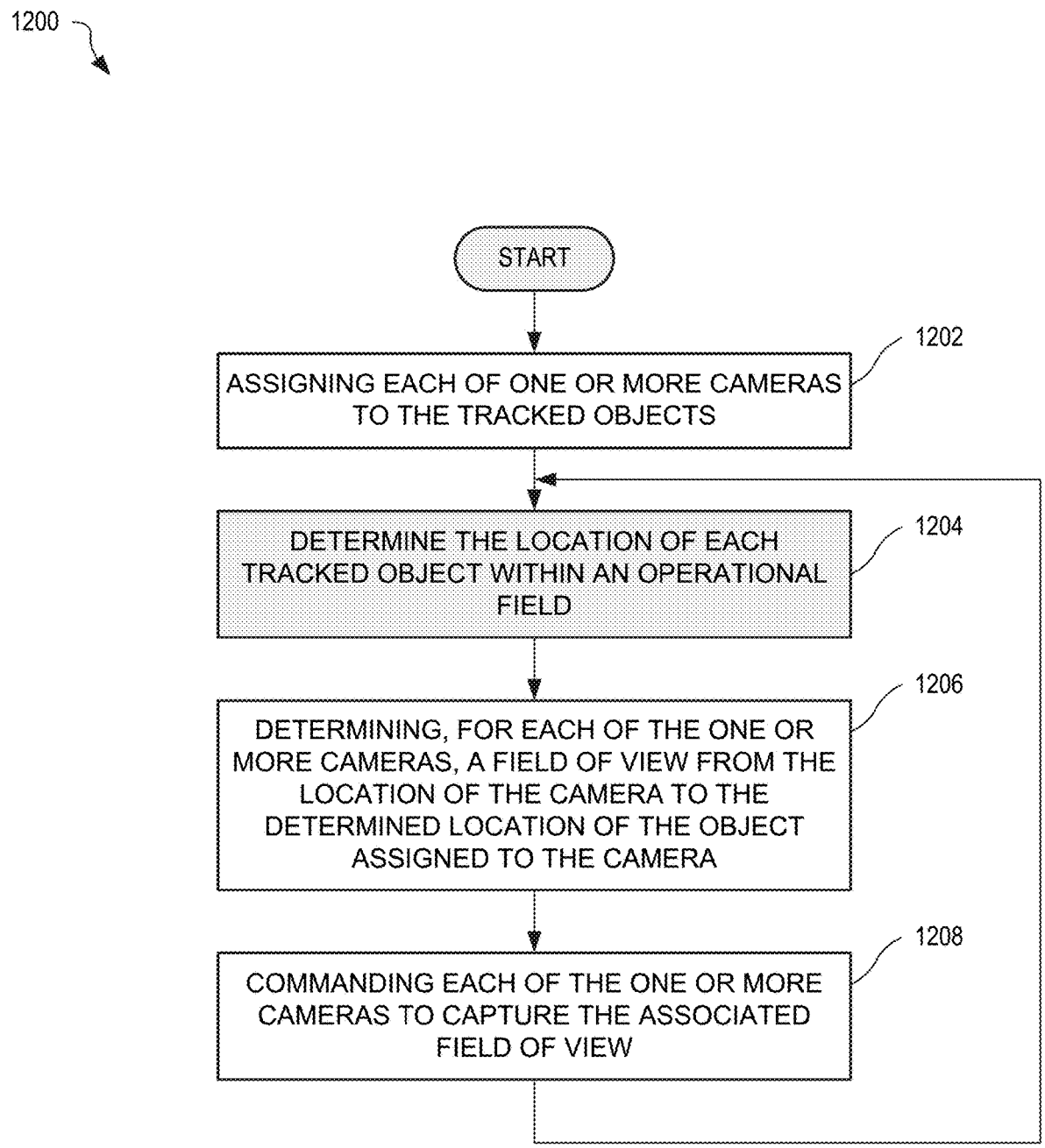
FIG. 12 shows an exemplary process for capturing image data of tracked objects in autonomous still and/or moving picture production, in accord with an embodiment.

FIG. 12 shows one exemplary process 1200 for capturing image data of tracked objects; process 1200 may be performed autonomously (and automatically) to produce image data that is for example suitable for still and/or moving picture production. Process 1200 is, for example, implemented by one or more of location units 112, cameras 110, object tracking device 102 and camera control device 104 of FIG. 1 (that is, the processing intelligence that implements process 1200 may be implemented by one of these devices (e.g., typically the camera control device) or shared among different devices since communication exists therebetween). In step 1202, process 1200 assigns each of one or more cameras to the tracked objects. In one example of step 1202, camera 110(1) of FIG. 1 is assigned to object 106(1) and camera 110(2) is assigned to object 106(3). In another example of step 1202, a user interacts with user interface 114 to assign object 106(1) to camera 110(1) and to assign object 106(3) to camera 110(2). In step 1204, process 1200 determines the location of each tracked object within an operational field. In one example of step 1204, object tracking device 102 interacts with location units 112(1), 112(2), 112(3) and 112(4) within operational field 108 to determine location of objects 106(1), 106(2), 106(3) and 106(4), respectively, and then sends coordinate data 116(1), 116(2), 116(3) and 116(4) of objects 106(1), 106(2), 106(3) and 106(4), respectively, to camera control device 104. In step 1206, process 1200 determines, for each of the one or more cameras, a field of view from the location of the camera to the determined location of the object assigned to the camera. In one example of step 1206, camera control device 104 determines field of view 120(1) for camera 110(1), such that field of view 120(1) includes object 106(1), and field of view 120(2) for camera 110(2) such that field of view 120(2) includes object 106(3). In step 1208, process 1200 commands each camera to capture the determined field of view. In one example of step 1208, camera control device 104 controls cameras 110(1) and 110(2) to capture fields of view 120(1) and 120(2), respectively. Steps 1204 through 1208 repeat such that as objects (e.g., objects 106) move within the operational field (e.g., operational field 108), cameras (e.g., cameras 110) are controlled (e.g., by camera control device 104) to maintain the assigned objects within their fields of view.

Figure 13:
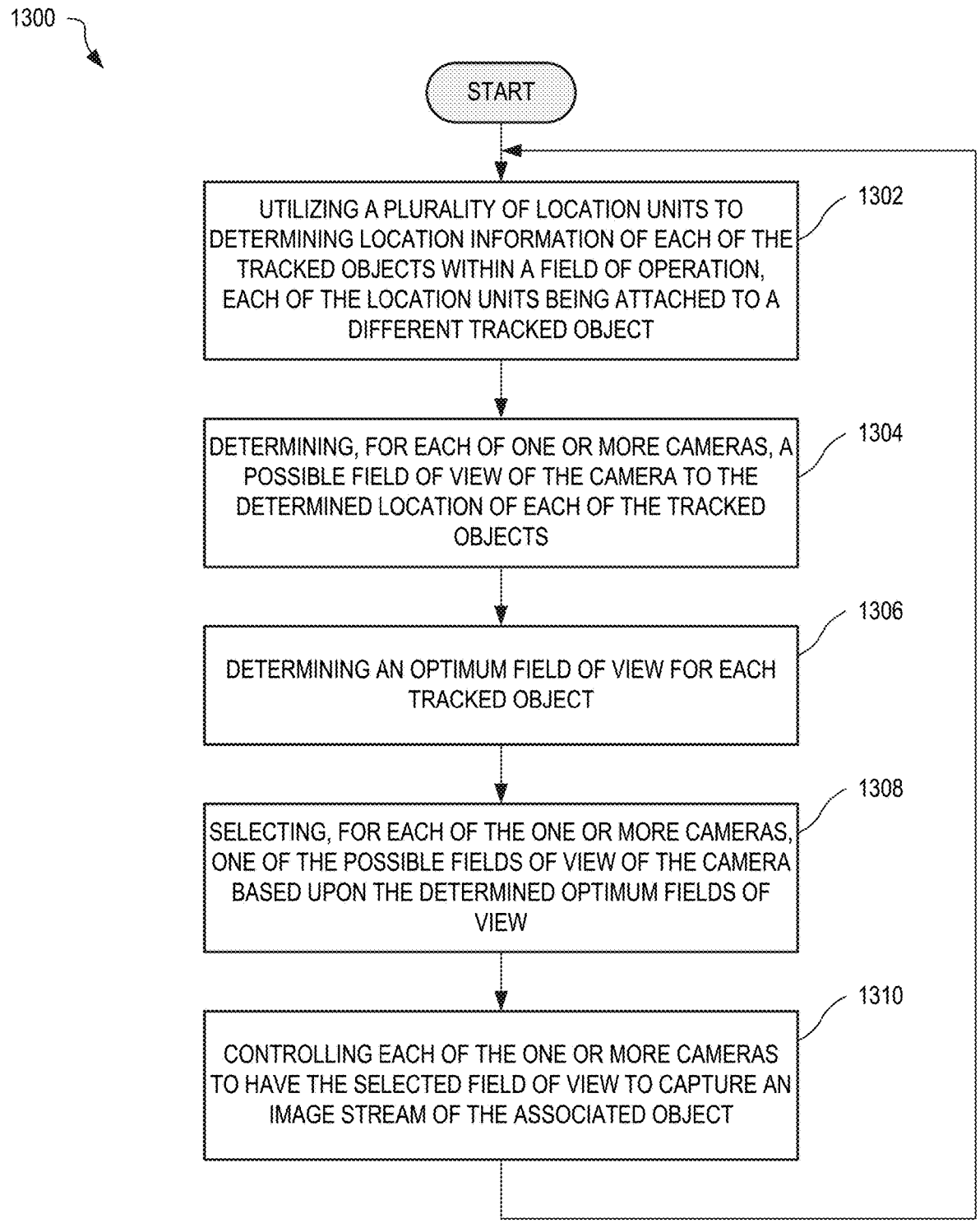
FIG. 13 shows an exemplary process for capturing unobstructed image data of tracked objects in autonomous still and/or moving picture production, in accord with an embodiment.

FIG. 13 is a flowchart illustrating one exemplary process 1300 for capturing unobstructed images of tracked objects; process 1300 may be performed autonomously (and automatically) such that images are for example suitable for use in still and moving picture production. Process 1300 is, for example, implemented by one or more of location units 212, cameras 210, object tracking device 202 and camera control device 204 of FIG. 2. In step 1302, process 1300 determines location of each of the tracked objects within an operational field, using location units attached to the tracked objects. In one example of step 1302, object tracking device 202 determines location information for each of objects 206 within operational field 208, using location units 212, and sends this location information to camera control device 204. In step 1304, process 1300 determines, for each of one or more cameras, a possible field of view of the camera to the determined location of each of the tracked objects. In one example of step 1306, camera control device 204 determines a possible field of view of each camera 210 to include each object 206 based upon the location of cameras 210 and the location of objects 206 determined by object tracking device 202. In step 1306, process 1300 determines the optimum field of view for each tracked object. In one example of step 1306, camera control device 204 evaluates each possible field of view of each camera 210 of each object 206 to determine an optimal field of view selection for each camera 210. In step 1308, process 1300 selects, for each of the one or more cameras, one of the possible fields of view of the camera based upon the determined optimum fields of view. In one example of step 1308, camera control device 204 selects, for each of cameras 210, one possible field of view of the camera based upon optimum fields of view determined for each object 206. In step 1310, process 1300 controls each of the one or more cameras to have the selected field of view to capture an image stream of the associated object. In one example of step 1310, camera control device 204 controls each of cameras 210 to capture image streams of at least one object 206 based upon the field of view selected for the camera.

Steps 1302 through 1310 are repeated periodically such that the tracked objects (e.g., objects 206) are maintained within the field of view of one or more cameras (e.g., cameras 210).

Figure 14:
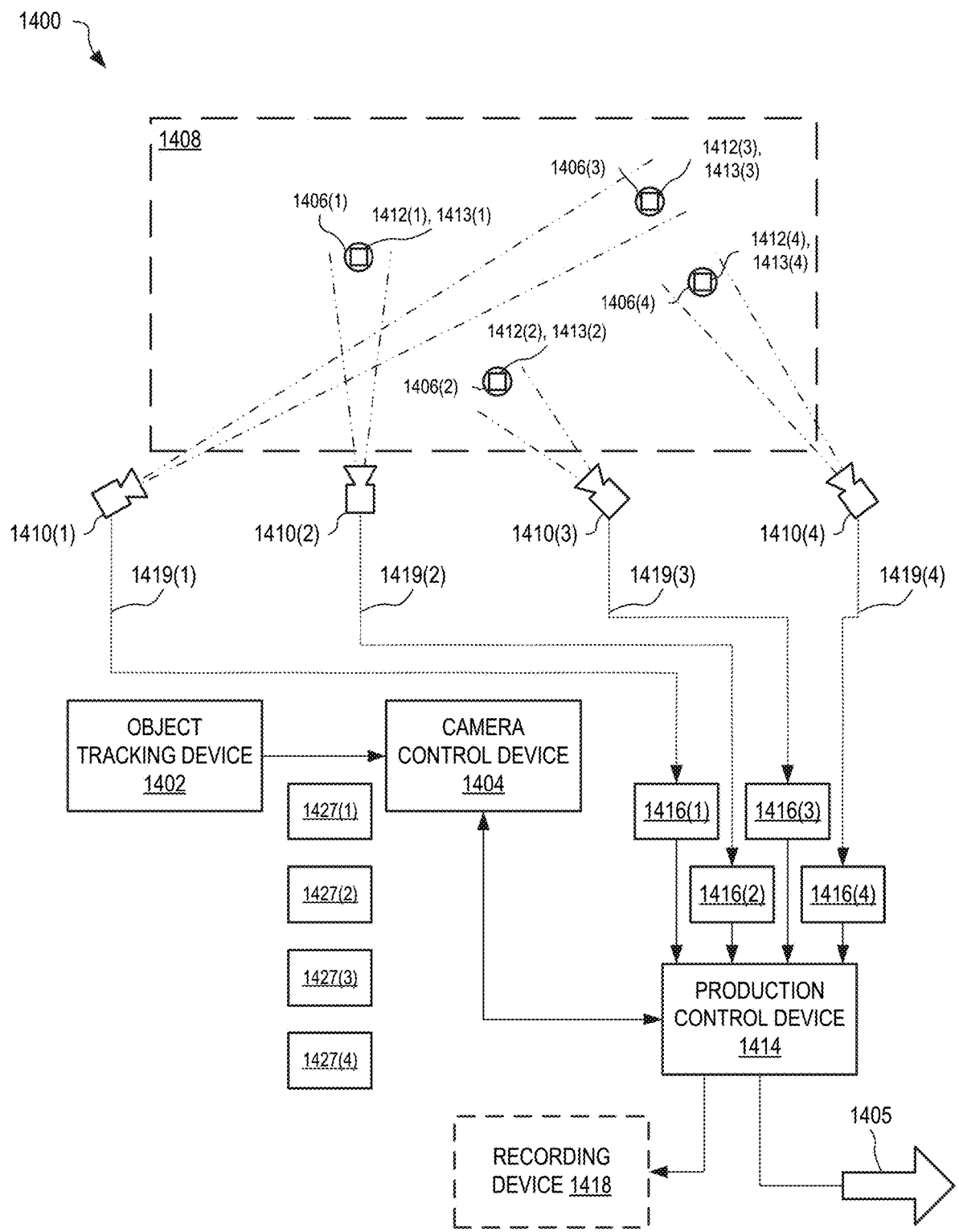
FIG. 14 shows an exemplary system for capturing image data of tracked objects and determining events of interest related to the tracked objects, to facilitate autonomous still and/or moving picture production, in accord with an embodiment.

FIG. 14 shows a system 1400 for capturing image streams 1419 of tracked objects 1406. System 1400 is, for example, similar to systems 100, 200, 300, 400, 500 and 600 of FIGS. 1, 2, 3, 4, 5 and 6, respectively. In particular, system 1400 has an object tracking device 1402, a camera control device 1404, a plurality of cameras 1410 and a plurality of location units 1412, each attached to one object 1406 within an operational field 1408. In one embodiment, image streams 1419 from each camera 1410 are input into image stream buffers 1416 that delay each image stream 1419 prior to its arrival at a production control device 1414. Production control device 1414 selects and switches between delayed image streams 1419 to produce a live feed 1405. In an alternate embodiment, functionality of production control device 1414 is included within camera control device 1404.

Camera control device 1404 receives annotation data 1427 (that includes coordinate data) from object tracking device 1402 for each location unit 1412 within operational field 1408 and is aware of the location of each camera 1410. Thus, camera control device 1404 determines and assigns one or more of objects 1406 to each camera 1410.

Camera control device 1404 may for example use any one or more of the previously disclosed methods and algorithms to assign camera 1410(1) to object 1406(3) and maintain object 1406(3) within the field of view of camera 1410(1). Similarly, camera control device 1404 may pair: object 1406(1) with camera 1410(2) to capture image data related to object 1406(1); camera 1410(3) with object 1406(2) to capture of image data related to object 1406(2), and object 1406(4) with camera 1410(4) to capture of image data related to object 1406(4).

In one embodiment, camera control device 1404 continuously evaluates each possible field of view from each camera to determine optimum camera selection as objects 1406 move within operational field 1408. Further, camera control device 1404 includes selection hysteresis to prevent repeated and/or too rapid camera and/or field of view switching.

Object tracking device 1402 receives annotation data 1427(1) from location unit 1412(1); annotation data 1427(2) from location unit 1412(2); annotation data 1427(3) from location unit 1412(3), and annotation data 1427(4) from location unit 1412(4). Object tracking device 1402 sends annotation data 1427 to camera control device 1404 which in turn sends it to production control device 1414. In addition to coordinate data, annotation data 1427 may include sensed or relayed data indicating conditions or happenings related to or affecting object 1406 (such as weather information received from a remote weather station) and biometric information (e.g., heart rate, respiratory rate, etc.). In FIG. 14, a sensor module 1413 is shown collocated with location unit 1412 to sense biometric information of object 1406 and transmit that information to object tracking device 1402. Sensor 1413 may be configured with location device 1412 or may operate independently from location unit 1412. In one embodiment, production control device 1414 includes (or uses) a recording device 1418 for recording each image stream 1419 together with its associated annotation data. In another embodiment, camera control device 1404 utilizes biometric information within annotation data 1427 to determine optimal camera assignment.

Optimal camera assignment may be determined by identifying events of interest from the biometric information within annotation data 1427. For example, a sudden increase in an athlete's heart rate may indicate an event of interest; detection of a competitor catching "big air" may indicate an event of interest; a skier losing control may indicate an event of interest, and a racing car becoming inverted may indicate an event of interest. By identifying certain characteristics within received annotation data 1427, camera control device 1404 and/or production control device 1414 are notified of events of interest within operational field 1408. Production control device 1414 may thus determine which image streams 1419 to send to recording device 1418 or to output as live feed 1405.

As noted above, annotation data 1427 may also include information related to external conditions, such as weather, that affect an object 1406. Object tracking device 1402 may, for example, receive weather reports from a remote weather station during a yachting competition, and record the weather information with image streams 1419 of boats participating in the competition. Where operational field 1408 is large (e.g., a wide geographical, as used in yachting), weather information may be considered an event of interest. Production control device 1414 may determine which image streams 1419 capture the event of interest, and may thus send these image streams 1419 to recording device 1418 or output these streams as live feed 1405. Optionally, if weather conditions such as heavy rains would prevent capture of clear images at a particular location, production control device 1414 may filter out images streams from the particular location, and record/output images captured by cameras at other locations. Optionally or additionally, cameras 1410 may be controlled to capture image streams from the locations of interest and/or in response to an event of interest. For example, object 1406 may be a receiver wearing an object tracking device 1402. A pass from a quarterback (also wearing a location device) to the receiver may constitute an event of interest that triggers capture of images or image streams 1419 of the quarterback and the receiver, in an attempt to capture a catch by the receiver. The football passed between the quarterback and the receiver may likewise have a location unit, such that trajectory of the ball from the quarterback in the direction of the receiver may be determined and cameras 1410 controlled to capture the predicted catch by the receiver.

In an embodiment, annotation data 1427 includes information pertaining to snow conditions at various locations on a cross-country ski course. Annotation data 1427 may thus be used to predict locations of interest—those areas where events of interest (e.g., falls or particularly fast paces) might occur. Camera control device 1404 and/or production control device 1414 are notified of predicted locations of interest within operational field 1408. Production control device 1414 may thus determine which image streams 1419 to send to recording device 1418, or to output as live feed 1405.

In particular, within production control device 1414, annotation data 1427 is received prior to any associated image streams, since each image stream 1419 is delayed by image stream buffer 1416. Thus, upon detection of an event of interest within annotation data 1427(3), for example, production control device 1414 transitions to output delayed image stream 1416(3) as live feed 1405. In one example, where production control device 1414 is used for post-processing of recorded image streams 1419, annotation data 1427 associated with each image stream is processed to identify and alert a producer (i.e., a user of production control device 1414) to events of interest, thereby facilitating the post-production process. This annotation data may be encoded visually within the associated image stream to enhance viewer experience.

In one embodiment, system 1400 utilizes annotation data 1427 to determine events of interest recorded (e.g., on recording device 1418) throughout a defined period (e.g., one day). These events may be identified and output as a slightly delayed live feed 1405, or recorded for later display. For example, system 1400 may record athletes performing on a slalom course or within a half-pipe at a terrain park. Then, at the end of the day, system 1400 displays the ten most significant recorded events (such as the top ten runs of the day, or the top ten "big air" moments of the day) within a bar area of a lodge associated with the terrain park. These events are for example automatically identified and compiled into a recording by production control device 1414 and recording device 1418. In another example, system 1400 is used to record an American football match and allow post game display of events identified by processing of associated annotation data. In particular, a coach may define certain parameters within the annotation data that are of interest, thereby allowing identification of these events and easy retrieval of associated image streams.

Biometric and movement data of objects 1406 in separate playing fields 1408 may likewise be captured by cameras 1410 and object tracking devices 1402, and output as live feed 1405 or recorded, e.g., to a CD or DVD, by recording device 1418. In one example, system 1400 captures an indoor rowing competition. Production control device 1414 for example receives image streams 1419 and annotation data 1427 and outputs live feed of objects 1406, in this case, rowers, superimposed upon a virtual water course. Live feed 1405 is for example displayed to the rowers on a television screen, so that the rowers can gauge their performance versus that of their competitors. In another example, objects 1406 are college runners running on playing fields 1408, in this case, standard tracks, in two separate arenas. Runners 1406 line up at starting lines at each track 1408 (e.g., as discussed in connection with FIGS. 2 and 8), and start times are synchronized between the playing fields 1408. Cameras 1410, disposed at each track 1408, capture the runners' 1406 performance. Production control device 1414 (which may be located proximate a playing field 1408, or remote from the playing fields) receives image streams 1419 and annotation data 1427 and outputs a recording or live feed, for example delayed by buffers 1416, of a virtual competition between runners 1406 at the separate arenas.

Figure 15:
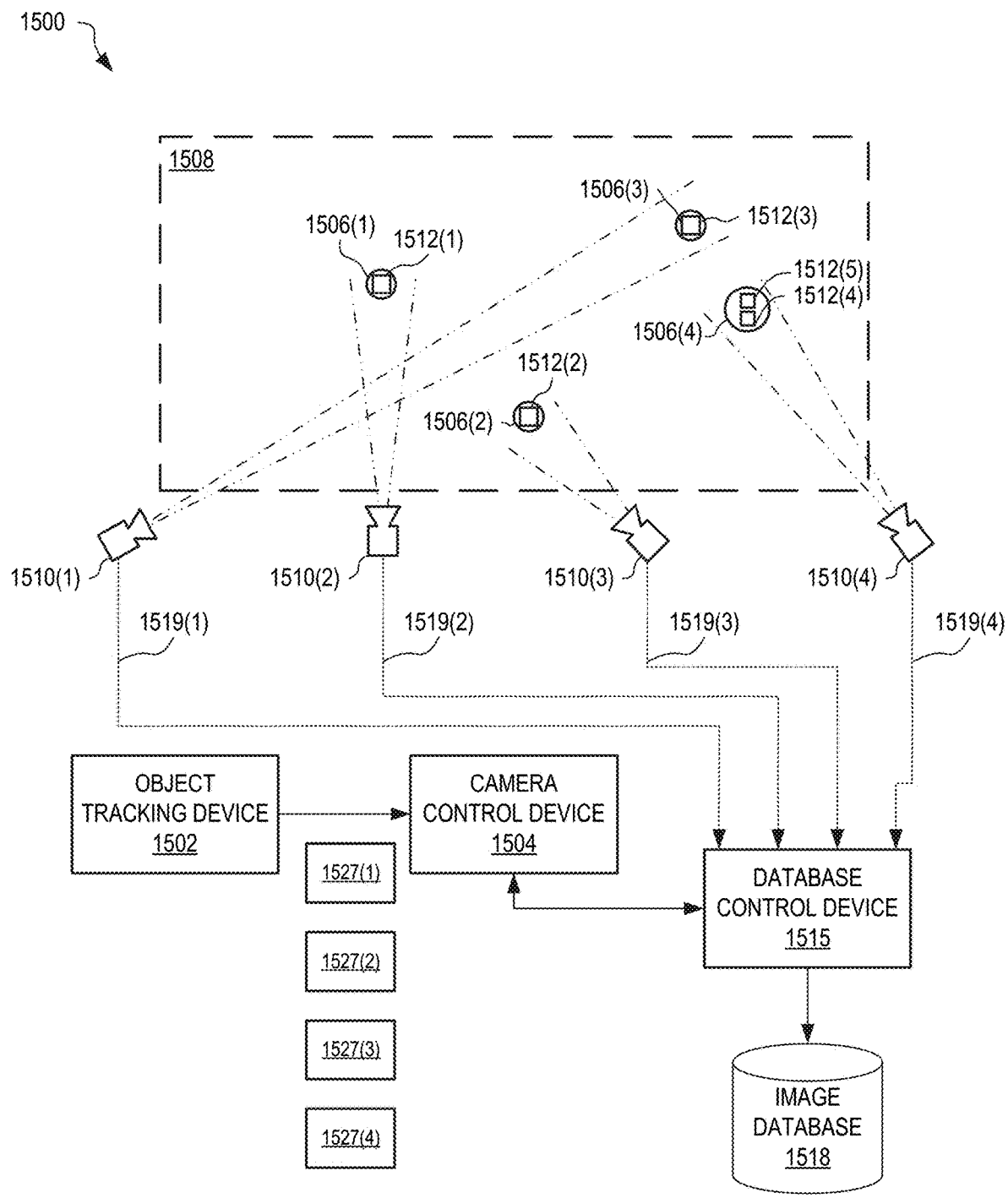
FIG. 15 shows an exemplary system for storing image data of tracked objects in a self-organizing database.

FIG. 15 shows a system 1500 for capturing high resolution images 1519 of tracked objects 1506, which again are suitable for still and/or moving picture production. Hereafter, images 1519 may be interchangeably referred to as image streams 1519. System 1500 is, for example, similar to systems 100, 200, 300, 400, 500, 600 and 1400 of FIGS. 1, 2, 3, 4, 5, 6 and 14, respectively. In particular, system 1500 has an object tracking device 1502, a camera control device 1504, a plurality of cameras 1510 and a plurality of location units 1512, each attached to an object 1506 within an operational field 1508. Multiple location units 1512 may also be attached to a single object 1506. Object 1506(4) is for example shown with location units 1512(4) and 1512(5). It will be appreciated that additional location units 1512 may be used according to tracking preferences and as permitted by size considerations. In one example, object 1506(4) is a soccer player wearing a location unit 1512(4) near his or her foot and a location unit 1512(5) at his or her torso. Camera control device 1504 may control cameras 1510 to capture images 1519 featuring a location unit of interest, according to user input, as described with respect to system 100 and method 1200, above. A user wishing to record a high-resolution image focusing upon player 1506(4)'s foot as it contacts the ball for example assigns one or more cameras 1510 to location unit 1512(4), whereas a user wishing to record a high-resolution image focusing generally upon the body of player 1506(4) may assign one or more cameras 1510 to location unit 1512(5). Assignments may be made via a user interface (not shown, see, e.g., user interface 114; FIG. 2) communicatively coupled with camera control device 1504.

Images/image streams 1519 from each camera 1510 are input into a database control device 1515. Database control device 1515 attaches tags to individual images 1519 using pre-defined event information as well as information from the camera control device 1504. Pre-defined event information for example includes information identifying an event, such as performer name(s), team names (e.g., Broncos vs. Vikings), event name, event date, and/or the like. In an alternate embodiment, functionality of database control device 1515 is included within camera control device 1504.

Camera control device 1504 receives annotation data 1527 (including coordinate data and/or a velocity component) as described above with respect to FIGS. 2 and 14. Camera control device 1504 determines when it is optimal to take an image, or a series of images by analyzing the field of view 1520 of camera 1510. In an embodiment, camera control device 1504 estimates motion of objects 1506 using the annotation data 1527 to extrapolate positions of objects 1506 within operational field 1508, to predict fields of view and camera movements that appropriately maintain objects 1506 within the fields of view.

Camera control device 1504 for example uses any one or more of the previously disclosed methods and algorithms to assign each camera 1510 to an object 1506. Additionally, camera control device 1504 is aware of the spatial orientation of object 1506 (e.g., which direction a particular object 1506 is facing) within operation field 1508. In an embodiment, the spatial orientation of object 1506 is determined using multiple location units 1512. Returning to the example of a soccer player 1506(4), location unit 1512(4) is for example placed at player 1506(4)'s heel or at the back of player 1506(4)'s ankle, while location unit 1512(5) is placed at player 1506(4)'s chest. Camera control device 1504 may thus determine which direction player 1506(4) is facing based on the orientation of devices 1512(4) and 1512(5). The spatial orientation of player 1506(4) may likewise be estimated based upon player 1506(4)'s motion. For example, camera control device 1504 may be programmed to recognize the direction in which player 1506(4) is moving as the "front" of player 1504(6). See description of FIGS. 1 and 2, above.

Camera control device 1504 may also be aware of the current time, location and year (e.g., by internal devices or via communications with date and time information), and therefore be able to determine the position of the sun. Camera control device 1504 may use the sun position in determining the optimal time, position and angle for high resolution images to be taken.

In an embodiment, image streams 1519 from each camera 1510 are input into database control device 1515. Each image stream 1519 contains images that are tagged with a timestamp by camera 1510. Database control device 1515 may attach additional tags to individual images using pre-defined event information and annotation data 1527 provided by camera control device 1504. Additional tags include, but are not limited to:
  information about the object in the image, such as name, player number or position;
  information about the location unit or units associated with the imaged subject, such as unit number, name of a person renting the unit and other renter information (e.g., email address);
  the time the image was taken;
  the name of the competition or event at which the image was taken;
  events associated with the image (e.g., scoring, breaking of a record, etc.);

In an alternative embodiment, camera control device 1504 provides tagging information to camera 1510. Camera 1510 in turn attaches one or multiple tags to every image prior to transmission to database control device 1515, via image stream 1519.

Database control device 1515 determines the object in the image, for example by matching the timestamp on an image in the image stream 1519 with information provided by camera control device 1504 and annotation data 1527. Annotation data 1527 may include any one of the previously disclosed data types (for example, data described with respect to annotation data 227, 1427). In an embodiment, camera control device 1504 directs each camera 1510 to a particular object 1506. Camera control device 1504 provides database control device 1515 with information for identifying the object 1506 in a high-resolution image obtained by a camera 1510. Camera control device 1504 may also provide database control device 1515 with additional tagging information to be attached to each image.

Database control device 1515 receives images from image stream 1519 and attaches tags to each. The "pre-filtered," tagged images are then transmitted to an image database 1518, which uses the tags to organize and populate the database. In an embodiment, images are sorted via human intervention or software prior to storage in image database 1518. A software program or human editor for example removes unwanted images prior to a deposit into database 1518. Additionally, database control device 1515 may add tags to images based on events occurring after the images have been taken. Post-image events such as a change in the score of a game or the breaking of a record may result in an image or series of images taken prior to the post-image event being tagged with information specific to the post-image event. In one example, images captured immediately prior to a field goal are tagged with data indicating the touchdown, to facilitate identification of images capturing a scoring kick.

Figure 16:
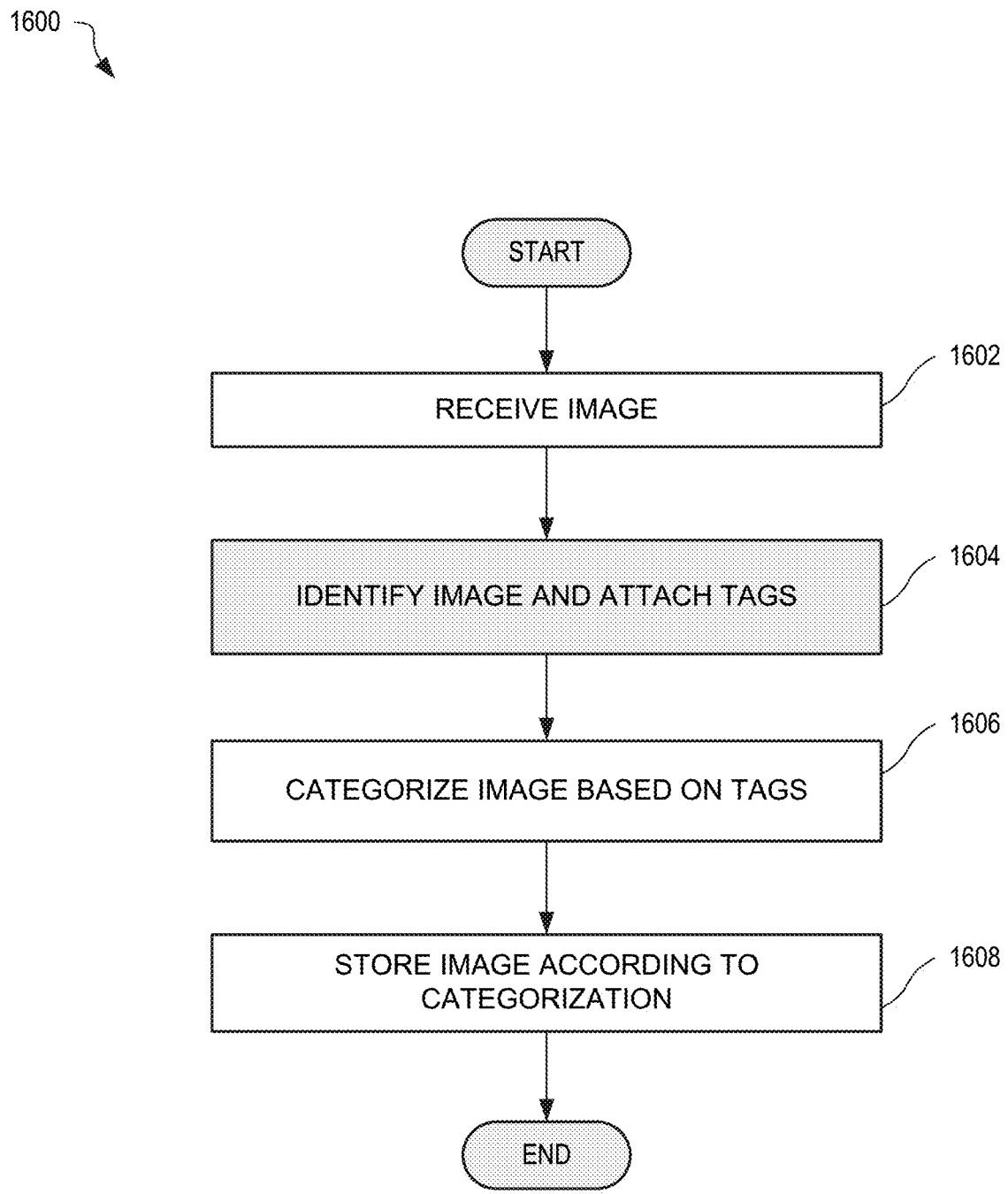
FIG. 16 shows one exemplary process for storing image data of tracked objects in a self-organizing database.

FIG. 16 shows one exemplary process 1600 for storing image data of tracked objects in a self-organizing database. An image is received, in step 1602. In one example of step 1602, image streams 1519 from cameras 1510 deliver high resolution images to database control device 1515. The received images may already include a timestamp tag.

The image is identified and tags are attached, in step 1604. In one example of step 1604, database control device 1515 uses annotation data 1527 and information provided by camera control device 1504 to determine information about the image, such as: the player(s) in the image, the time the image was taken, the name of the competition, the score at the time the image was taken, and a particular event that may have occurred during the taking of the image (e.g., a touchdown run in an American football game). In step 1606, the image is categorized in image database 1518 based on the attached tags. In one example of step 1606, image database 1518 automatically creates categories and sub-categories for the tags attached to an image. Tags may be categorized by player, by location unit (e.g., when location units 1512 are attached to or rented by/for specific individuals) and/or by competition. Sub-categories may include date, time, current score, or a specific event occurring after the image was taken (e.g., a touchdown run following a catch captured by a camera 1510). In step 1608, the image is stored according to the categorization and sub-categorization. In one example of step 1608, the image is stored in image database 1618 and references to the image are stored in each category and sub-category.

Figure 17:
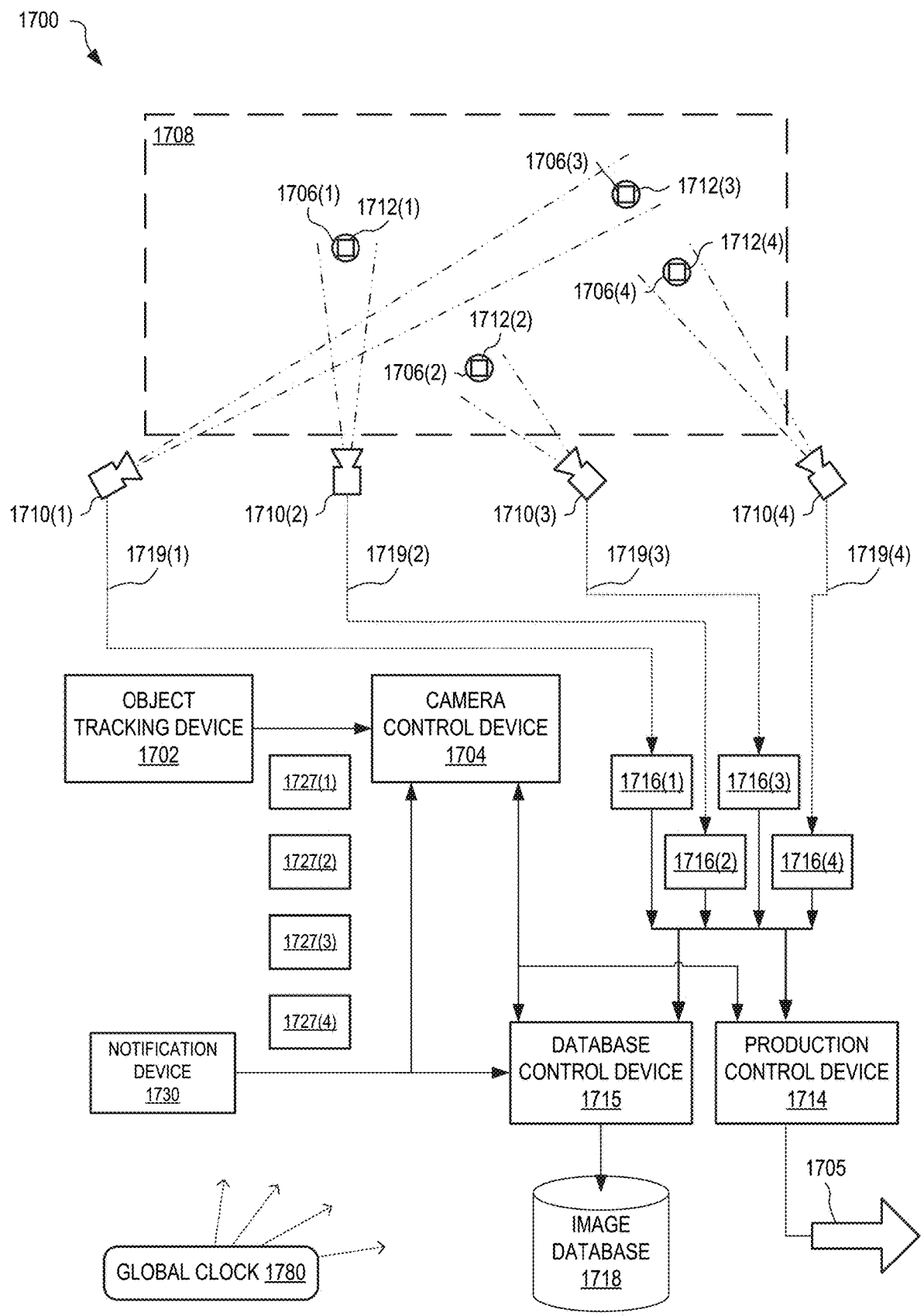
FIG. 17 shows an exemplary system for capturing high resolution image data of tracked objects interspersed within an image stream, to facilitate autonomous still and/or moving picture production, in accord with an embodiment.

FIG. 17 shows a system 1700 for capturing high resolution images and image streams 1719 of tracked objects 1706; such image streams are for example useful in autonomous still and/or moving picture production. System 1700 is, for example, similar to systems 100, 200, 300, 400, 500, 600, 1400, and 1500 of FIGS. 1, 2, 3, 4, 5, 6, 14 and 15, respectively. In particular, system 1700 has an object tracking device 1702, a camera control device 1704, a plurality of cameras 1710 and a plurality of location units 1712, each attached to object 1706 within an operational field 1708.

In one embodiment, image resolution and frame rate are modified in order to capture high resolution still images within the image stream. For example, using the above-described methods, camera control device 1704 determines when a tracked object 1706 is facing a camera 1710, and adjusts image resolution and/or frame rate of camera 1710 to capture a still image of the front of the object (e.g., a player's face). Image resolution is for example reduced when the object 1706 is not facing the assigned camera 1710, when blocking by another object is predicted and/or when object 1706 moves away from a location of interest (see, e.g., description of FIG. 14, above).

Image streams 1719 from each camera 1710 may be input into image stream buffers 1716 that delay each image stream 1719 prior to its arrival at production control device 1714 and database control device 1715. Production control device 1714 may down-sample high resolution images within image streams 1719 and then select and switch between delayed down-sampled image streams to produce a live feed 1705. Database control device 1715 attaches tags to individual high-resolution images interspersed within the image streams 1719, using pre-defined event information as well as information from the camera control device 1504. In an alternate embodiment, functionality of production control device 1714 and database control device 1715 are included within camera control device 1704. In another alternate embodiment, functionality of the database control device 1715 is included in production control device 1714.

Camera control device 1704 may use any one or more of the previously disclosed methods and algorithms to assign each camera 1710 to an object 1706. Additionally, camera control device 1704 may use any one or more of the previously disclosed methods and algorithms to extrapolate positions of objects 1706 within operational field 1708, and predict fields of view and camera movements that appropriately maintain objects 1706 within the fields of view.

Camera control device 1704 receives annotation data 1727 (including coordinate data and/or a velocity component). Camera control device 1704 increases frame rate and/or resolution of cameras 1710 if there is good probability that an unobstructed, high quality photo would be desirable. For example, camera control device 1704 determines when it is optimal to take a high resolution still image or series of images of object 1706(1), and accordingly controls camera 1710(2) to increase one or more of the frame rate and resolution, to ensure that an occurring or predicted event is captured. Camera control device 1704 dynamically adapts camera resolution and may increase frame rate for short periods of time to provide a burst mode. In an example of "burst mode," camera control device 1704 directs camera 1710, which normally produces video at a 640×480 pixel resolution, to increase the resolution to 2560×1920.

Image streams 1719 from each camera 1710 may be input into image stream buffers 1716 that delay each image stream 1719 prior to arrival at production control device 1714 and database control device 1715. In an embodiment, production control device 1714 down-samples high resolution images within image streams 1719 and discards "extra" frames that exceed a broadcast frame rate. Production control device 1714 then selects and switches between delayed, down-sampled image streams to produce live feed 1705.

Database control device 1714 tags individual high-resolution images interspersed within image streams 1719. Tags may be created using pre-defined event information as well as information from camera control device 1704 and/or annotation data 1727, as previously described. Additional event information may be included in tags via an external notification device 1730. Notification device 1730 provides for example an input to database control device 1715 that facilitates tagging of images based on triggers that occur after the images have been taken. Notification device 1730 may connect or wirelessly communicate with database control device 1715.

In one example, notification device 1730 is formed as a wireless transmitter in communication with an electronic scoreboard. A wireless receiver is configured with or in communication with database control device 1715. Responsive to a change in posted score, notification device 1730 emits a signal that is received and communicated to database control device 1715. Database control device 1715 then tags images recorded within a pre-selected time frame prior to the signal from notification device 1730. In another example, notification device 1730 is a user interface whereby an observer may signal an event by pressing a button. Alternately, notification device 1730 may include a pitch recognition unit that signals database control device 1715, or a related receiver, upon identifying raised register, increased cadence or increased volume of a sportscaster providing live event commentary. Database control device 1715 tags high resolution images responsive to input from notification device 1730 and transfers the individual high-resolution images to image database 1718.

In an embodiment, functionality of production control device 1714 and database control device 1715 are included within camera control device 1704. In another embodiment, functionality of the database control device 1715 is included within production control device 1714. Other configurations are within the scope of this disclosure.

In another embodiment, cameras 1710 produce only high-resolution image streams 1719 (e.g., 2560×1920 resolution). Image streams 1719 from each camera 1710 are input into image stream buffers 1716 that delay each image stream 1719 prior to its arrival at production control device 1714 and database control device 1715. Production control device 1714 down-samples high resolution image streams 1719 (e.g., to 640×480 resolution), and selects and switches between the delayed down-sampled image streams to produce live feed 1705. Database control device 1715 attaches tags to high resolution images in image stream buffers 1716 when notification device 1730 indicates that an important event has occurred.

In an embodiment, system 1700 includes a global clock 1780 that provides a synchronized time between components and devices of system 1700. For example, cameras 1710 may time stamp one or more frames of image streams 1719 such that production control device 1714 and/or database control device 1715 may correlate received notifications from notification device 1730, annotation data 1727, and images of image stream buffers 1716.

Figure 18:
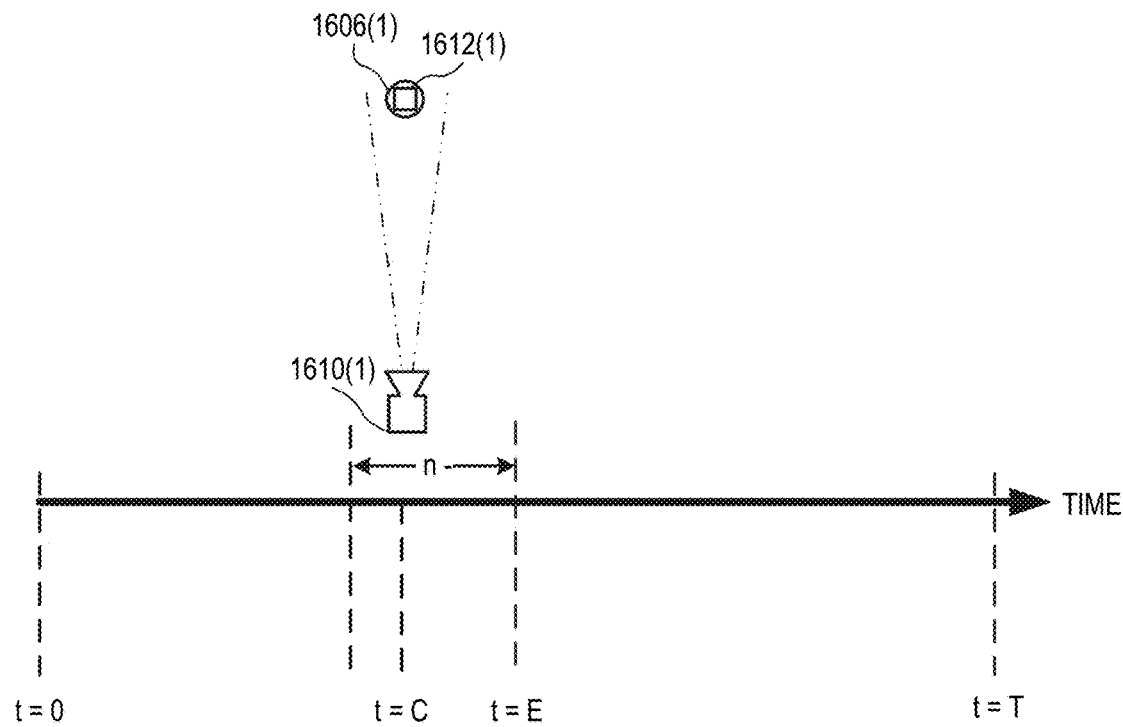
FIG. 18 shows the chronology of capturing an action of interest, according to an embodiment.

FIG. 18 shows a notification "E" received from notification device 1730, for example upon a score change, a key play, periodically, etc. However, notification E may occur a certain period after image stream capture of the associated action of interest, shown as time "C". For example, a field goal kick may occur several second before the notification is received from notification device 1730 (i.e., updating of a scoreboard occurs after the ball is kicked). Thus, by utilizing image stream buffer 1716 to buffer a period 'n' of image streams 1719 (where period 'n' is greater than the delay between capture of the action C and the receipt of notification E), the image stream arriving at production control device 1714 and/or database control device 1715 contains the associated action imagery for processing in association with notification E. Thus, upon receipt of notification E, database control device 1715 may extract images from image stream buffer 1716, attach tags to each image, and store the images in image database 1718, in association with action C and/or notification E.

Figure 19:
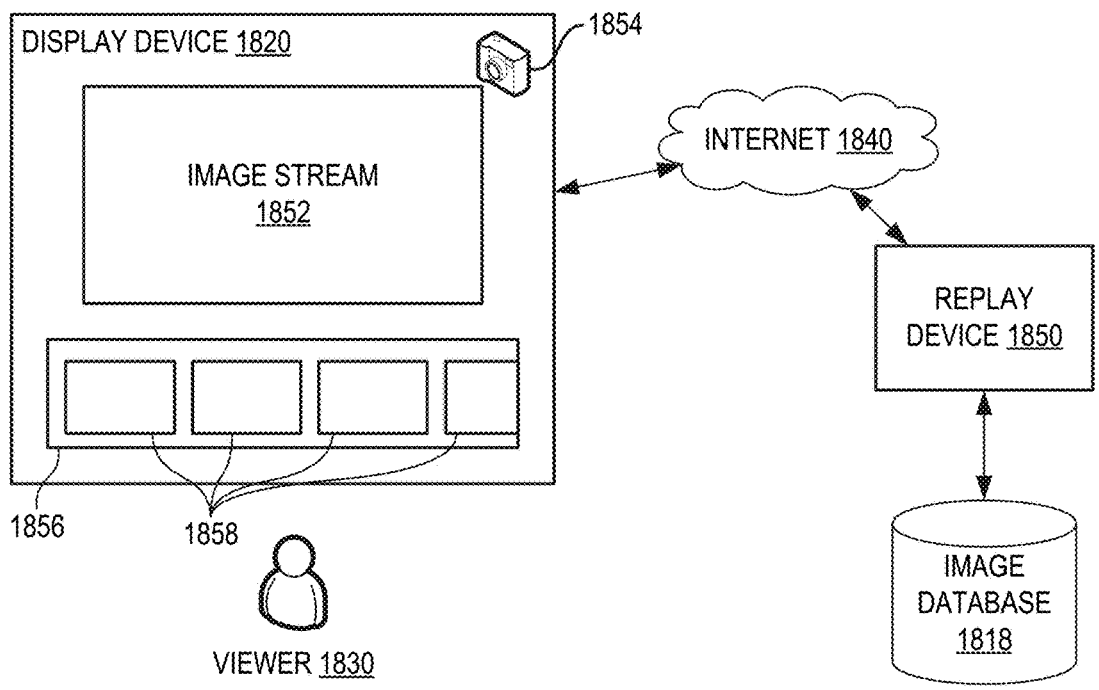
FIG. 19 shows an exemplary system for displaying image data of tracked objects in autonomous still and/or moving picture production, in accord with an embodiment.

In one embodiment, as shown in FIG. 19, a replay device 1850 replays an image stream 1852 from an image database 1818 for display on a display device 1820. Replayed image stream 1852 is viewed and controlled by a user 1830. Where production control device 1714 has stored high resolution still images within image database 1818 that are associated with the currently displayed scenes of image stream 1852, a still image indicator 1854 is displayed on display device 1820. Viewer 1830 may select (e.g., click on) indicator 1854 to pause image stream 1852 and view one or more still images 1858 within a film strip 1856 on display 1820. In one example of operation, when viewer 1830 selects indicator 1854, image stream 1852 is paused and replay device 1850 selects still images 1858 associated with displayed image stream 1852 from image database 1818 and sends these images to display device 1820 via internet 1840. Viewer 1830 may select (e.g., click on) one of the still images 1858 to view a larger image of the selected still image 1858. Display device 1820 may be a television or computer capable of displaying image stream 1852, indicator 1854 and film strip 1856.

Figure 20:
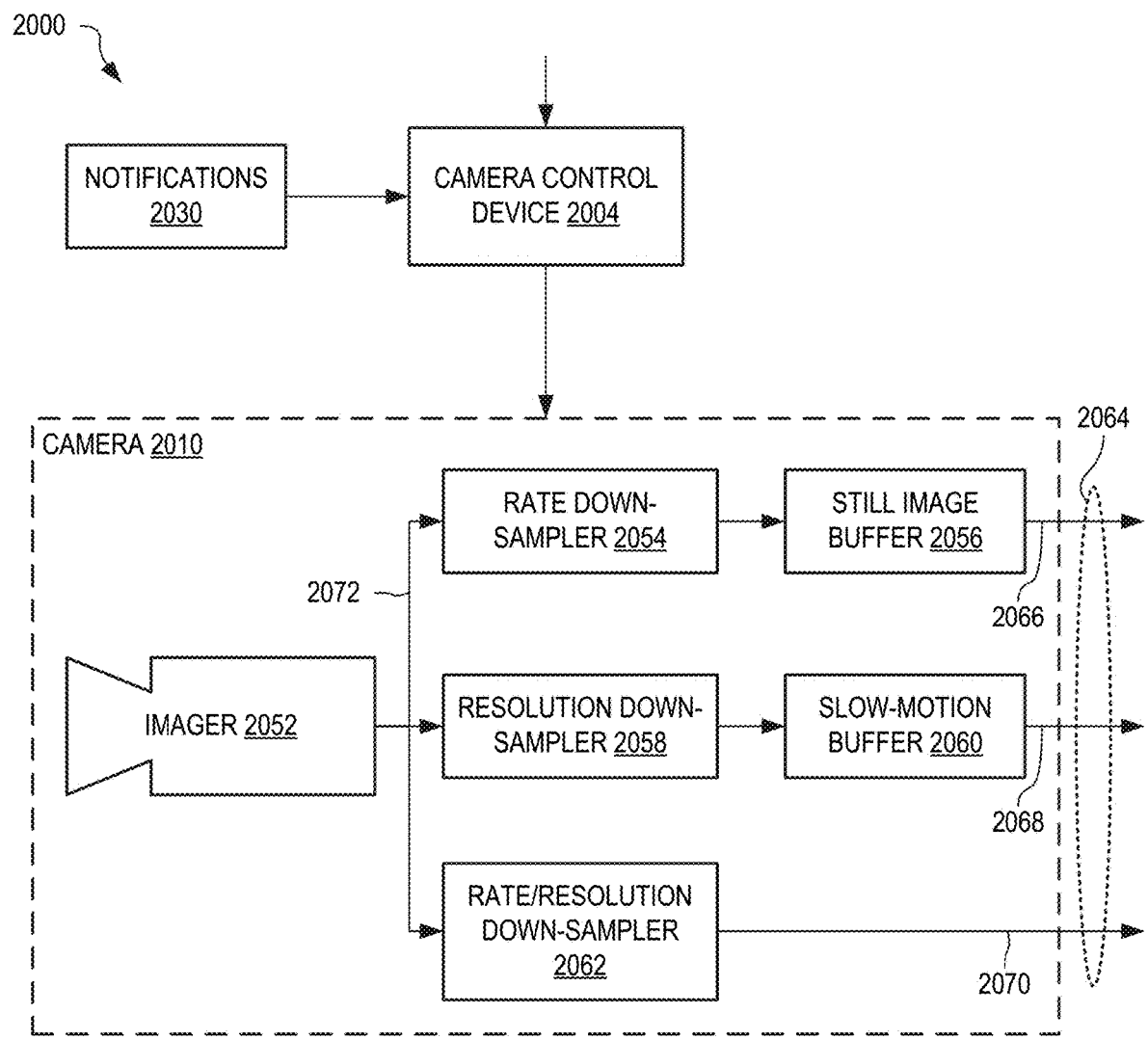
FIG. 20 is a schematic diagram of a camera controlled by a camera control device, in an embodiment.

FIG. 20 shows a schematic diagram 2000 of a camera 2010 controlled by a camera control device 2004. Camera control device 2004 may represent camera control devices 104, 204, 304, 404, 504, 604, 1404, 1504 and 1704 of FIGS. 1, 2, 3, 4, 5, 6, 14, 15 and 17, respectively. Camera 2010 may represent cameras 110, 210, 210, 410, 510, 610, 1410, 1510 or 1710 of FIGS. 1, 2, 3, 4, 5, 6, 14, 15 and 17, respectively.

Camera 2010 has an imager 2052 that represents optical and electronic components for capturing an image stream 2072 under control of camera control device 2004. Imager 2052 operates at a variable resolution (e.g., between a high resolution such as 2048×1538 pixels and a low resolution such as 512×384 pixels) and with a variable frame rate (e.g., between 1 and 1000 frames per second); both resolution and frame rate are controlled by camera control device 2004.

Camera 2010 is shown with three image data paths, herein called 'live', 'slow-motion', and 'still image', each of which is controlled (e.g., turned on and off) by camera control device 2004, for example according to the nature of the event being imaged. Operation of camera 2010 may follow one of eight states, shown in Table 1.

TABLE 1

| | Camera States | | |
| State | Live | Slow-Motion | Still Image |
| --- | --- | --- | --- |
| 1 | Off | Off | Off |
| 2 | Off | Off | On |
| 3 | Off | On | Off |
| 4 | Off | On | On |
| 5 | On | Off | Off |
| 6 | On | Off | On |
| 7 | On | On | Off |
| 8 | On | On | On |

Camera control device 2004 selects the frame rate and resolution of imager 2052 based upon received notifications 2030 that indicate an event of interest to be captured. Camera control device operates imager 2052 at a standard resolution (e.g., a resolution suitable for a television feed) and at a standard frame rate (e.g., thirty frames per second) in the absence of notification 2030. Then, depending upon the type of received notification 2030, camera control device 2004 may control imager 2052 to operate at a higher resolution (e.g., 2048×1538 pixels) and/or a higher frame rate (e.g., one-hundred and twenty frames per second).

Based upon notification 2030, camera control device 2004 controls imager 2052 to operate at a higher resolution (e.g., 2048×1538 pixels) when still images are to be captured. A rate down-sampler 2054 reduces the frame rate of image stream 2072 while maintaining the high resolution of each remaining frame, and feeds this low frame rate (e.g., five frames per second) high resolution image stream into a still image buffer 2056. Images stored within still image buffer 2056 may then be output as still image feed 2066 under control of camera control device 2004. These output images may then be stored within a database (e.g., image database 1718, FIG. 17) with annotation information.

Based upon notification 2030, camera control device 2004 controls imager 2052 to operate at a high frame rate (e.g., one-hundred and twenty frames per second) when a slow-motion image stream is to be captured. Where resolution of image stream 2072 is higher than required for the slow-motion image stream, a resolution down-sampler 2058 reduces the resolution of each frame of image stream 2072 while maintaining the frame rate to produce a high frame rate lower resolution (e.g., 640×480 pixels) image stream that is fed into a slow-motion buffer 2060 from where it is output, under control of camera control device 2004, as a slow-motion feed 2068. Slow-motion feed 2066 may be used to produce a slow-motion effect when displayed at a frame rate less than the capture frame rate. For example, if slow-motion feed 2068 is captured at one-hundred and twenty frames per second and displayed at thirty frames per second, the effect is one quarter speed slow-motion.

Based upon notification 2030, camera control device 2004 may control imager 2052 to capture image stream 2072 with increased resolution and frame rate to capture high resolution still images and a slow-motion image feed. Down samplers 2054 and 2058 operate to reduce the frame rate and resolution of image stream 2070 to provide the desired still images and slow-motion feed, respectively.

A rate/resolution down-sampler 2062 operates to produce a desired resolution and frame rate of live feed 2070, irrespective of resolution and frame rate of image stream 2072. Camera 2010 outputs live feed 2070 while optionally and simultaneously capturing high quality still images and/ or a slow-motion image stream under control of camera control device 2004.

Still image feed 2066, slow-motion feed 2068 and live feed 2070 may be combined into a single digital feed 2064, without departing from the scope hereof. Each feed may be tagged with the captured frame rage and resolution to facilitate later processing. Camera 2010 is particularly suited for use where notification 2030 indicate events of interest that are yet to happen, thereby allowing camera control device 2004 to control camera 2010 to capture still images and slow-motion feed appropriately for the event. Further, by controlling imager 2052 to capture image stream 2072 with an appropriate resolution and frame rate for still images and slow-motion only as necessary, imager 2052 operates to capture image stream 2072 at optimal quality. That is, imager 2052 does not operate at a frame rate and resolution higher than required by any one of desired output feeds 2066, 2068 and 2070. For example, capturing an image stream at a higher frame rate than necessary may result in poorer image quality. Similarly, capturing an image stream at a higher resolution and then down sampling may also result in poorer image quality.

Shutter speed of imager 2052 may also be controlled by camera control device 2004 based upon the type of event being captured. For example, camera control device 2004 may ensure a fast shutter speed (e.g., $\frac{1}{250}^{th}$ of a second or smaller) is used by imager 2052 when capturing images of a sporting event to reduce image blur resulting from fast moving subjects.

Although shown with still image, slow-motion and standard image stream capture capability, camera 2010 may be configured to include a combination of these functionalities without departing from the scope hereof. For example, rate down-sampler 2054 and still image buffer 2056 may be omitted when still image capture functionality is not required; resolution down-sampler 2058 and slow-motion buffer 2060 may be omitted when slow-motion capture functionality is not required; and rate/resolution down-sampler 2062 may be omitted when standard feed 2070 is not required. Further, camera 2010 may have additional image data paths, such as to include two slow-motion paths, each operating at different frame rates, without departing from the scope hereof.

In one embodiment, camera 2010 has a limited bandwidth and is not capable of running at its maximum resolution and maximum frame rate simultaneously. Camera control device 2004 thus controls imager 2052 to operate within constraints imposed by camera 2010.

Figure 21:
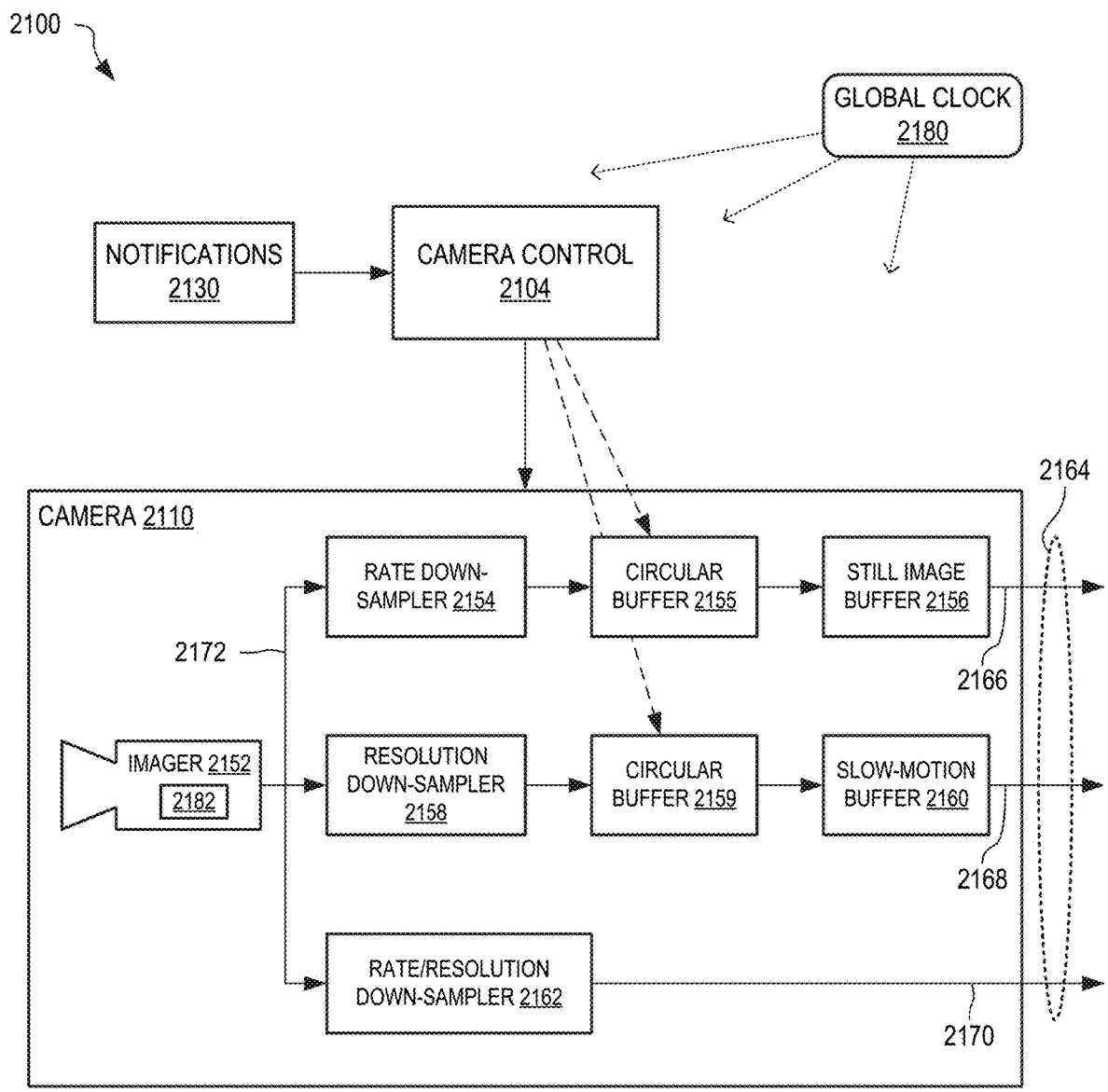
FIG. 21 is a schematic diagram of a camera for buffering still images and slow-motion image stream, in an embodiment.

FIG. 21 shows a schematic diagram 2100 of a camera 2110 that continually captures still images and a slow-motion image stream and is controlled by a camera control device 2104. Camera control device 2104 may represent camera control devices 104, 204, 304, 404, 504, 604, 1404, 1504 or 1704 of FIGS. 1, 2, 3, 4, 5, 6, 14, 15 and 17, respectively. Camera 2110 may represent cameras 110, 210, 210, 410, 510, 610, 1410, 1510 or 1710 of FIGS. 1, 2, 3, 4, 5, 6, 14, 15 and 17, respectively.

Camera 2110 is similar to camera 2010, FIG. 20, and further includes circular buffers 2155, 2159 to continually store still images and a slow-motion image stream. An imaging unit 2152 of camera 2110 represents optical and electronic components for capturing a high resolution (e.g., 2048×1538 pixels) fast frame rate (e.g., between 30 and 1000 frames per second) image stream 2172. A rate down-sampler 2154 reduces the frame rate of image stream 2172 while maintaining the high resolution, and feeds this high resolution low frame rate (e.g., five frames per second) image stream into circular buffer 2155. Circular buffer 2155 thus stores still images for a period, depending upon the size of circular buffer 2155, up to present. When camera control device 2104 receives notifications 2130 indicating an event of interest, camera control device 2104 may transfer still images from circular buffer 2155 to still image buffer 2156 for a period surrounding the time of the event of interest, provided that the time of the event of interest falls within the buffered period of circular buffer 2155. These kept images may then be output as still image feed 2166.

A resolution down-sampler 2158 reduces the resolution of each frame of image stream 2172 while maintaining the high frame rate to produce a lower resolution high frame rate image stream that is fed into a circular buffer 2159. Thus, circular buffer 2159 stores, depending upon the size of circular buffer 2159, a period of slow-motion image stream up to present. When camera control device 2104 receives notifications 2130 indicating an event of interest, camera control device 2104 may transfer a slow-motion image sequence that represents a period associated with the time of the event of interest to a slow-motion buffer 2160 from where they are output as a slow-motion feed 2168.

In one embodiment, circular buffers 2155 and 2159 are sized to store sixty seconds of still images and slow-motion image stream, respectively, thereby allowing still images and slow-motion image streams to be provided even when notifications 2130 identify events of interest that have already occurred.

Image stream 2172 is also input to a rate/resolution down-sampler 2162 that simultaneously reduces the frame rate and resolution of image stream 2172 to produce a live feed 2170. Still image feed 2166, slow-motion feed 2168 and live feed 2170 may be combined into a single digital feed 2164. Camera control device 2104 may selectively modify down-sampling by down-samplers 2154, 2158 and 2162 and selectively transfer images and image sequences from circular buffers 2155, 2159 to buffers 2156, 2160, respectively, based upon algorithms 426 and/or input from one or more of production control devices 614, 1414 and 1714, to provided desired still images and image streams.

Camera 2110 may also include functionality of camera 2010, FIG. 20, through control and size of circular buffers 2155 and 2159, to also allow capture of future events of interest.

In an embodiment, imager 2152 includes a time stamp unit 2182 that is synchronized with a global clock 2180. Global clock 2180 provides a time signal (e.g., including a time of day) to each component of camera 2110 and camera control device 2104 to synchronize time within these and other devices of an autonomous still and/or moving picture production system (see, e.g., system 1700, FIG. 17). Time stamp unit 2182 may attach a time stamp to each frame of image stream 2172, or may attach a time stamp to images of image stream 2172 at an appropriate periodicity. Thus, as image stream 2172 is processed within camera 2110 and other devices of the system, capture time of the images may be determined.

Each notification 2130 received by camera control device 2104 may also be given a time stamp that determines when the notification occurred. Thus, based upon notifications and their associated time stamps, camera control device 2104 may determine a period for the action of interest associated with the notification 2130. Camera control device 2104 may thus send this period to camera 2110 to request still images and/or a slow-motion image stream of the action of interest. Camera 2110 may then transfer captured images from circular buffers 2155, 2159 to buffers 2156, 2160, respectively, based upon the requested period. In view of the continual operation of camera 2110, requests for still images and/or slow-motion image streams are preferably processed within camera 2110 in chronological order of the requested period, oldest first, and not necessarily the order of request arrival at camera 2110, to avoid overrun of circular buffers 2155 and 2159.

Although camera 2110 is shown with three exemplary image data paths ('still image', 'slow-motion', and 'live'), camera 2110 may have more or fewer image data paths without departing from the scope hereof. In an embodiment, the number and type of image data paths (e.g., still image, slow-motion and live) operating within camera 2110 is configured by camera control device 2104 and based upon the type of event being captured. Rate down-sampler 2154, resolution down-sampler 2158 and rate/resolution down-sampler 2162 may be implemented as software modules within one or more digital signal processors and thereby selected for operation as required. Further, circular buffers 2155 and 2159, and optionally buffers 2156 and 2160, may be sourced from a common memory device within camera 2110, and are thereby configurable in size and number by camera control device 2104. For example, camera control device 2104 may configure camera 2110 with two slow-motion image data paths, each having a resolution down sampler, a rate down sampler and a circular buffer, for capturing slow-motion image streams at different frame rates and/or different resolutions. That is, rate, resolution, and rate/resolution down samplers may be selectively combined to provide a desired image data path within camera 2110, and one or more such image data paths may be used simultaneously.

In one embodiment, camera 2110 has a limited bandwidth and is not capable of running at its maximum resolution and maximum frame rate simultaneously. Camera control device 2104 thus controls imager 2152 to operate within constraints imposed by camera 2110.

Figure 22:
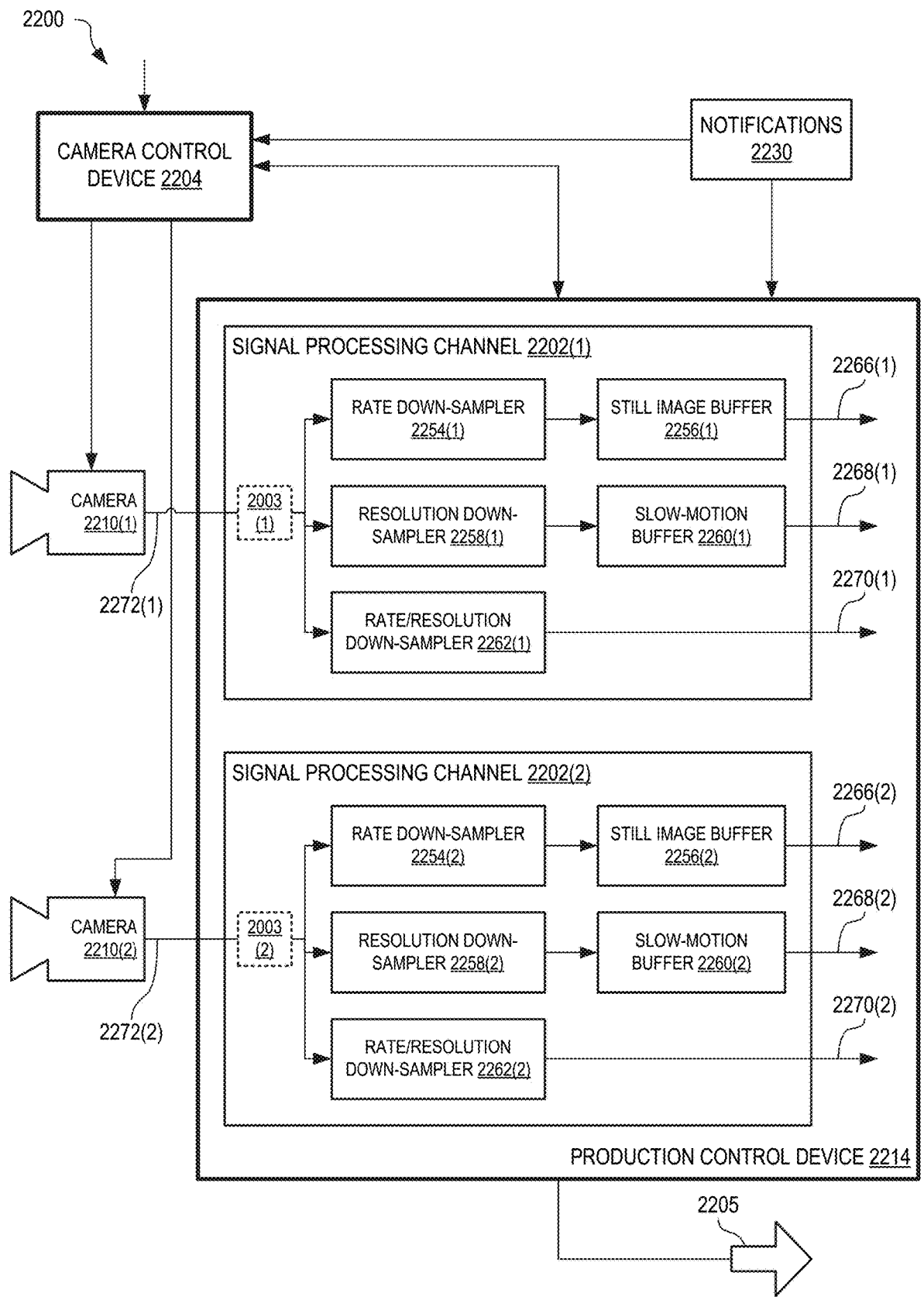
FIG. 22 is a schematic diagram of a production control device, a camera control device and two cameras, in an embodiment.

FIG. 22 shows a schematic diagram 2200 of a production control device 2214, a camera control device 2204, and two cameras 2210(1) and 2210(2). Camera control device 2104 may represent camera control devices 104, 204, 304, 404, 504, 604, 1404, 1504 or 1704 of FIGS. 1, 2, 3, 4, 5, 6, 14, 15 and 17, respectively. Cameras 2110 may each represent one or more of cameras 110, 210, 210, 410, 510, 610, 1410, 1510 and 1710 of FIGS. 1, 2, 3, 4, 5, 6, 14, 15 and 17, respectively. Production control 2214 may represent one or more of production control devices 614, 1414 and 1714 of FIGS. 6, 14 and 17, respectively.

Each camera 2210 sends a high resolution (e.g., 2048× 1538 pixels) high frame rate (e.g., 120 frames per second) image stream 2272 to production control device 2214 where each image stream 2272 is processed by a signal processing channel 2202. Although FIG. 22 shows two signal processing channels 2202, production control device 2214 may include fewer or more signal processing channels 2202 without departing from the scope hereof.

High resolution high frame rate image stream 2272(1) connects to a rate down-sampler 2254(1), a resolution down-sampler 2258(1) and a rate/resolution down-sampler 2262 (1). High resolution high frame rate image stream 2272(2) connects to a rate down-sampler 2254(2), a resolution down-sampler 2258(2) and a rate/resolution down-sampler 2262 (2). Rate down-samplers 2254 reduce the frame rate of image streams 2272. In one example of operation, rate down-sampler 2254(1) reduces the frame rate of image stream 2272(1) to five frames per second, and stores these high-resolution still images within a still image buffer 2256 (1). Resolution down sampler 2258(1) maintains the frame rate of image stream 2272(1), but reduces the resolution of each frame and stores the reduced resolution high frame rate image stream in a slow-motion buffer 2260(1). Thus, an image stream 2268(1), when output from slow-motion buffer 2260(1) at a frame rate lower than the high frame rate of image stream 2272(1), appears to be slow motion while maintaining smooth image sequencing. Rate/resolution down-sampler 2262(1) reduces the resolution of each frame and reduces the frame rate of image stream 2272(1) to produce image stream 2270(1). Thus, image stream 2270(1) may have a standard frame rate and standard resolution of a television feed.

Signal processing channel 2202(2) operates similarly to signal processing channel 2202(1) to process high resolution high frame rate image stream 2272(2) from camera 2210(2), and will therefore not be described further.

In particular, production control device 2214 controls each of converters 2254, 2258 and 2262 to produce desired outputs 2266, 2268 and 2270, respectively. Production control device 2214 may then operate to select between image streams 2266, 2268 and 2270 to provide one or more output feeds 2205.

In one embodiment, each signal processing channel 2202 includes a buffer 2003 that delays each image stream 2272 for a certain period (e.g., thirty seconds), thereby allowing production control device 2214 to process and capture an event of interest identified by notifications 2230 and occurring within that period. For example, where buffers 2003 store thirty seconds of high resolution high speed image stream 2272 and production control device 2214 receives notifications 2230 indicating that an event of interest occurred twenty seconds ago, production control device 2214 determines that image stream relating to this event will be processed in ten seconds by each signal processing channel 2202 and may thus store and utilize relevant still images and slow-motion image streams for that event.

Figure 23:
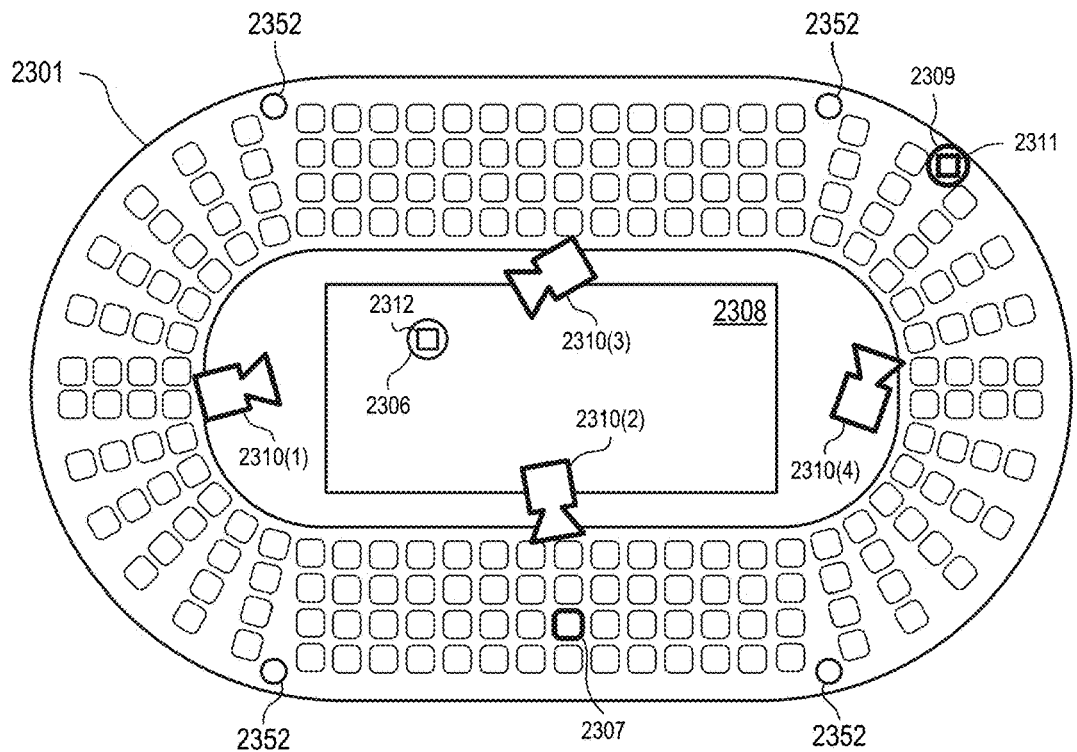
FIG. 23 is a schematic diagram illustrating one exemplary stadium hosting a sporting event on a field, in an embodiment.
Figure 23:
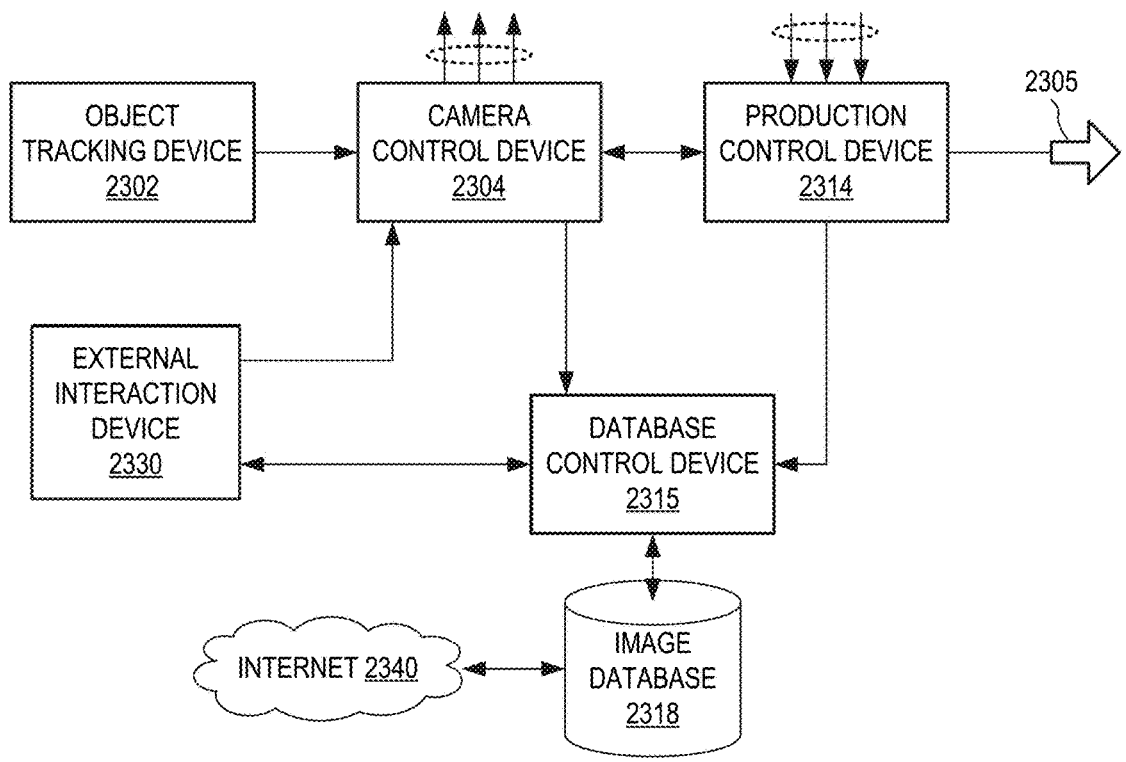

FIG. 23 is a schematic diagram illustrating one exemplary stadium 2301 hosting a sporting event on field 2308 for which video and still image production is provided by a system 2300 that includes four cameras 2310(1), 2310(2), 2310(3) and 2310(4), an object tracking device 2302, a camera control device 2304, a production control device 2314, a database control device 2315 and a database 2318. Object tracking device 2302, camera control device 2304, production control device 2314, database control device 2315 and database 2318 may represent object tracking device 1702, camera control device 1704, production control device 1714, database control device 1715 and database 1718 of system 1700, FIG. 17. Production control device 2314 may include functionality of production control device 2214, FIG. 22. Cameras 2310 may represent cameras 110, 210, 210, 410, 510, 610, 1410, 1510, 1710, 2010 and 2110 of FIGS. 1, 2, 3, 4, 5, 6, 14, 15, 17, 20 and 21 respectively.

Within system 2300, camera control device 2304 and production control device 2314 cooperate to control cameras 2310 and generate feed 2305 based upon tracking information received from object tracking device 2302. In the example of FIG. 23, a player 2306 on fields 2308 has a location device 2312 that provides location information to object tracking device 2302. Camera control device 2304 and production control device 2314 determine that cameras 2310(1) and 2310(3) are most appropriate to capture imagery of player 2306. Other players and objects (e.g., a ball) may be similarly tracked by system 2300, but are not shown for clarity of illustration.

System 2300 may also capture images within stadium 2301 at the request of spectators or other interested parties. In one example, an external interaction device 2330 receives requests to image a location within stadium 2301 from one of a plurality of request kiosks 2352 located throughout stadium 2301. Kiosks 2352 communicate with external interaction device 2330 to request one or more still images and/or moving images to be taken of a particular location. For example, a spectator 2307 utilizes one of kiosks 2352 to request a still image be taken of the spectator's seat location. The spectator may proffer a ticket stub for kiosk 2352 to scan, for example, to input the seat location. External interaction device 2330 is programmed with locations for each seat within stadium 2301, and may therefore translate the input seat number to a location relative to cameras 2310. Kiosk 2352 may allow the spectator to input a time window during which the image is to be taken, thereby allowing the spectator time to return to the seat. External interaction device 2330 then interacts with camera control device 2304 and/or production control device 2314 to schedule an appropriate camera 2310 for imaging the requested camera within the scheduled time window. Where system 2300 utilizes cameras 2310 to image sports activity and spectators, camera priority is preferably given to the sports activity; cameras 2310 are used to image spectator locations when not required for imaging the sporting event. In the example of FIG. 23, camera 2310(2) captures the image of seat location 2307. In another embodiment, system 2300 includes dedicated cameras for imaging spectators and may therefore schedule image capture times more accurately.

In another example, a spectator 2309 uses a cell phone 2311 with location capability (e.g., GPS) to request an image be taken of the current location of spectator 2309. FIG. 23 shows camera 2310(4) imaging the location of spectator 2309. External interaction device 2330 may utilize a mapped topography of the stadium to determine a location relative to cameras 2310 based upon a received two-dimensional coordinate. Once the image it taken, a low-resolution image may be sent to the spectator's cell phone 2311, for example, together with a web URL and identification number that allows spectator 2309 to purchase the image at a later time.

In another example, a spectator interacts with a web site to request images to be taken of a particular seat within the stadium. System 2300 then takes one or more images of the specified seat location during the event and makes the images available online. The spectator may then view and purchase the images after returning from the stadium.

In another example, stadium 2301 advertises a number to which a cell-phone may be used to text a seat number (e.g., a seat number and section location) to request an image to be taken of that location. When a spectator texts a seat number to the provided number, external interaction device 2330 determines when one of cameras 2310 suitable for taking the image is available, and may notify the spectator of time window when the image will be taken. Alternatively, if system 2300 is busy and no cameras 2310 are available to take the image, external interaction device 2330 may inform the spectator, by sending a text message to the spectator's phone, that the system is busy and that to try again later, or that they will be notified when the system is ready to take the image. The cost of sending the text message may include an initial cost for taking the image. The captured image(s) may then be viewed online and purchased by the spectator.

System 2300 may record several still images to image database 2318 for each requested location, thereby providing a choice to the requestor.

Kiosk 2352 may operate to allow the spectator to view a series of captured imaged upon request, and thereby allow selection of one or more images for purchase. For example, purchased images may be emailed to a provided email address. Optionally, kiosk 2352 may include a photographic printer to print purchased images.

In one embodiment, system 2300 utilizes cameras 2310 to capture images of each seat within the stadium over the period of the sporting event. For example, system 2300 may capture images of seats within stadium 2301 using cameras 2310 when they are not required for imaging the sporting event itself. Each image being stored within image database 2318 with a seat number reference (or seat number range reference) to allow spectators to view and purchase the images online.

Figure 24:
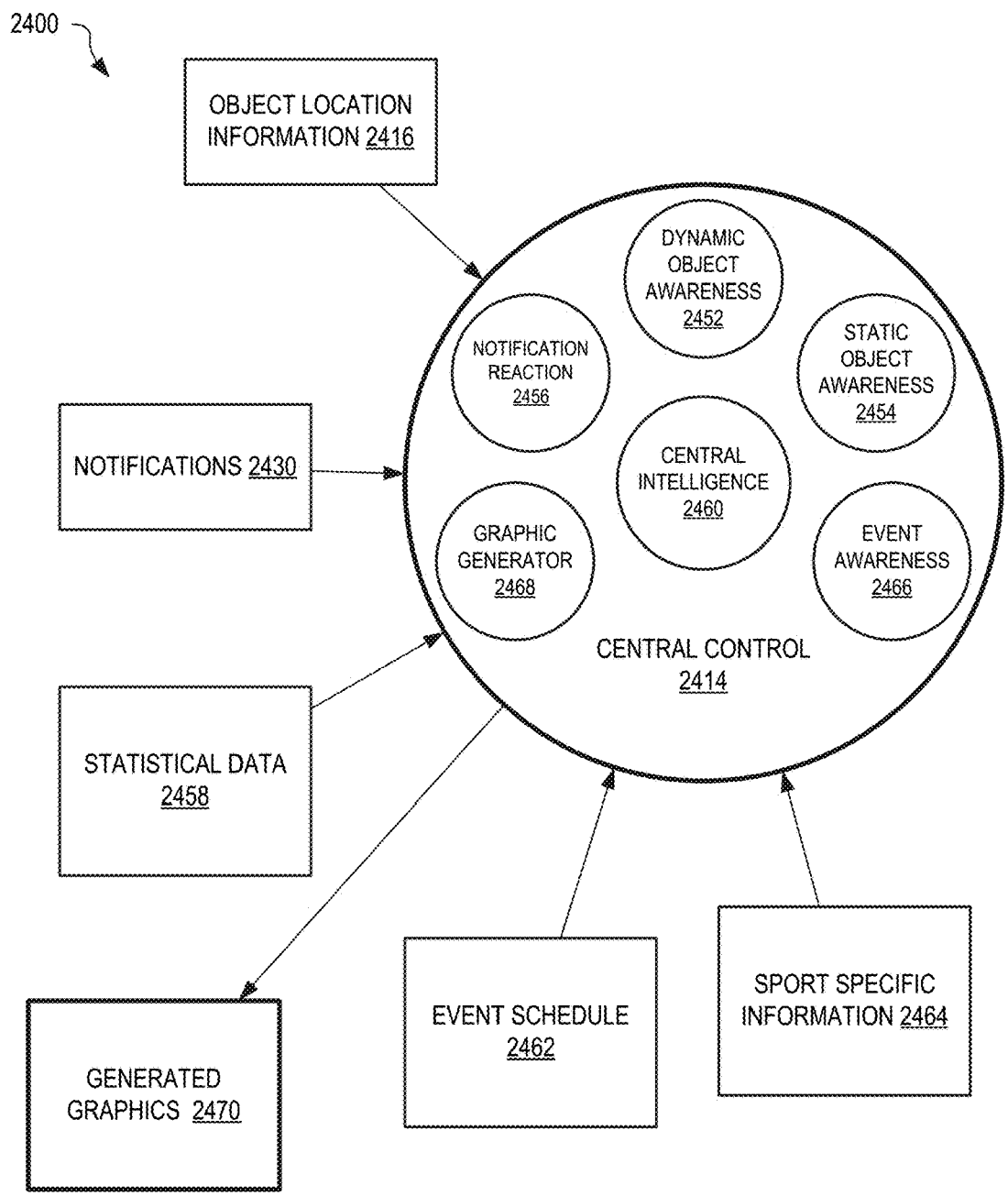
FIG. 24 shows an exemplary central control that may represent intelligence of the camera control devices of FIGS. 1, 2, 3, 4, 5, 6, 14, 15, 17, 20, 21, 22 and 23 and production control devices of FIGS. 6, 14, 17, 22 and 23.
Figure 25:
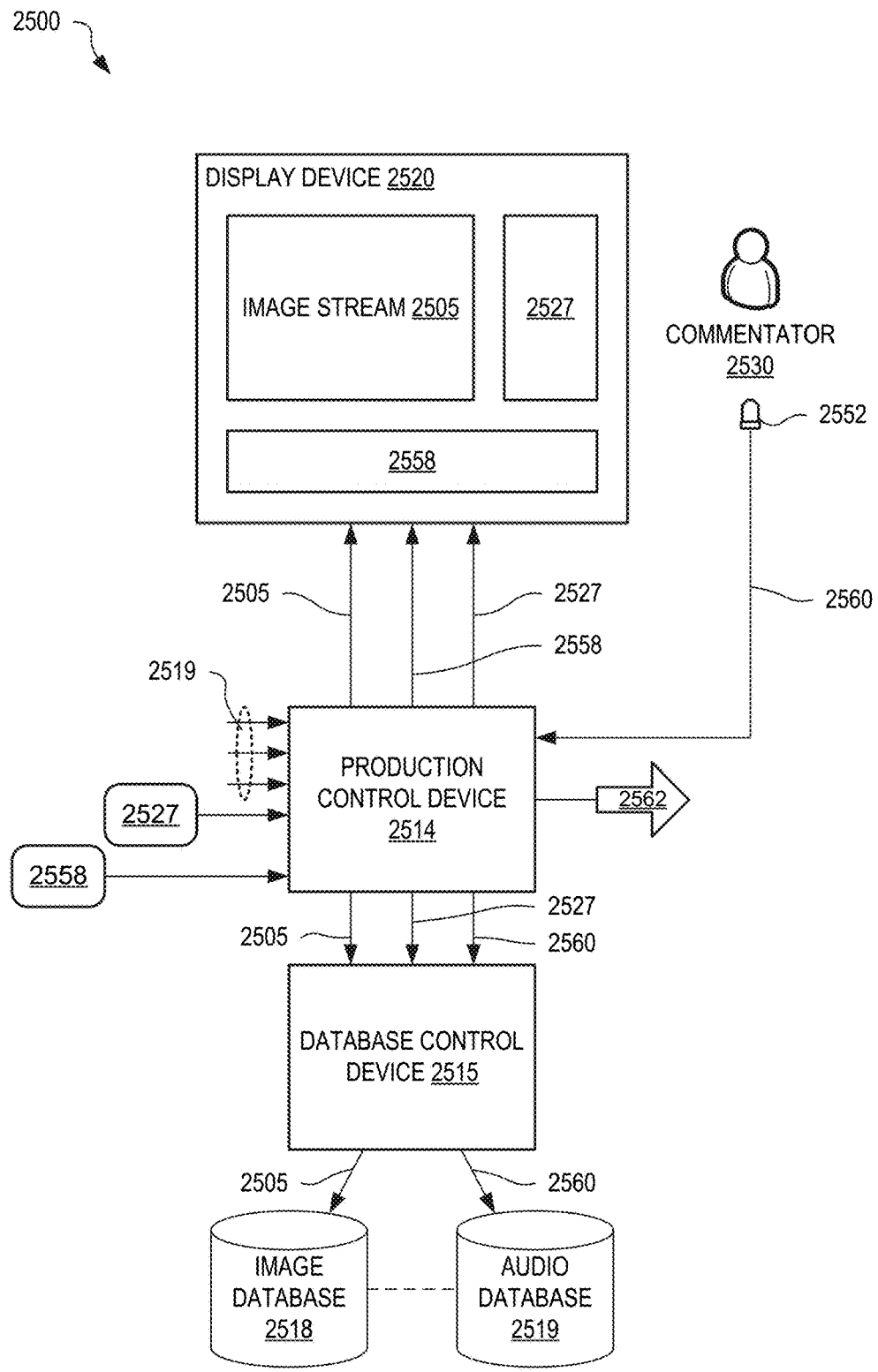
FIG. 25 shows an exemplary system for including commentary with a video feed, in an embodiment.
Figure 26:
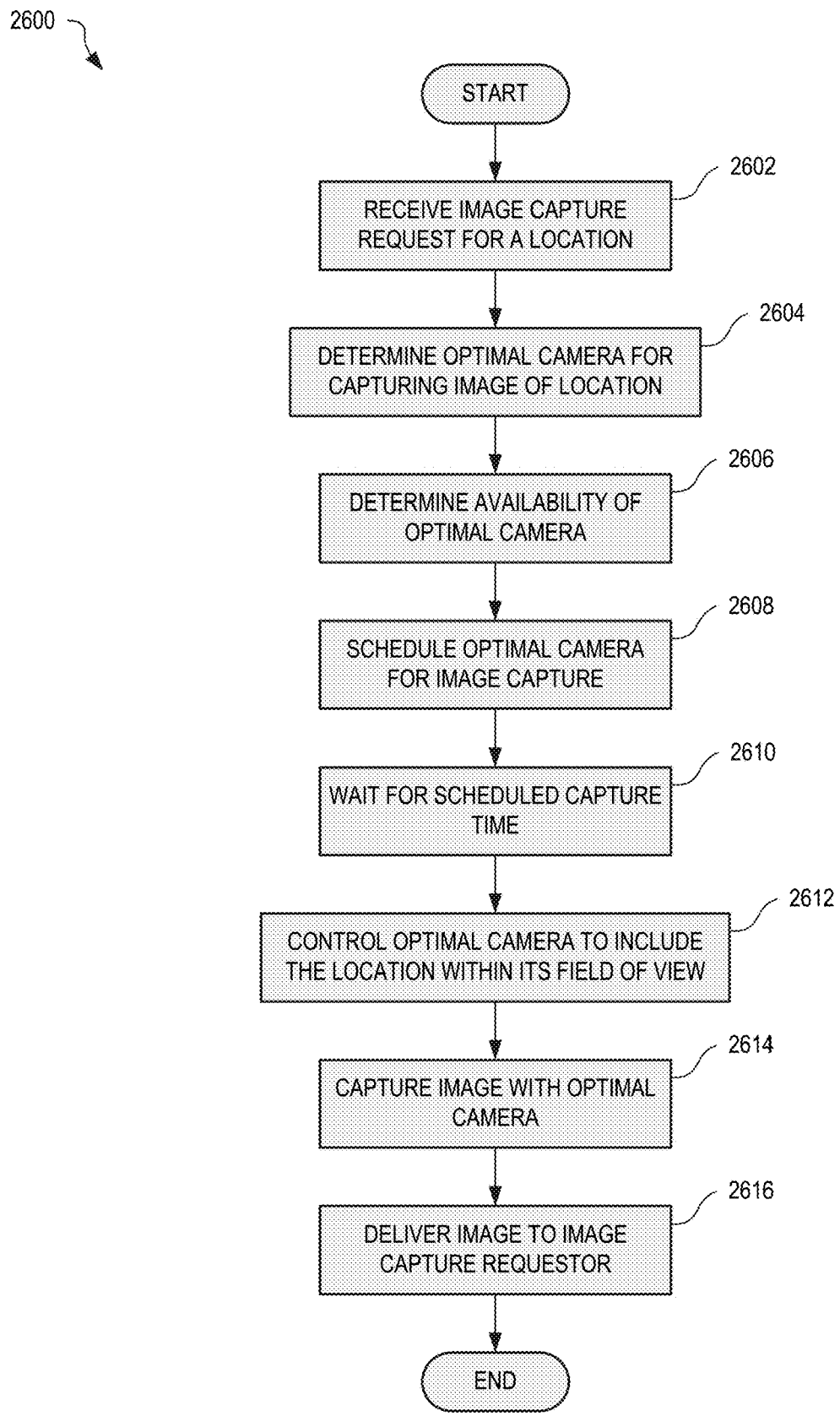
FIG. 26 is a flowchart illustrating an exemplary method for capturing images of a location upon request, in an embodiment.

Before discussing FIGS. 24 and 25, FIG. 26 is a flowchart illustrating one exemplary method for capturing images of a location upon request. Method 2600 is for example implemented within one or more of camera control devices 104, 204, 304, 404, 504, 604, 1404, 1504, 1704, 2004, 2104, 2204 and 2304 of FIGS. 1, 2, 3, 4, 5, 6, 14, 15, 17, 20, 21, 22 and 23, respectively, and production control device 614, 1414, 1714, 2214 and 2314 of FIGS. 6, 14, 17, 22 and 23, respectively, and may be considered part of central control 2414, FIG. 24, described in detail below.

In step 2602, method 2600 receives an image capture request for a location. In one example of step 2602, a spectator at a baseball game sends a text message containing a seat and stand number to a designated phone number monitored by external interaction device 2330 of FIG. 23. In another example of step 2602, a person accesses a web site that interfaces with external interaction device 2330 to request an image be taken of a certain seat location. In another example of step 2602, a spectator utilizes a cell phone to send latitude and longitude coordinates, derived from a GPS unit within the cell phone, to the telephone number to request an image of that location. In step 2604, method 2600 determines an optimal camera for capturing images of the location received in step 2602. In one example of step 2604, external interaction device 2330 converts the defined location received in step 2602 into a location relative to cameras 2310 and field 2308 and sends the converted location to camera control device 2304 which determines at least one of cameras 2310 that is optimal for capturing an image of the converted location. In another example of step 2604, camera control device 2304 determines camera 2310 (2) as the optimal camera for capturing images of seat location 2307.

In step 2606, method 2600 determines availability of the optimal camera for capturing the image. In one example of step 2606, camera control device determines that play on field 2308 is suspended by an injury and that camera 2310(2) is available to capture images of seat location 2307. In step 2608, method 2600 schedules the determined optimal camera of step 2604 for capturing the image of the location of step 2602. In one example of step 2608, production control device 2314 schedules camera 2310(2) to capture images of seat location 2307 five minutes after the request for image capture was received in step 2602. In one embodiment, where the request for image capture of step 2602 was received as a text message, production control 2314 may instruct external interaction device 2330 to send a text message back to the requesting cell phone with the schedules time for the image to be taken. In step 2610, method 2600 waits for the scheduled capture time of step 2608. In one example of step 2610, production control device 2314 includes a scheduling table of events to process as certain times, which is monitored while production control device 2314 continues normal operation. In step 2612, method 2600 controls the determined optimal camera of step 2604 to include the location of step 2602 within its field of view. In one example of step 2612, production control device 2314 utilizes camera control device 2304 to control camera 2310 (2) to position seat location 2307 within its field of view. In step 2614, method 2600 captures at least one image of the location using the determined optimal camera. In one example of step 2614, production control device 2314 sends the at least one captured image to database control device 2315 which stores the at least one captured image within image database 2318. In step 2616, method 2600 delivers the image to the capture requestor. In one example of step 2616, where the image capture request of step 2602 is received from a cell phone, external interaction device 2330 sends at lease a low-resolution image of the captured image of step 2614 to the requesting cell phone. In another example of step 2616, the captured image is made available on a web site accessed by the internet 2340, for example referenced by seat number, thereby allowing the requestor to view and purchase the image during or after the sporting event. In one example, the stored images are graphically annotated with information relative to the sporting event, such as the venue, playing teams and event name. In another example of step 2616, kiosk 2352 (FIG. 23) is used to deliver one or more images to a customer.

FIG. 24 shows a system 2400 with an exemplary central control unit 2414 that represents intelligence of camera control devices 104, 204, 304, 404, 504, 604, 1404, 1504, 1704, 2004, 2104, 2204 or 2304 of FIGS. 1, 2, 3, 4, 5, 6, 14, 15, 17, 20, 21, 22 and 23, respectively and production control device 614, 1414, 1714, 2214 or 2314 of FIGS. 6, 14, 17, 22 and 23, respectively. For example, central control unit 2414 represents intelligence of camera control device 2304 and production control device 2314 of FIG. 23, where intelligence is divided between these devices. That is, functionality of central control unit 2414 may be implemented within camera control units and/or production control units without departing from the scope hereof. Central control unit 2414 provides control of one or more cameras (e.g., cameras 110, 210, 310, 410, 510, 610, 1410, 1510, 1710, 2010, 2110, 2210 and 2310) to capture image streams that may include high-resolution still images and slow-motion images and selects one or more of these images streams for producing an image stream feed (e.g., feed 105, 205, 405, 505, 605, 1405, 1705 and 2205) and storing images within a database (e.g., image database 1518, 1718, 1818, 2318).

Central control 2414 receives object location information 2416 that includes coordinate data (e.g., coordinate data 116) from object tracking devices (e.g., object tracking devices 102, 202, 302, 402, 502, 602, 1402, 1502, 1702, 2002, 2102, 2202 or 2302) and from other dynamic objects that affect camera field of view selection, such as the position of the sun, thereby allowing central control unit 2414 to have dynamic object awareness 2452. Central control unit 2414 also receives coordinate data for static objects that may fall into a field of view of one or more cameras, such as columns, pillars, the sporting event field, goal posts, and other static objects. For example, central control unit 2414 may utilize a topographical map of a stadium. In another example, central control unit 2414 utilizes a map of a track and field event, thereby forming object awareness of individual activities, such as high jump, pole vault, running track, etc. Central control unit 2414 thereby has static object awareness 2454. Central control unit 2414 may thus determine an optimal field of view from each camera based upon dynamic and static object location relative to the camera.

Central control unit 2414 may receive other information relating to the production of a video feed for the event being captured. Central control unit 2414 receives notifications 2430 (e.g., notifications from notification device 1730, FIG. 17) that may be significant to capture of interesting image streams and production of an image feed (e.g., feed 105, 205, 405, 505, 605, 1405, 1705 or 2205). As noted above, notifications 2430 may automatically result from score changes on a scoreboard, may be generated by user input and other means. Central control unit 2414 includes a notification reaction module 2456 that utilizes notifications 2430 to identify events of interest and assign one or more cameras to those events and include image streams that capture the event within the output feed. In one example, notifications 2430 may include status of a game clock, such that central control unit 2414 may determine if play is in progress, and where play is not in progress, central control unit 2414 may utilize other notifications and object location information to determine areas of interest for capture using one or more cameras. For example, if the game clock has stopped and a coach is near a game official, central control unit 2414 may assign one or more cameras to capture an image stream of the coach and official.

Central control unit 2414 may also receive statistical data 2458 that includes statistics on one or more players or teams in a sporting event. Statistical data 2458 may be used by a central intelligence 2460 of central control unit 2414 to identify one or more players of interest such image feeds of these players are captured more frequently. In one example, statistical data 2458 includes statistics for an athlete that is close to breaking a record and therefore central intelligence 2460 decides to give higher priority to assigning a camera to that athlete, thereby capturing an image stream (and/or still images) of events that may result in the record being broken.

Central control unit 2414 may also receive an event schedule 2462 that provides details and times of certain events of interest within a sporting event or production. For example, event schedule 2462 may provide race times for a track and field event, thereby allowing central intelligence 2460 to determine appropriate times when each part of the field will be used, particularly since there may be many tracked athletes within the event field at any one time. Central control unit 2414 utilizes event schedule 2462 to determine when each event (e.g., a track race) finishes and when a next event is due to start, thereby allowing central control unit 2414 to coordinate coverage of each aspect of the event or production. Where there is a period of inactivity, for example between scheduled races of a track and field event, central control unit 2414 may elect to play back image streams of previously recorded events, for example showing final stages of a race in slow motion.

Central control unit 2414 may also receive sport specific information 2464 that allows an event awareness module 2466 to determine when events of interest may occur for a particular sporting event. For example, sport specific information 2462 may define events of interest for a baseball game, such as when a runner of the team at bat moves away from first base (e.g., when trying to steal second base), central control unit 2414 may assign a camera to the runner to ensure no event of interest is missed. Further, the sport specific information 2464 may specify that a pitcher standing on the mound of a baseball game is of interest, as is the player at bat when within a certain distance of home plate. In this example, central control unit 2414 may operate to display the image stream of the runner on first base within a picture-in-picture of the main feed. In another example, where central control unit 2414 is part of a system imaging an American football game, there may be several footballs equipped with a location tag. However, by including a rule with sport specific information 2464 that specifies that during play (i.e., when the game clock is running) only one football is on the field of play, central control unit 2414 may determine which of many footballs is of interest. Central intelligence 2460 may utilize event awareness module 2466, sport specific information 2464 and dynamic object awareness 2452 to determine a position for an imaged target within a camera's field of view. For example, when tracking and capturing an image stream of a football player running with the ball, the position of the player within the camera field of view may be selected such that the camera 'leads' or anticipates the player such that a viewer may see opposition players who may tackle the player. In a horse race, on the other hand, it may be desirable to position the lead horse by making the camera 'lag' such that a view may see other horses that may catch the lead horse.

Central intelligence 2460 utilizes information processed by modules 2452, 2454, 2456 and 2466 and applies this combined intelligence to produce a live feed (e.g., feed 105, 205, 405, 505, 605, 1405, 1705 and 2205) of an event or production.

Central control 2414 may also include a graphic generator 2468 that produces generated graphics 2470 containing statistical data for players and teams, based upon statistical data 2458 for example, and may include result information where this information is received by central control 2414. Central control 2414 may utilize sport specific information 2464 to collect statistical information for a sporting event. For example, sport specific information 2464 may specify that a graphic of team possession time may be generated for an American football game based upon statistics accumulated by central control 2414; the graphic may then be selectively included within an image stream feed by central control 2414 at appropriate times between events of interest and game play. A similar metric may be applied to individuals in a soccer game. In another example, graphic generator 2468 generates a position table of participants in a race in real-time. Such automatically generated tables may also be fed to and used with other systems, such as standard TV production. without departing from the scope hereof.

Decisions made by central control 2414 are based upon a number of available cameras that are controlled by central control 2414 and the number of image stream feeds generated by central control 2414. For example, where central control 2414 controls a system with more cameras, central control 2414 may operate to use cameras to follow individual players/athletes; where central control 2414 controls a system with fewer cameras, central control 2414 may operate to utilize these fewer cameras more selectively to generate an interesting image stream feed.

Each camera control device 104, 204, 304, 404, 504, 604, 1404, 1504, 1704, 2004, 2104, 2204 and 2304 of FIGS. 1, 2, 3, 4, 5, 6, 14, 15, 17, 20, 21, 22 and 23, respectively, and production control device 614, 1414, 1714, 2214 and 2314 of FIGS. 6, 14, 17, 22 and 23, respectively, may also include an audio feed that includes audio of the captured image stream. For example, one or more cameras 110, 210, 310, 410, 510, 610, 1410, 1510, 1710, 2010, 2110, 2210 and 2310 may include microphones such that a captured audio signal is sent from the camera to the camera control device and/or production control device. In another example, one or more microphones are located within a stadium to capture audio feeds. These audio feeds are received by the camera control devices and/or production control devices and may be recorded (e.g., by recording devices 220, 320, 1418 and/or database control devices 1515, 1715 and 2315) in association with recorded image streams. In one example, central control 2414 utilizes notifications 2430 and sport specific information 2464 to capture an audio stream of official announcements during a sporting event.

Although not shown accompanying image streams in FIGS. 1, 2, 3, 4, 5, 6, 14, 15, 17, 19, 23 and 25, audio may accompany stored image streams and feeds without departing from the scope hereof. For example, audio captured by one or more microphones located around a stadium may be mixed to provide an audio feed to accompany image feeds.

FIG. 25 shows once exemplary system 2500 for including commentary with a video feed 2562. A production control device 2514 produces an image stream 2505, from one or more image feeds 2519, for display on a display device 2520. Production control device 2514 may also send annotation data 2527 and statistical data 2558 to display device 2520 for display in association with image stream 2505. System 2500 includes a microphone 2552 for capturing commentary 2560 relating to image stream 2505 by a commentator 2530. Annotation data 2527 may list players shown within image stream 2505. Statistical data 2558 may include statistics for each of these players and their teams' performance figures. In particular, since production control device 2514 is aware of content of image stream 2552, annotation data 2527 and statistical data 2558 may be selectively displayed with relevance to image stream 2505, thereby providing commentator 2530 with relevant information for use within commentary 2560.

Image stream 2505, commentary 2560 and annotation data 2527 may be stored by a database control device 2515 within an image database 2518 and commentary 2560 may be stored within an audio database 2519. In one embodiment, image database 2518 and audio database 2519 are part of the same database. Image stream 2505 and commentary 2560 may be combined and output as a live feed 2562 (e.g., a TV feed). As appreciated, commentary 2560 may also be mixed with other audio received by production control device 2514 without departing from the scope hereof.

Figure 27:
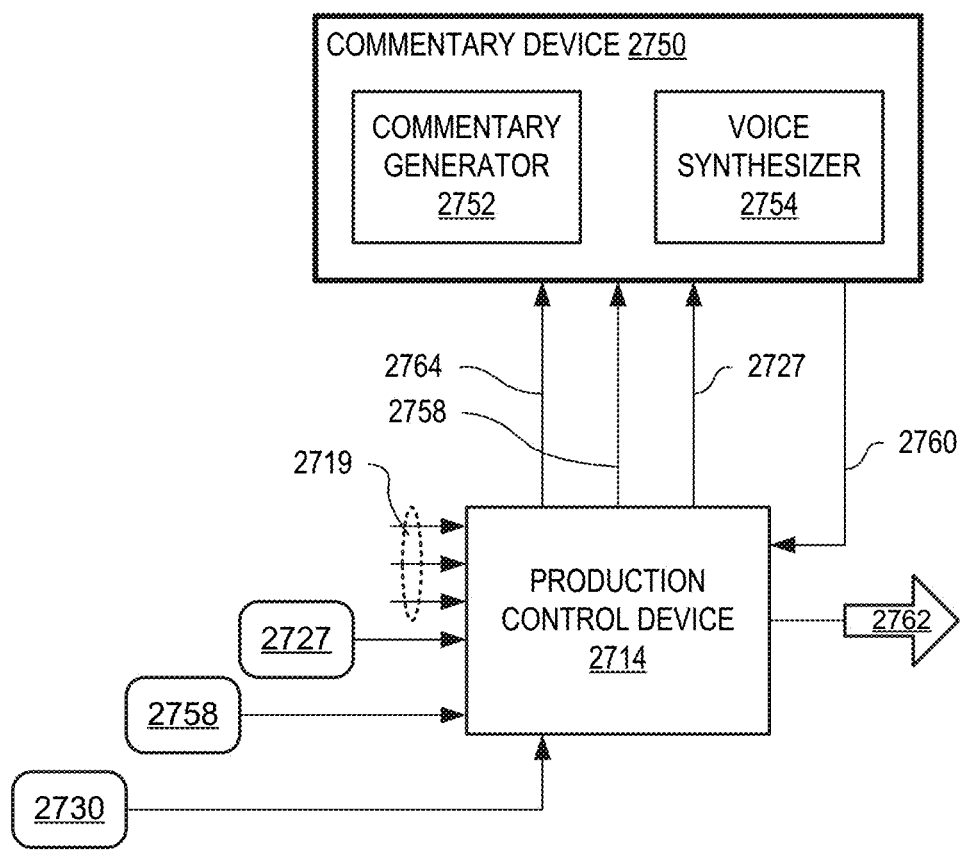
FIG. 27 shows an exemplary system for automatically adding commentary to an automatically produced video feed, in an embodiment.

FIG. 27 shows one exemplary commentary device 2750 for automatically adding commentary 2760 to an automatically produced video feed 2762. Commentary device 2750 includes a commentary generator 2752 and a voice synthesizer 2754. Commentary generator 2752 processes annotation data 2727, statistic information 2758, and operational data 2764 to generate appropriate commentary 2760 for the generated live feed 2762. Operational data 2764 may indicate one or more of selected image stream for output as live feed 2762, events of interest, predicted image stream selection, and other information relevant to production of live feed 2762. Production control device 2714 may include buffers to delay image streams 2719 (see for example FIG. 22 and associated description) thereby allowing commentary 2760 to be generated for events 2730 that indicate already occurred events of interest.

In one example of operation, each player in an American football game wears at least one location device, and each football used during the game includes a location device. Production control device 2714 receives annotation data 2727 and is thereby able to determine which player is within each image stream, based upon field of view information for each image stream 2719, which image stream includes the football and which player has control of the ball (e.g., by proximity and motion of both the player and the football). Thus, using sport specific information (e.g., sport specific information 2464, FIG. 24) commentary generator 2752 may provide interesting and accurate commentary of a sporting event. Continuing with this example, as a quarterback throws the football, central control 2414 may determine trajectories of the football and players to predict the outcome to change cadence and pitch of the synthesized voice of voice synthesizer 2754.

In another example, where production control device 2714 utilizes graphics, appropriate commentary 2760 may be generated by feeding the statistical and/or graphical information to commentary generator 2752.

Figure 29:
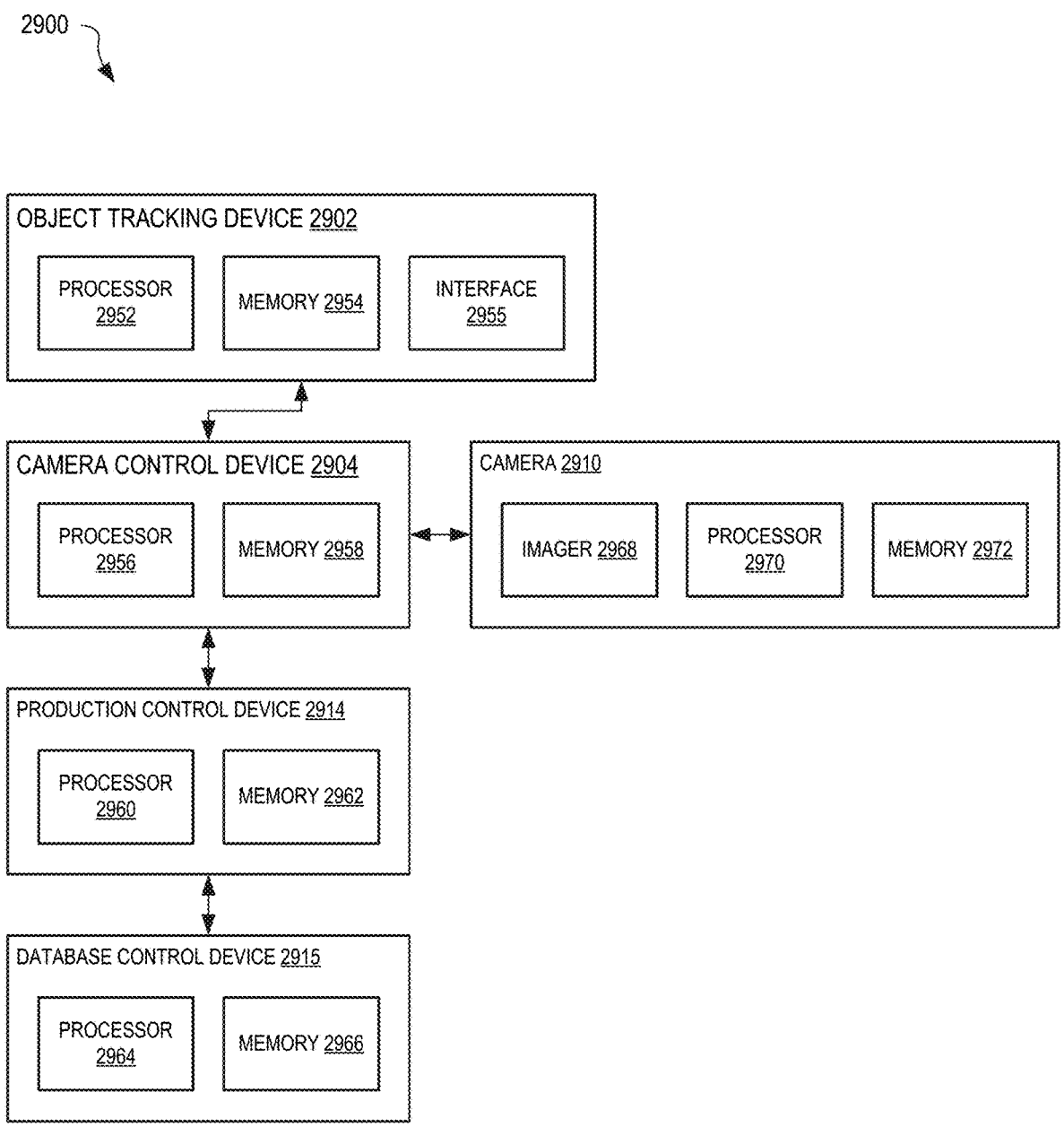
FIG. 29 is a high-level block diagram illustrating exemplary hardware of object tracking devices, camera control devices, cameras, production control devices and database control devices of FIGS. 1, 2, 3, 4, 5, 6, 14, 15, 17, 20, 21, 22 and 23.

FIG. 29 is a high-level block diagram 2900 illustrating exemplary hardware of an object tracking device 2902, a camera control device 2904, a camera 2910, a production control device 1914 and a database control device 2915. Object tracking device 2902, camera control device 2904, camera 2910, production control device 2914 and database control device 2915 may represent hardware of object tracking devices, camera control devices, cameras, production control devices and database control devices of FIGS. 1, 2, 3, 4, 5, 6, 14, 15, 17, 20, 21, 22 and 23.

Object tracking device 2902 is shown with a processor 2952, a memory 2954 and an interface 2955. In an embodiment, interface 2955 is a wireless interface for communicating with and/or receiving data from one or more location units (e.g., location units 112). Processor 2952 and memory 2954 facilitate processing of received information and transfer of this information to camera control device 2904.

Camera control device 2904 is shown with a processor 2956 and a memory 2958 that facilitate implementation of algorithms 426 (FIG. 4) and/or functionality of at least part of central control unit 2414, FIG. 24.

Camera 2910 is shown with an imager 2968, a processor 2970 and a memory 2972 that facilitate implementation of functionality of cameras 2010 and 2110 (FIGS. 20 and 21, respectively). Camera 2910 may include additional processors, such as digital signal processors and memory without departing from the scope hereof.

Production control device 2914 is shown with a processor 2960 and a memory 2962 that facilitate implementation of at least part of central control unit 2414.

Database control device 2915 is shown with a processor 2964 and a memory 2966 that facilitate management of one or more databases and/or other storage devices.

Figure 30:
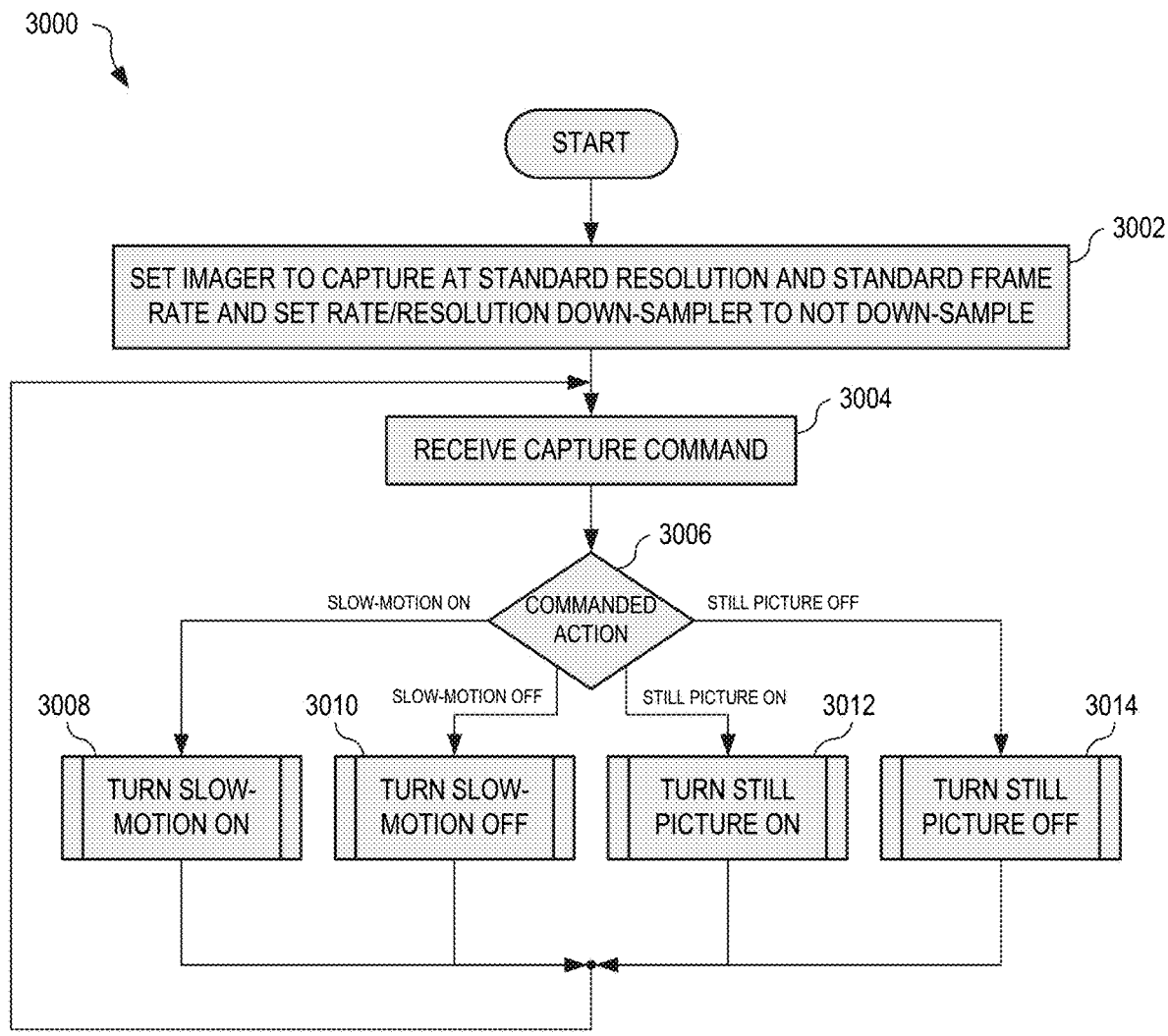
FIGS. 30-34 are flowcharts illustrating one exemplary method and sub-methods for capturing a standard image feed, high resolution still images and a slow-motion feed using the camera of FIG. 20.

FIG. 30 is a flowchart illustrating one exemplary method 3000 for selectively capturing a standard feed, still images and a slow-motion feed within camera 2010 of FIG. 20. Method 3000 may be implemented within a processor (e.g., processor 2970, FIG. 29) of camera 2010. FIGS. 20, 30, 31, 32, 33 and 34 are best viewed together with the following description.

Step 3002 is an initialization step. In step 3002, method 3000 sets the camera imager (e.g., imager 2052) to capture images at a standard resolution (e.g., 640×480 pixels) and at a standard frame rate (e.g., thirty frames per second), and then sets the rate/resolution down-sampler (e.g., rate/resolution down-sampler 2062) to not down-sample. That is, since imager 2052 is capturing images at the resolution and frame rate of live feed 2070, no down sampling is required. In step 3004, method 3000 receives a capture command. In one example of step 3004, camera 2010 receives a command to capture still images. Step 2006 is a decision based upon the command action received in step 3004. If the received capture command of step 3004 commands slow-motion on, method 3000 continues with step 3008; if the received capture command of step 3004 commands slow-motion off, method 3000 continues with step 3010; if the received capture command of step 3004 commands still picture on, method 3000 continues with step 3012; and if the received capture command of step 3004 commands still picture off, method 3000 continues with step 3014.

Figure 31:
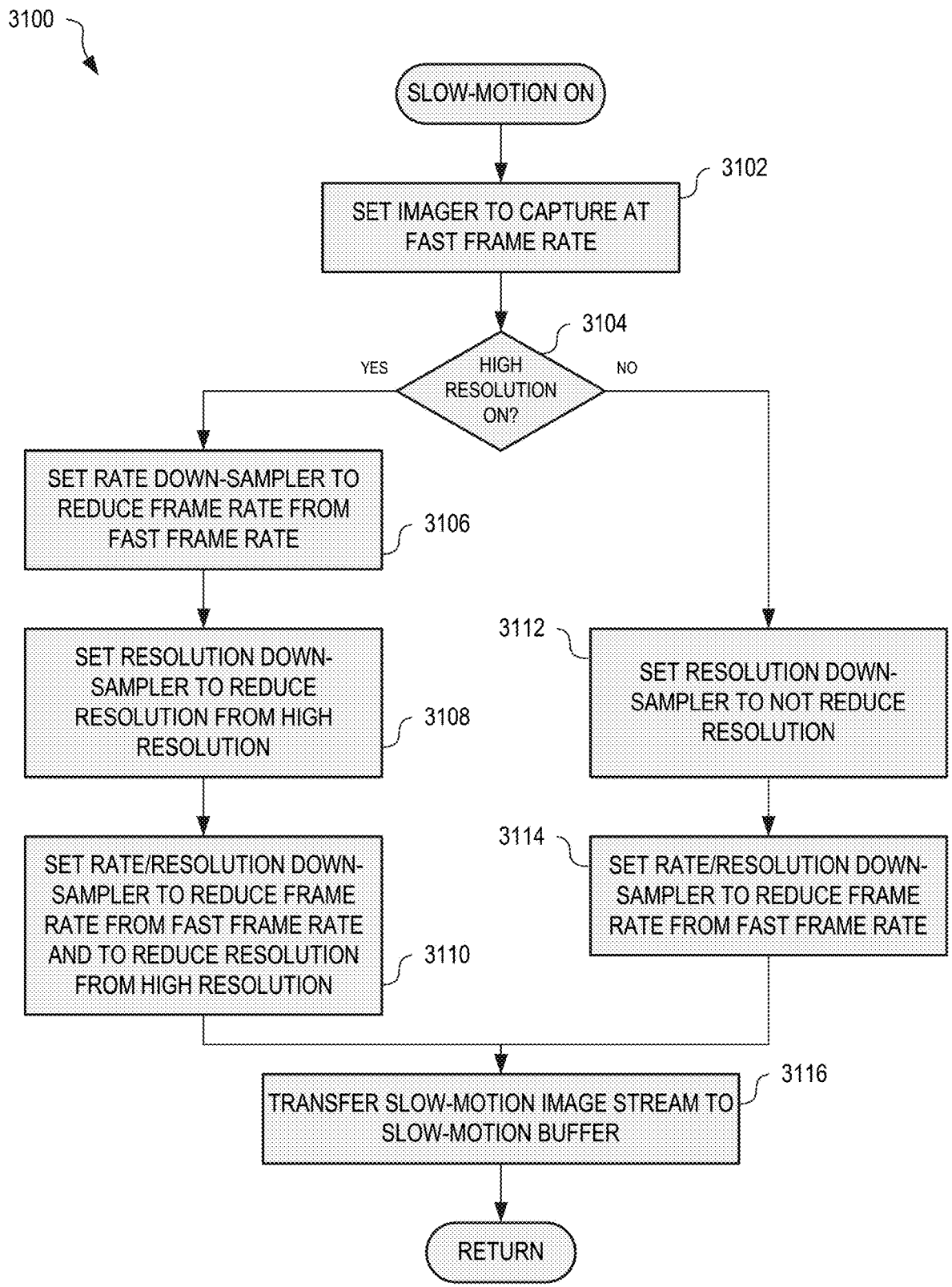
Figure 32:
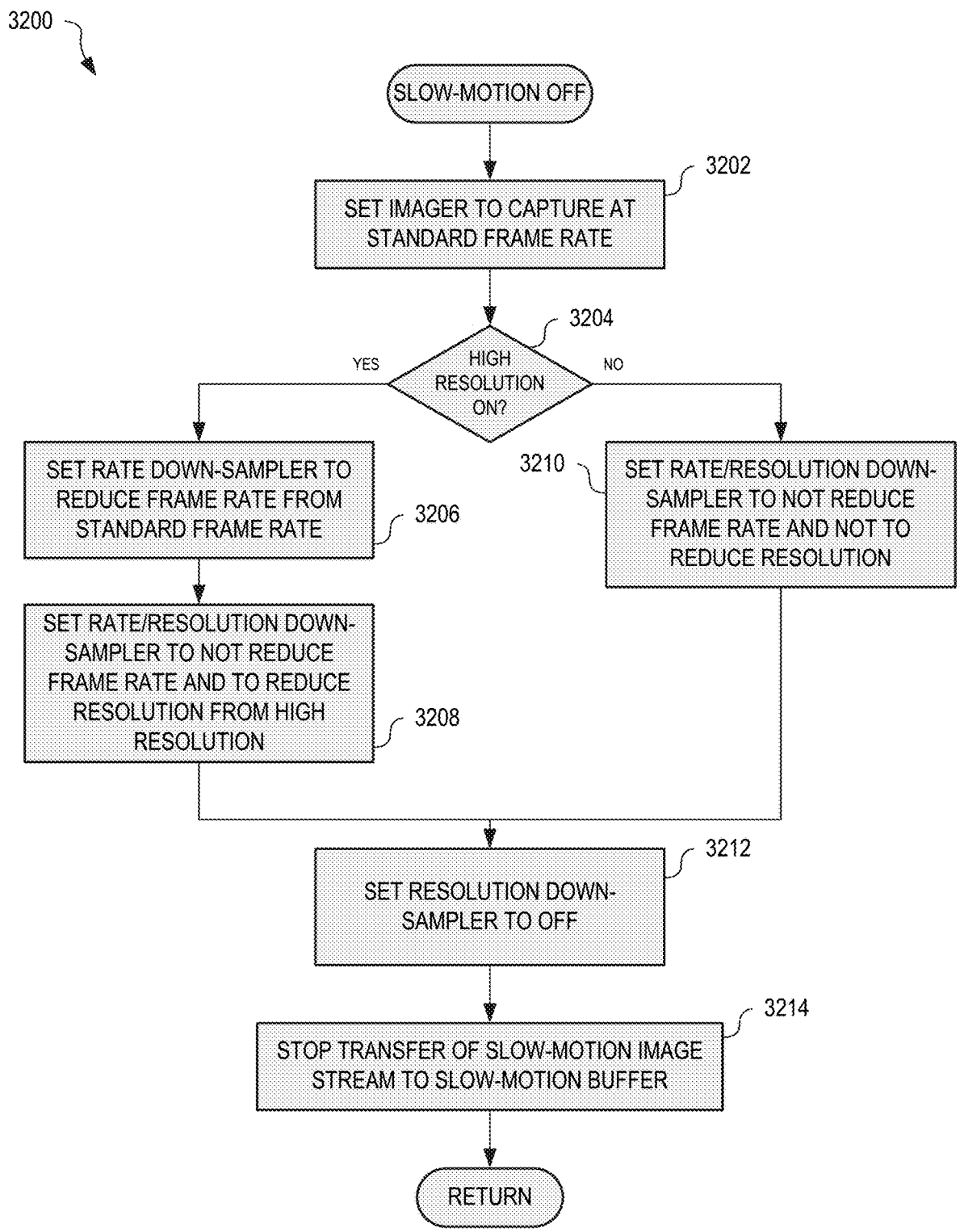
Figure 33:
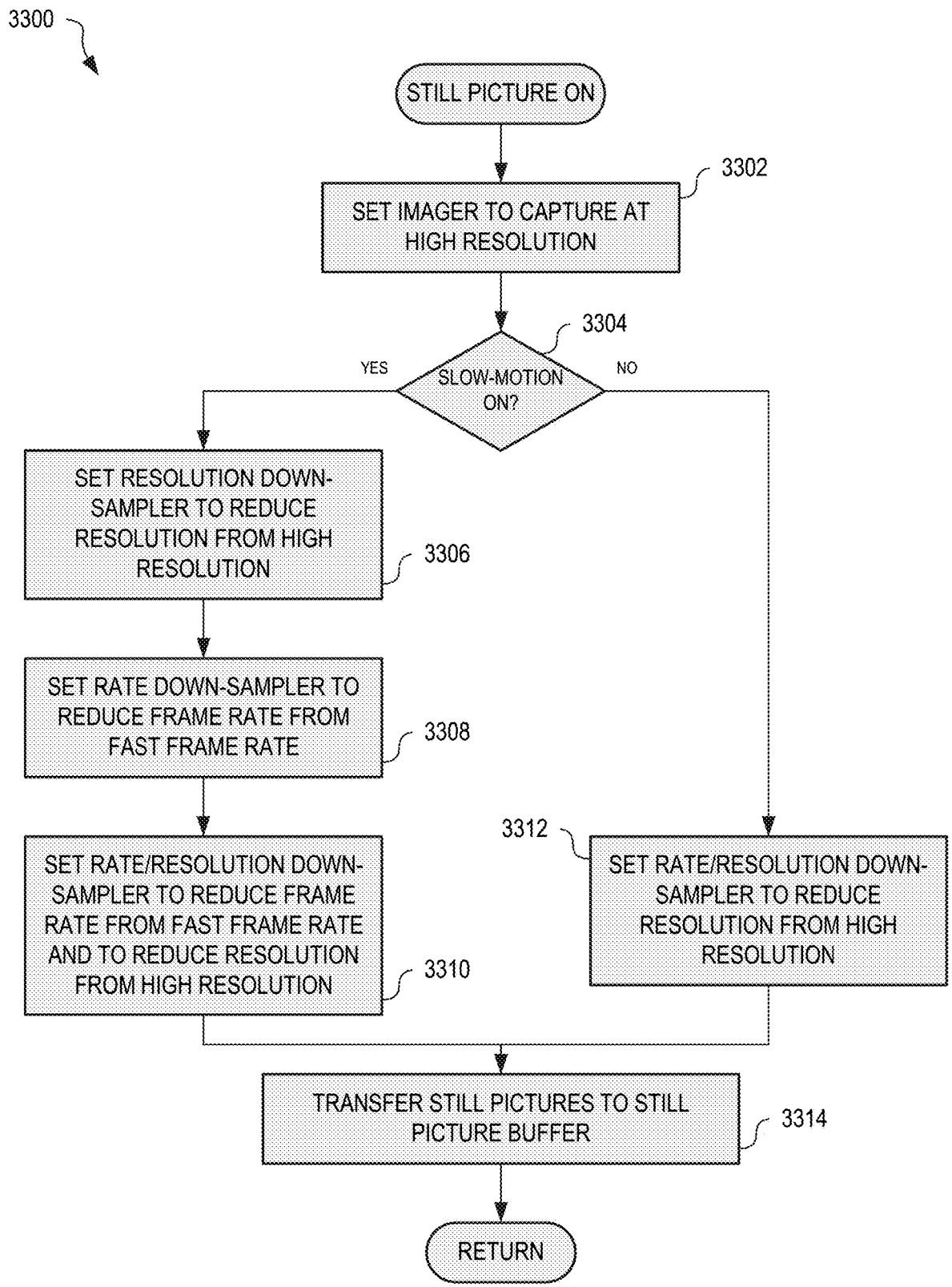
Figure 34:
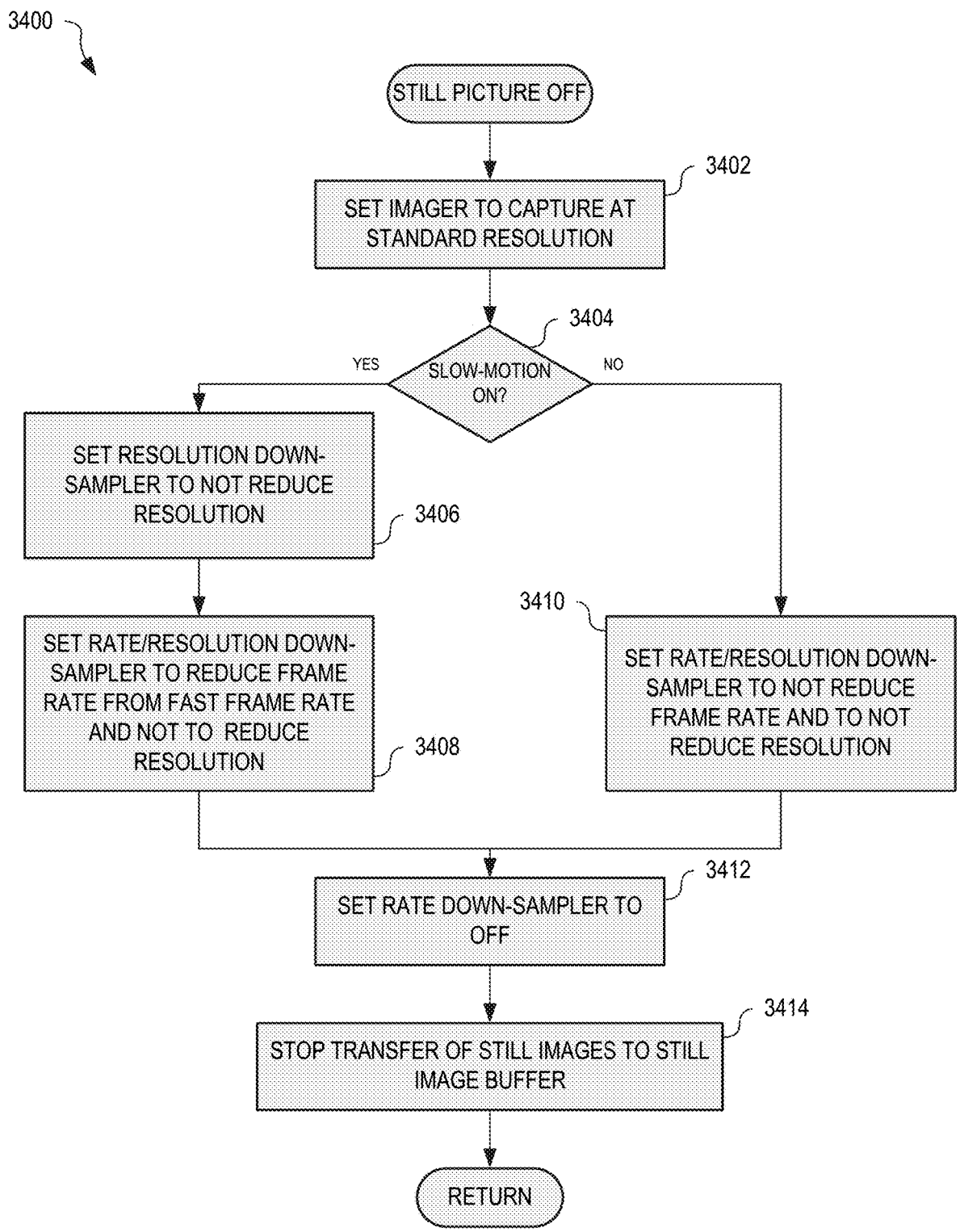

In step 3008, method 3000 calls a sub-method 3100, shown in FIG. 31. Upon return from sub-method 3100, method 3000 continues with step 3004. In step 3010, method 3000 calls a sub-method 3200, shown in FIG. 32. Upon return from sub-method 3200, method 3000 continues with step 3004. In step 3012, method 3000 calls a sub-method 3300, shown in FIG. 33. Upon return from sub-method 3300, method 3000 continues with step 3004. In step 3014, method 3000 calls a sub-method 3400, shown in FIG. 34. Upon return from sub-method 3400, method 3000 continues with step 3004.

In step 3102, sub-method 3100 sets the imager to capture at a fast frame rate. In one example of step 3102, processor 2970 sets imager 2052 to capture images at a frame rate of one-hundred and twenty frames per second. Step 3104 is a decision. If, in step 3104 sub-method 3100 determines that the camera is also operating in still image mode, sub-method 3100 continues with step 3106; otherwise sub-method 3100 continues with step 3112.

In step 3106, sub-method 3100 sets the rate down-sampler to reduce the frame rate from the fast frame rate. In one example of step 3106, processor 2970 sets rate down-sampler 2054 to reduce the frame rate of image stream 2070 from one-hundred and twenty frames per second to five frames per second. In step 3108, sub-method 3100 sets the resolution down sampler to reduce image resolution from the high resolution used for still images to the standard resolution of the slow-motion image stream. In one example of step 3108, processor 2970 sets resolution down sampler 2058 to reduce the resolution of each frame of image stream 2072 to a standard resolution from the high resolution (e.g., 2048×1536 pixels) used to produce the still images. In step 3110, sub-method 3100 sets the rate/resolution down-sampler to reduce the frame rate from the fast frame rate set in step 3102 to a standard frame rate and to reduce the high resolution to a standard resolution. In one example of step 3110, processor 2970 sets rate/resolution down-sampler 2062 to converts a captured image stream 2072 resolution of 2048×1536 pixels to a standard resolution of 640×480 pixels and to converts a captured fast frame rate of one-hundred and twenty frames per second to a standard frame rate of thirty frames per second. Sub-method 3100 then continues with step 3116.

In step 3112, sub-method 3100 sets resolution down sampler to not reduce the standard resolution of the captured image stream. In one example of step 3112, processor 2970 sets resolution down-sampler 2058 to not reduce resolution of each frame of image stream 2072. In step 3114, sub-method 3100 sets the rate/resolution down-sampler to reduce the frame rate from the fast frame rate set in step 3102. In one example of step 3114, processor 2970 sets rate/resolution down-sampler 2062 to reduce the frame rate of image stream 2072 from the fast frame rate of one-hundred and twenty frames per second to a standard frame rate of thirty frames per second.

In step 3116, sub-method 3100 transfers the slow-motion image stream to the slow-motion image stream buffer. In one example of step 3116, processor 2970 transfers slow-motion image stream from resolution down-sampler 2058 to slow-motion buffer 2060, from where it is output as slow-motion image stream 2068. Sub-method 3100 then returns to step 3004 of method 3000.

In step 3202, sub-method 3200 sets the imager to capture images at a standard frame rate. In one example of step 3202, processor 2970 sets imager 2052 to capture image stream 2072 at thirty frames per second. Step 3204 is a decision. If, in step 3204, sub-method 3200 determines that the camera is also operating to capture still images, sub-method 3200 continues with step 3206; otherwise sub-method 3200 continues with step 3210.

In step 3206, sub-method 3200 sets rate down-sampler to reduce the frame rate from the standard frame rate set in step 3202. In one example of step 3206, processor 2970 sets rate down sampler 2054 to reduce the frame rate of image stream 2072 from thirty frames per second to five frames per second. In step 3208, sub-method 3200 sets the rate/resolution down-sampler to not reduce the frame rate and to reduce the resolution from high resolution used by still picture capture to a standard resolution. In one example of step 3208, processor 2970 sets rate/resolution down-sampler 2062 to not reduce the frame rate of image steam 2072 and to reduce the resolution of each frame of image stream 2072 to the standard resolution of 640×480 pixels. Sub-method 3200 continues with step 3212.

In step 3210, sub-method 3200 sets the rate/resolution down-sampler to not reduce the frame rate and to not reduce resolution. In one example of step 3210, processor 2970 turns rate/resolution down-sampler 2062 off such that image stream 2072 passes through to become image feed 2070 without change.

In step 3212, sub-method 3200 sets the resolution down-sampler off. In one example of step 3212, processor 2970 sets resolution down sampler 2058 off as no slow-motion image stream 2068 is required. In step 3214, sub-method 3200 stops transfer of slow-motion image stream from resolution down-sampler 2058 to slow-motion buffer 2060. Sub-method 3200 then returns to step 3004 of method 3000.

In step 3302, sub-method 3300 sets the imager to capture at a high resolution. In one example of step 3302, processor 2970 sets imager 2052 to capture at 2048×1536 pixels using the previously set frame rate. Step 3304 is a decision. If, in step 3304, sub-method 3300 determines that the camera is also operating to capture a slow-motion image stream, sub-method 3300 continues with step 3306; otherwise sub-method 3300 continues with step 3312. In step 3306, sub-method 3300 sets the resolution down-sampler to reduce the resolution of each frame from the high-resolution set in step 3302 to a standard resolution of the slow-motion image stream. In one example of step 3306, processor 2970 sets resolution down-sampler 2058 to reduce the resolution of each frame of image stream 2072 from 2048×1536 pixels to a standard resolution of 640×480 pixels. In step 3308, sub-method 3300 sets the rate down-sampler to reduce the frame rate of the captured image stream from the fast frame rate of the slow-motion image stream to the frame rate of the still picture image stream. In one example of step 3308, processor 2970 sets rate down-sampler 2054 to reduce the frame rate of image stream 2072 from one-hundred and twenty frames per second to 5 frames per second. In step 3310, sub-method 3300 sets the rate/resolution down-sampler to reduce the frame rate from the fast frame rate to a standard frame rate and to reduce the resolution from the high-resolution set in step 3302 to a standard resolution. In one example of step 3310, processor 2970 sets rate/resolution down-sampler 2062 to reduce the frame rate of image stream 2072 from one-hundred and twenty frames per second to thirty frames per second and to reduce the resolution of each remaining frame of image steam 2072 from 2048×1536 pixels to 640×480 pixels. Sub-method 3300 continues with step 3314.

In step 3312, sub-method 3300 sets the rate/resolution down-sampler to reduce the resolution from the high-resolution set in step 3302. In one example of step 3312, processor 2970 sets rate/resolution down-sampler 2062 to reduce the resolution of each frame of image stream 2072 from 2048×1536 pixels to 640×480 pixels while leaving the frame rate unchanged.

In step 3314, sub-method 3300 transfers still pictures to the still picture buffer. In one example of step 3314, processor 2970 transfers still images from rate down-sampler 2054 to still image buffer 2056. Sub-method 3300 then returns to step 3004 of method 3000.

In step 3402, sub-method 3400 sets the imager to capture images at a standard resolution. In one example of step 3402, processor 2970 sets imager 2052 to capture image stream 2072 at a standard resolution of 640×480 pixels. Step 3404 is a decision. If, in step 3404, sub-method 3400 determines that the camera is also operating to capture a slow-motion image stream, sub-method 3400 continues with step 3406; otherwise sub-method 3400 continues with step 3410.

In step 3406, sub-method 3400 sets resolution down-sampler to not reduce the resolution from the standard resolution set in step 3402. In one example of step 3406, processor 2970 sets resolution down sampler 2058 to not reduce the resolution of image stream 2072. In step 3408, sub-method 3400 sets the rate/resolution down-sampler to reduce the frame rate from the fast frame rate used for the slow-motion image stream to a standard frame rate and to not reduce the resolution. In one example of step 3408, processor 2970 sets rate/resolution down-sampler 2062 to reduce the frame rate of image steam 2072 from one-hundred and twenty frames per second to a standard frame rate of thirty frames per second and to not reduce the resolution of each frame of image stream 2072. Sub-method 3400 continues with step 3412.

In step 3410, sub-method 3400 sets the rate/resolution down-sampler to not reduce the frame rate and to not reduce resolution. In one example of step 3410, processor 2970 sets rate/resolution down-sampler 2062 off such that image stream 2072 passes through to become image feed 2070 without change.

In step 3412, sub-method 3400 turns the rate down-sampler off. In one example of step 3412, processor 2970 sets rate down sampler 2054 off as no still picture stream 2066 is required. In step 3414, sub-method 3400 stops transfer of still images from rate down-sampler 2054 to still image buffer 2056. Sub-method 3400 then returns to step 3004 of method 3000.

As appreciated, frame rates and resolutions shown in the above examples may vary without departing from the scope hereof.

Figure 35:
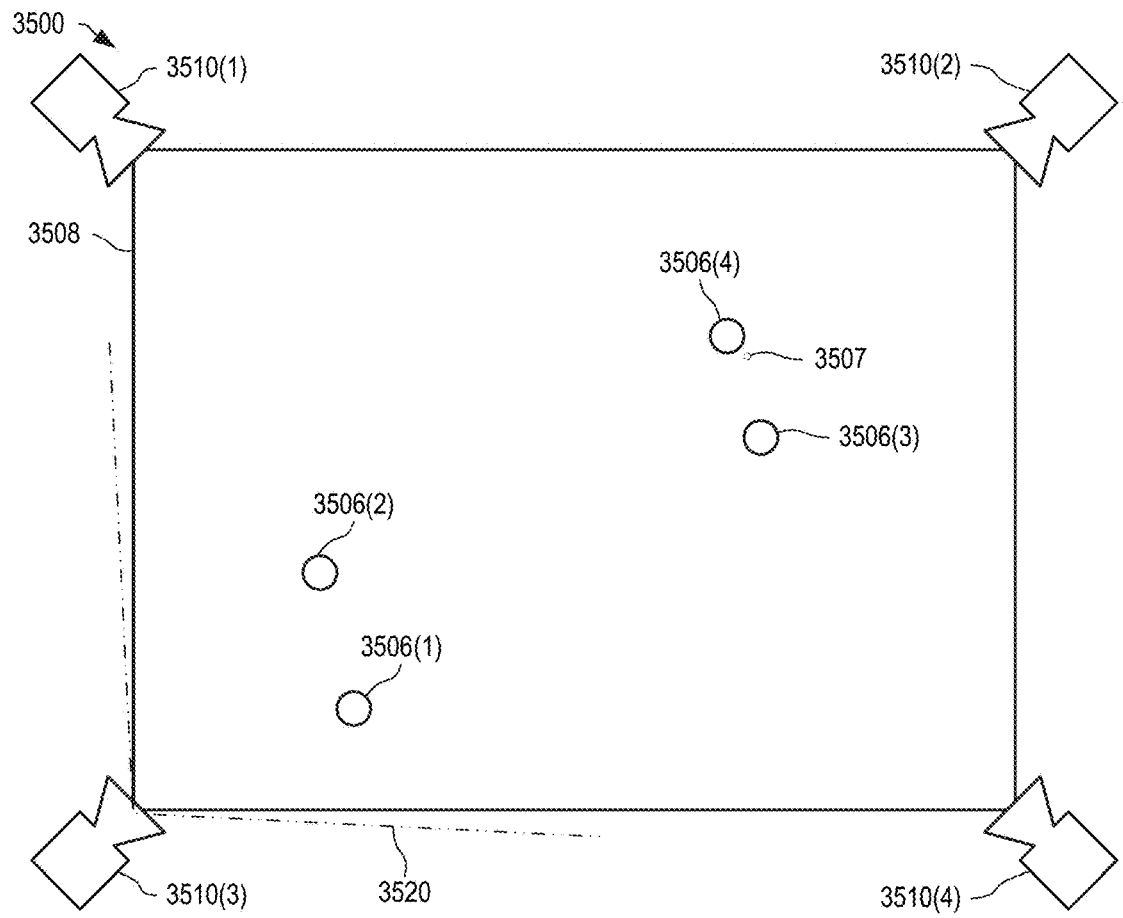
FIG. 35 is a plan view of an operational field with four fixed cameras positioned at corners of the operational field, each having a fixed field of view to capture images of activities within the operational field.

FIG. 35 is a plan view 3500 of an operational field 3508 (e.g., a soccer field) with four fixed cameras 3510(1), 3510(2), 3510(3) and 3510(4) positioned at corners of operational field 3508 and each having a fixed field of view 3520 to capture images of activities within operational field 3508. For clarity of illustration, only field of view 3520 of camera 3510(3) is shown in FIG. 35. As appreciated, fewer or more cameras 3510 may be used without departing from the scope hereof. Four tracked objects of interest 3506(1), 3506(2), 3506(3), 3506(4) and 3507 are shown within operational field 3508 and captured by cameras 3510. Objects 3506 may represent soccer players and object 3507 may represent a soccer ball. Cameras 3510 are high resolution (e.g., 10,000×7,500 pixels) cameras that may be used with, or in place of, cameras 110, 210, 210, 410, 510, 610, 1410, 1510, 1710, 2010 and 2110 of FIGS. 1, 2, 3, 4, 5, 6, 14, 15, 17, 20 and 21, respectively, to generate image streams and/or still images.

Figure 36:
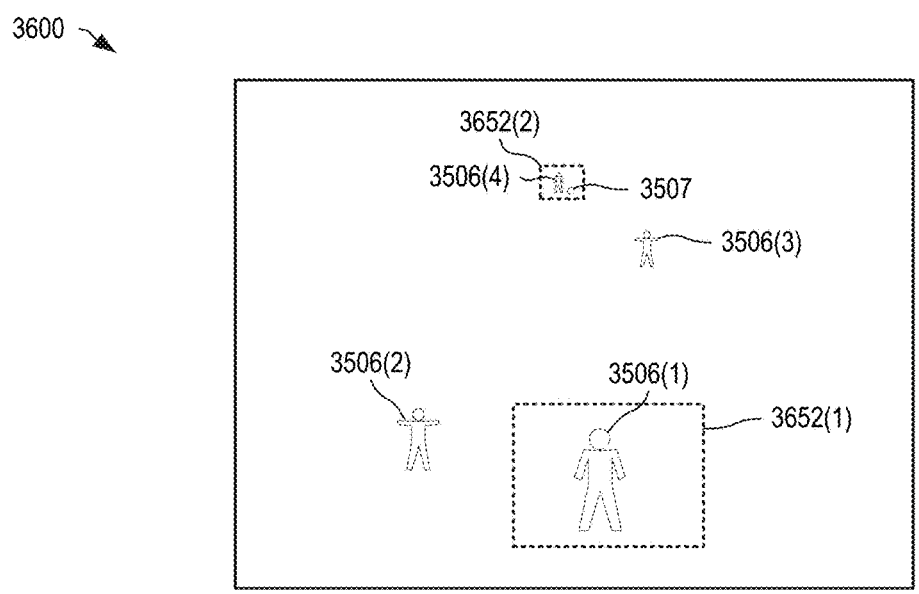
FIG. 36 shows one exemplary perspective view from one camera of FIG. 35.

FIG. 36 shows one exemplary perspective view 3600 from camera 3510(3) and containing objects 3506 and 3507. Since object 3506(1) is closer to camera 3510(3) than object 3506(4), object 3506(1) appears larger within view 3600 than object 3506(4), when objects 3506(1) and 3506(4) are similar in size.

A camera control device (not shown) utilizes the location and fixed field of view of each of cameras 3510 to determine one or more windows 3652 within view 3600 (shown in dashed lines). Window 3652(1), shown enclosing object 3506(1), and window 3652(2), shown enclosing object 3506(4), are of differing sizes and thus contain a different number of pixels. Each window may be determined by the camera control device to capture an image stream of a particular object (e.g., window 3652(1) captures object 3506(1)), based upon location information of each object 3506. Windows 3652(1) and 3652(2) may be determined by the camera control device in a manner similar to the determination of the field of views described above.

Where view 3600 represents an image with a resolution of 10,000×7,500 pixels, window 3652(1) may have a resolution of 2800×2100 pixels and window 3652(2) may have a resolution of 640×480 pixels. The images within each window may be resized to produce a consistent image stream from each window, particularly where multiple windows are used for one camera. For example, where an output stream with a resolution of 640×480 pixels is desired, each frame obtained from window 3652(1) may be converted (e.g., down-sampled or up-sampled) to 640×480 pixels. Since each window may change size, the ratio of this conversion is dynamic to provide a constant output resolution.

In another example, where only one window is used for each camera, a windowing feature of an imager within the camera may be used to capture an image stream containing only the window contents. Thus, the window image need not be 'cut' from the larger view 3600.

Changes may be made in the above processes and systems without departing from the scope hereof. It should thus be noted that the matter contained in the above description or shown in the accompanying drawings should be interpreted as illustrative and not in a limiting sense. For example, although fully automated production is shown in many of the above examples, production control devices 614, 1414, 1714, 2214 and 2314 of FIGS. 6, 14, 17, 22 and 23, respectively, may provide displays of received image streams to allow a user to select the appropriate image stream for output. The following claims are intended to cover all generic and specific features described herein, as well as all statements of the scope of the present process and system, which, as a matter of language, might be said to fall there between.

What is claimed is:

1. An image-stream windowing method, comprising:
   capturing, with a camera located at a fixed position and having a fixed field of view, a high-resolution image stream of an object that moves during said capturing, the high-resolution image stream comprising a sequence of high-resolution frames;
   determining, for each high-resolution frame of the sequence of high-resolution frames, a respective window, of a sequence of windows corresponding to the sequence of high-resolution frames, that encloses the object within said each high-resolution frame, said determining being based at least on the fixed position, the fixed field of view, and a position of the object; and
   generating a low-resolution image stream from the high-resolution image stream by cropping said each high-resolution frame with its respective window to create a respective one of a sequence of cropped frames, the low-resolution image stream comprising the sequence of low-resolution frames.

2. The image-stream windowing method of claim 1, further comprising outputting the low-resolution image stream.

3. The image-stream windowing method of claim 1, wherein a resolution of the respective window changes over the sequence of windows.

4. The image-stream windowing method of claim 1, further comprising converting each cropped frame of the sequence of cropped frames into a respective one of a sequence of fixed-resolution frames such that all of the fixed-resolution frames have an identical resolution that is less than a resolution of the high-resolution image stream;
wherein the low-resolution image stream comprises the sequence of fixed-resolution frames.

5. The image-stream windowing method of claim 1, further comprising determining the position of the object during said capturing.

6. The image-stream windowing method of claim 5, wherein said determining the position of the object includes determining coordinate data of the object using a wireless tracking tag affixed to the object.

7. The image-stream windowing method of claim 6, wherein said determining the coordinate data of the object includes determining two spatial coordinates of the object.

8. The image-stream windowing method of claim 6, wherein said determining the coordinate data of the object includes using multilateration of a radiofrequency signal transmitted by the wireless tracking tag.

9. The image-stream windowing method of claim 1, wherein:
said capturing includes capturing the high-resolution image stream of a first object and a second object that both move during said capturing;
said determining includes:
determining, for said each high-resolution frame, a respective first window, of a sequence of first windows corresponding to the sequence of high-resolution frames, that encloses the first object within said each high-resolution frame, said determining the respective first window being based at least on a first position of the first object; and
determining, for said each high-resolution frame, a respective second window, of a sequence of second windows corresponding to the sequence of high-resolution frames, that encloses the second object within said each high-resolution frame, said determining the respective second window being based at least on a second position of the second object; and
said generating includes:
generating a first low-resolution image stream from the high-resolution stream by cropping said each high-resolution frame with its respective first window to create a respective one of a first sequence of cropped frames; and
generating a second low-resolution image stream from the high-resolution stream by cropping said each high-resolution frame with its respective second window to create a respective one of a second sequence of cropped frames.

10. The method of claim 9, further comprising outputting one or both of the first and second low-resolution image streams.

11. An image-stream windowing system, comprising:
a camera control device operable to:
receive, from a camera located at a fixed position and having a fixed field of view, a high-resolution image stream of an object that moves while the camera captures the high-resolution image stream, the high-resolution image stream comprising a sequence of high-resolution frames,
determine, for each high-resolution frame of the sequence of high-resolution frames, a respective window, of a sequence of windows corresponding to the sequence of high-resolution frames, that encloses the object within said each high-resolution frame, the camera control device being operable to determine the respective window based at least on the fixed position, the fixed field of view, and a position of the object, and
generate a low-resolution image stream from the high-resolution image stream by cropping said each high-resolution frame with its respective window to create a respective one of a sequence of cropped frames, the low-resolution image stream comprising the sequence of low-resolution frames.

12. The image-stream windowing system of claim 11, the camera control device being further operable to output the low-resolution image stream.

13. The image-stream windowing system of claim 11, wherein a resolution of the respective window changes over the sequence of windows.

14. The image-stream windowing system of claim 11, wherein:
the camera control device is further operable to convert each cropped frame of the sequence of cropped frames into a respective one of a sequence of fixed-resolution frames such that all of the fixed-resolution frames have an identical resolution that is less than a resolution of the high-resolution image stream; and
the low-resolution image stream comprises the sequence of fixed-resolution frames.

15. The image-stream windowing system of claim 11, the camera control device being further operable to receive the position of the object from an object tracking system.

16. The image-stream windowing system of claim 11, further comprising the object tracking system.

17. The image-stream windowing system of claim 16, wherein:
the object tracking system comprises a wireless tracking tag that is configured to be affixed to the object and operable to transmit a periodic radiofrequency signal;
the object tracking system is operable to determine the position of the object by performing multilateration of the periodic radiofrequency signal.

18. The image-stream windowing system of claim 11, the camera control device being further operable to:
receive, from the camera, the high-resolution image stream of a first object and a second object that both move while the camera captures the high-resolution image stream, determine, based at least on a first position of the first object, a respective first window of a sequence of first windows corresponding to the sequence of high-resolution frames, the respective first window enclosing the first object within said each high-resolution frame,
determine, based at least on a second position of the second object, a respective second window of a sequence of second windows corresponding to the sequence of high-resolution frames, the respective second window enclosing the second object within said each high-resolution frame,
generate a first low-resolution image stream from the high-resolution stream by cropping said each high-resolution frame with its respective first window to create a respective one of a first sequence of cropped frames, and
generate a second low-resolution image stream from the high-resolution stream by cropping said each high-resolution frame with its respective second window to create a respective one of a second sequence of cropped frames.

19. The image-stream windowing system of claim 11, the camera control device being further operable to output one or both of the first and second low-resolution image streams.

20. The image-stream windowing system of claim 11, further comprising the camera.

* * * * *